United States Patent
Aragaki

(10) Patent No.: US 7,889,250 B2
(45) Date of Patent: Feb. 15, 2011

(54) IMAGE-ACQUISITION APPARATUS

(75) Inventor: Hideya Aragaki, Hino (JP)

(73) Assignee: Olympus Corporation, Tokyo (JP)

( * ) Notice: Subject to any disclaimer, the term of this patent is extended or adjusted under 35 U.S.C. 154(b) by 277 days.

(21) Appl. No.: 11/917,493

(22) PCT Filed: Jun. 12, 2006

(86) PCT No.: PCT/JP2006/311756
§ 371 (c)(1),
(2), (4) Date: Dec. 13, 2007

(87) PCT Pub. No.: WO2006/134872
PCT Pub. Date: Dec. 21, 2006

(65) Prior Publication Data
US 2009/0091643 A1    Apr. 9, 2009

(30) Foreign Application Priority Data
Jun. 15, 2005  (JP)  ............... 2005-174951

(51) Int. Cl.
*H04N 5/202* (2006.01)
*H04N 5/228* (2006.01)
(52) U.S. Cl. ................... 348/254; 348/222.1
(58) Field of Classification Search ........... 348/254, 348/255
See application file for complete search history.

(56) References Cited

U.S. PATENT DOCUMENTS

| | | | | |
|---|---|---|---|---|
| 6,906,747 B2* | 6/2005 | Okada | ............... | 348/254 |
| 6,965,406 B1* | 11/2005 | Ueda et al. | ............... | 348/252 |
| 7,024,036 B2* | 4/2006 | Shinbata | ............... | 348/254 |
| 7,286,167 B2* | 10/2007 | Sakamoto et al. | ........ | 348/231.6 |
| 2002/0025079 A1 | 2/2002 | Kuwata et al. | | |

FOREIGN PATENT DOCUMENTS

| | | | |
|---|---|---|---|
| JP | 10-322557 A | 12/1998 |
| JP | 11-8768 A | 1/1999 |
| JP | 2951909 B2 | 7/1999 |
| JP | 3465226 B2 | 8/2003 |
| JP | 2003-264849 A | 9/2003 |
| JP | 2003-304417 A | 10/2003 |

OTHER PUBLICATIONS

Japanese Office Action dated Feb. 23, 2010 issued in counterpart Japanese Application No. 2005-174951.

* cited by examiner

*Primary Examiner*—Luong T Nguyen
(74) *Attorney, Agent, or Firm*—Holtz, Holtz, Goodman & Chick, PC

(57) ABSTRACT

An image-acquisition apparatus is provided, including a correction-coefficient calculating unit 109 for obtaining an image signal subjected to prescribed image processing and creating, in each region, a first correction-coefficient group formed of a plurality of correction coefficients corresponding to a plurality of pixels; a correction-coefficient-group adjusting unit 110 for creating a second correction-coefficient group by adjusting the first correction-coefficient group using the image signal from an image-acquisition device or a feature of the image signal subjected to the image processing; and a grayscale converter 111 for performing grayscale conversion processing in each region using the second correction-coefficient group.

17 Claims, 31 Drawing Sheets

IMAGE-ACQUISITION APPARATUS

This application is a U.S. National Phase Application under 35 USC 371 of International Application PCT/JP2006/311756 filed Jun. 12, 2006.

TECHNICAL FIELD

The present invention concerns image-acquisition apparatuses for performing different grayscale conversion processing in each region, and more particularly relates to an image-acquisition apparatus which can reduce unnatural emphasis of a luminance gradient in uniform portions in the entire image signal.

BACKGROUND ART

Conventionally, in digital still cameras, video cameras, and so forth, in order to prevent image degradation due to cancellation errors in digital signal processing, the grayscale depth of the image signal in the input and processing systems (around 10 to 12 bits) is set to be large compared to the grayscale depth of the final output signal (normally 8 bits). In this case, it is necessary to perform grayscale conversion so as to match the grayscale depth of the output system. Generally, grayscale conversion is performed with static grayscale characteristics for a reference image scene. However, when generating an image signal having grayscale characteristics that are subjectively preferable like the human visual function, one approach that is known to be suitable is to perform different grayscale conversion in each region in the image (hereinafter called space-variant grayscale conversion).

For example, the Publication of Japanese Patent No. 2951909 discloses an example in which the image signal is divided into a plurality of regions on the basis of the luminance distribution of the input image and optimum grayscale conversion is performed for each region to match the photographic subject conditions. In addition, the Publication of Japanese Patent No. 3465226 discloses an example in which the image signal is divided into regions on the basis of texture information, and suitable grayscale conversion is performed in each region.

Patent Document 1: Publication of Japanese Patent No. 2951909.

Patent Document 2: Publication of Japanese Patent No. 3465226

DISCLOSURE OF INVENTION

With the methods disclosed in the Publication of Japanese Patent No. 2951909 and the Publication of Japanese Patent No. 3465226 described above, because space-variant grayscale conversion is performed, adequate improvement can be obtained even for scenes with a high contrast ratio.

However, in the Publication of Japanese Patent No. 2951909, grayscale conversion is performed on each region after dividing the input image into a plurality of blocks and performing region division on the basis of the average luminance of each block, but in this case, for the grayscale depth in the regions, regions whose grayscale depths are different but whose average luminances are the same are subjected to grayscale conversion on the basis of the same grayscale conversion curve. As a result, for regions which are uniform portions having minute luminance gradients in the pre-converted image and which are desired to have the same luminance gradient also after conversion, the grayscale depth increases substantially depending on the conditions, and a problem occurs whereby an image having unnatural grayscale characteristics is generated.

In addition, in the Publication of Japanese Patent No. 3465226, the input image is divided into regions on the basis of texture analysis results, and each region is subjected to grayscale conversion using a local histogram smoothing method. However, in uniform portions having a gradual luminance gradient whose grayscale depth is small in the image signal histograms in the regions, as a result of histogram smoothing, a problem occurs whereby an image having unnatural grayscale characteristics, compared with the luminance gradient before conversion, is generated.

An object of the present invention is to provide an image-acquisition apparatus that can reduce unnatural emphasis of a luminance gradient in uniform portions in the entire image signal.

A first aspect of the present invention is an image-acquisition apparatus for performing grayscale conversion processing on an image signal from an image-acquisition device, in each region in an image represented by the image signal, including an image processing part for performing image processing on the image signal from the image-acquisition device; a correction-coefficient-group calculating part for obtaining the image signal subjected to the image processing and creating, in each of the regions, a first correction-coefficient group formed of a plurality of correction coefficients corresponding to a plurality of pixels; a correction-coefficient-group adjusting part for creating a second correction-coefficient group by adjusting the first correction-coefficient group by using the image signal from the image-acquisition device or a feature of the image signal after being subjected to the image processing; and a grayscale converting part for performing grayscale conversion in each of the regions by using the second correction-coefficient group.

According to this aspect, the image signal from the image-acquisition device is input to the correction-coefficient-group calculating part after being subjected to image processing by the image processing part. In the correction-coefficient-group calculating part, on the basis of the image signal subjected to image processing, a correction coefficient involved in the grayscale conversion processing in each region, in other words a correction coefficient related to space-variant grayscale conversion processing, is calculated for each pixel in the image signal, and a first correction-coefficient group is created from these correction coefficients. Then, in the adjusting part, the first correction-coefficient group created in the correction-coefficient-group calculating part is adjusted by using the image signal from the image-acquisition device or a feature of the image signal subjected to image processing, and a second correction-coefficient group is created with the adjusted correction coefficients. Then, in the grayscale converting part, space-variant grayscale conversion processing is performed using this second correction-coefficient group.

In this way, with the image apparatus according to the first aspect of the present invention, the correction coefficients calculated on the basis of the image signal subjected to image processing are further adjusted, and space-variant grayscale conversion processing is performed using the adjusted correction coefficients. Therefore, it is possible to eliminate a phenomenon whereby the luminance gradient is unnaturally emphasized, which is conventionally observed after performing space-variant grayscale conversion processing. Thus, it is possible to obtain an image that appears natural to the eye.

A description of this invention, by specifically associating it with the embodiments described later, is as follows. Specifically, the embodiments corresponding to the first aspect are the first to third embodiments. The image processing part, which is a constituent element of this aspect, is provided with, as shown in FIG. 1 for example, a WB adjusting unit 104, an interpolation processor 105, a Y/C separator 106, and an edge-enhancement processor 107. A correction-coefficient-group calculating unit 109 shown in FIG. 1, for example, corresponds to the correction-coefficient-group calculating part. A correction-coefficient-group adjusting unit 110 and so forth shown in FIG. 1 corresponds to the correction-coefficient-group adjusting part.

A preferable example application of this invention, as shown in FIG. 1 for example, performs image processing such as WB adjustment, interpolation processing, Y/C separation, and edge-enhancement on an image signal from the image-acquisition device with the WB adjusting unit 104, the interpolation processor 105, the Y/C separator 106, and the edge-enhancement processor 107, and calculates the correction-coefficient group related to the space-variant grayscale conversion processing in units of pixels with the correction-coefficient-group calculating unit 109. Next, it is an image-acquisition apparatus for performing grayscale processing conversion processing in a grayscale converter 111 after adjusting the correction-coefficient group in the correction-coefficient-group adjusting unit 110.

The image-acquisition apparatus according to the first aspect of the present invention preferably includes a reduced-image generating part for reducing the image signal subjected to image processing with a prescribed reduction ratio to generate the reduced-image signal, wherein the first correction-coefficient group is created by using the reduced-image signal.

With this aspect, in the reduced-image generating part, the reduced-image signal with the prescribed reduction ratio is generated from the image signal subjected to image processing, and the first correction-coefficient group is created using this reduced-image signal. Accordingly, it is possible to speed up the processing.

A description of this invention, by specifically associating it with the embodiments described later, is as follows. Specifically, the embodiments corresponding to this invention are the first to third embodiments. For example, a reduced-image generator 141 shown in FIG. 5 corresponds to the reduced-image creating part which is a constituent element of this invention. The reduction ratio may be registered in advance in a prescribed recording medium provided in the image-acquisition apparatus, for example, or it may be configured so as to be capable of being freely set and changed externally.

In the first aspect of the present invention, the correction-coefficient calculating part preferably creates a reduced correction-coefficient group formed of a plurality of reduced correction coefficients corresponding to the plurality of pixels in the reduced-image signal and creates the first correction-coefficient group by subjecting the reduced correction-coefficient group to magnification processing so as to cancel out the reduction by the reduction ratio.

With this aspect, the first correction-coefficient group is created by generating, in the reduced-image generating part, the reduced-image signal with the prescribed reduction ratio from the image signal subjected to image processing; by calculating, in the correction-coefficient calculating part, the reduced correction coefficients related to the space-variant grayscale conversion processing, in units of each pixel in the reduced-image signal; and by subjecting these reduced correction coefficients to magnification processing so as to cancel out the reduction with the reduction ratio.

The image-acquisition apparatus according to the first aspect of the present invention may include, for example, a reduction-ratio setting part for setting a reduction ratio; a reduced-image generating part for reducing the image signal obtained by the image processing part on the basis of the reduction ratio to generate a reduced-image signal; a correction-coefficient calculating part for calculating a correction coefficient involved in the grayscale conversion processing in each of the regions, in units of pixels, on the basis of the reduced-image signal; a magnifying part for creating a first correction-coefficient group corresponding to the original image signal (the image signal from the image-acquisition device) by subjecting a reduced correction-coefficient group formed of a plurality of correction coefficients corresponding to the reduced image to magnification processing on the basis of the reduction ratio; an adjusting part for adjusting the first correction-coefficient group obtained by the magnifying part to create a second correction-coefficient group; and a grayscale-conversion processing part for performing grayscale conversion processing using the second correction-coefficient group.

In the first aspect of the present invention, the correction-coefficient-group adjusting part preferably includes an extracting part for extracting, from the first correction-coefficient group, a correction coefficient corresponding to a target pixel and correction coefficients corresponding to neighboring pixels of the target pixel; and an adjusting part for adjusting the first correction-coefficient group by performing filter processing on the first correction-coefficient group using the correction coefficients extracted by the extracting part.

According to this aspect, in the extracting part provided in the adjusting part, correction coefficients corresponding to the target pixel and the neighboring pixels of the target pixel are extracted from the first correction-coefficient group created by the correction-coefficient calculating part, and in the adjusting part, the correction coefficients are adjusted by performing filter processing on the correction coefficients extracted by the extracting part for the first correction-coefficient group. Then, the second correction-coefficient group is created from these adjusted correction coefficients.

In the first aspect of the present invention, the correction-coefficient-group adjusting part preferably includes an extracting part for extracting, from the first correction-coefficient group, a correction coefficient corresponding to a target pixel and correction coefficients corresponding to neighboring pixels of the target pixel; and an adjusting part for adjusting the first correction-coefficient group by performing filter processing on the first correction-coefficient group using the correction coefficients extracted by the extracting part and by performing a calculation in which a weighting factor is used.

According to this aspect, in the extracting part provided in the adjusting part, correction coefficients corresponding to the target pixel and the neighboring pixels of the target pixel are extracted from the first correction-coefficient group created by the correction-coefficient calculating part, and the correction coefficients are adjusted in the adjusting part by performing filter processing on the correction coefficients extracted by the extracting part and by performing a calculation using a prescribed weighting factor. Then, the second correction-coefficient group is created from these adjusted correction coefficients.

An example of performing the filter processing described above as well as the calculation using the prescribed weighting factor is computational processing for performing smoothing processing on the first correction-coefficient group, such as filter processing on the basis of the prescribed weighting factor. Thus, it is possible to perform adjustment processing uniformly and at high speed by performing filtering processing such as smoothing processing, for instance.

A description of this aspect, by specifically associating it with the embodiments described later, is as follows. Specifically, the embodiment corresponding to this aspect is the first embodiment. For example, a correction-coefficient extracting unit 150 shown in FIG. 6 corresponds to the extracting part which is a constituent element of this aspect. Also, for example, a filter processor 154 shown in FIG. 6 corresponds to the adjusting part.

A preferable example application of this aspect is, as shown in FIG. 6 for instance, an image processing apparatus for performing filter processing, with the filter processor 154, on the correction coefficients corresponding to the target pixel and the neighboring pixels of the target pixel extracted by the correction-coefficient extraction unit 150, on the basis of a prescribed weighting factor.

In the first aspect of the present invention, the correction-coefficient-group adjusting part preferably includes a luminance-signal obtaining part for obtaining a luminance signal from the image signal subjected to the image processing; and an adjusting part for adjusting the first correction-coefficient group on the basis of the luminance signal obtained by the luminance signal obtaining part.

According to this aspect, the luminance signal is obtained, by the luminance signal obtaining part, from the image signal subjected to image processing, and the first correction-coefficient group is adjusted in the adjusting part on the basis of the luminance signal. Thus, by employing the luminance signal as a feature of the image signal and adjusting the first correction-coefficient group using this luminance signal, it is possible to put the second correction-coefficient group formed of the adjusted correction coefficients into a more preferable state. Thus, it is possible to eliminate the unnatural appearance of a luminance gradient which is caused when performing space-variant grayscale conversion processing, and therefore, it is possible to obtain a more natural image.

A description of this aspect, by specifically associating it with the embodiments described later, is as follows. Specifically, the embodiments corresponding to this aspect are the second and third embodiments. For example, an image-signal extraction unit 213 shown in FIG. 11 and an image-signal extraction unit 312 shown in FIG. 15 correspond to the luminance-signal obtaining part which is a constituent element of this aspect, and for example, a multiplication/addition processor 214 shown in FIG. 11 and a filter processor 313 shown in FIG. 15 correspond to the adjusting part.

A preferable example application of this aspect is, as shown in FIG. 11 for instance, an image processing apparatus for performing adjustment of a correction coefficient corresponding to the target pixel in the multiplication/addition processor 214, on the basis of the luminance value of the target pixel extracted by the image-signal extraction unit 213.

In the first aspect of the present invention, the adjusting part preferably adjusts the first correction-coefficient group using the luminance signal multiplied by a weighting factor.

According to this aspect, adjustment of the first correction-coefficient group is performed by the adjusting part using the luminance signal multiplied by the weighting factor.

In the first aspect of the present invention, the adjusting part preferably adjusts the first correction-coefficient group by multiplying the luminance signal, which is multiplied by the weighting factor, by the correction coefficients forming the first correction-coefficient group created by the correction-coefficient calculating part.

According to this aspect, the first correction-coefficient group is adjusted in the adjusting part by multiplying the correction coefficients forming the first correction-coefficient group created by the correction-coefficient calculating part by the luminance signal, which is multiplied by the weighting factor, and the second correction-coefficient group is created with the adjusted correction coefficients. Thus, it is possible to adjust the first correction-coefficient group by simple computational processing, namely, multiplying the luminance signal, which is multiplied by the prescribed weighting factor, by the correction coefficient, and it is thus possible to perform adjustment quickly.

A description of this aspect, by specifically associating it with the embodiments described later, is as follows. Specifically, the embodiment according to this aspect is the second embodiment. For example, in the multiplication/addition processor 214 shown in FIG. 11, the correction coefficients are adjusted by multiplying the luminance signal, which is multiplied by the weighting factor, by the correction coefficients forming the fist correction-coefficient group created by the correction-coefficient calculating part.

A preferable example application of this aspect is, as shown in FIG. 11 for instance, an image processing apparatus for performing adjustment by multiplying, in the multiplication/addition processor 214, the product of the luminance value of the target pixel and the prescribed weighting by the correction coefficient corresponding to the target pixel.

In the first aspect of the present invention, the adjusting part preferably adjusts the first correction-coefficient group by adding the luminance signal which is multiplied by the weighting factor to the correction coefficients forming the first correction-coefficient group created by the correction-coefficient calculating part.

According to this aspect, the first correction-coefficient group is adjusted in the adjusting part by adding the luminance signal, which is multiplied by the weighting factor, to the correction coefficients forming the first correction-coefficient group created by the correction-coefficient calculating part, and the second correction coefficient-group is created by the adjusted correction coefficients. Thus, it is possible to adjust the first correction-coefficient group by simple computational processing, namely, by adding the luminance signal that is multiplied by the prescribed weighting factor to the correction coefficients, and it is thus possible to perform adjustment quickly.

A description of this aspect, by specifically associating it with the embodiments described later, is as follows. Specifically, the embodiment corresponding to this invention is the second embodiment. For example, in the multiplication/addition processor 214 shown in FIG. 11, the correction coefficients are adjusted by adding the luminance signal, which is multiplied by the weighting factor, to the correction coefficients forming the first correction-coefficient group created by the correction-coefficient calculating unit.

A preferable example application of this invention is, as shown in FIG. 11 for instance, an image processing apparatus for performing adjustment by adding, in the multiplication/addition processor 214, the product of the prescribed weighting and the luminance value of the target pixel to the correction coefficient corresponding to the target pixel.

In the first aspect of the present invention, the image processing part preferably includes an edge-intensity calculating part for calculating an edge intensity; and an edge-enhancing part for performing edge-enhancement processing on the image signal from the image-acquisition device on the basis of the edge intensity, wherein the adjusting part sets the weighting factor on the basis of the edge-intensity calculated by the edge-intensity calculating part.

According to this aspect, the weighting factor is set on the basis of the edge-enhancement calculated during edge-enhancement processing, and adjustment of the first correction-coefficient group is performed using this weighting factor. Thus, the edge intensity calculated in the edge-enhancement processing is used again. Therefore, it is possible to perform correction coefficient processing taking the edge intensity into account, and the processing can be simplified and accelerated due to this reuse.

A description of this aspect, by specifically associating it with the embodiments described later, is as follows. Specifically, the embodiments corresponding to this aspect are the first and second embodiments. For example, a filter processor 123 shown in FIG. 2 corresponds to the edge-enhancement calculating part which is a constituent element of this invention. For example, an edge-enhancement unit 127 shown in FIG. 2 corresponds to the edge-enhancing part. For example, a weighting factor adjusting unit 153 shown in FIG. 6 or a weighting-factor adjusting unit 212 shown in FIG. 11 corresponds to setting the weighting factor.

A preferable example application of this aspect is, as shown in FIG. 2 for instance, an image processing apparatus for calculating, in the image signal, an edge intensity in the filter processor 123 and performing edge-enhancement processing on the image signal in the edge-enhancement unit 127 on the basis of the calculated edge intensity, and for adjusting the weighting factor in the weighting-factor adjusting unit 153 shown in FIG. 6 and performing adjustment processing on the correction-coefficient group from the correction-coefficient extraction unit 150 with the filter processor 154.

In the first aspect of the present invention, the image processing part preferably includes a contrast-calculating part for calculating a contrast; and the adjusting part sets the weighting factor on the basis of the contrast calculated by the contrast-calculating part.

According to this aspect, because the weighting factor is set on the basis of the contrast calculated from the image signal and adjustment of the first correction-coefficient group is performed using this weighting factor, it is possible to perform adjustment taking account of brightness differences of the image.

A description of this aspect, by specifically associating it with the embodiments described later, is as follows. Specifically, the embodiments corresponding to this invention are the first and second embodiments. For example, a contrast-calculating processor 108 shown in FIG. 1 corresponds to the contrast-calculating part which is a constituent element of this invention. Setting of the weighting factors corresponds, for example, to the weighting-factor adjusting unit 153 shown in FIG. 6 or the weighting-factor adjusting unit 212 shown in FIG. 11.

A preferable example application of this aspect is, as shown in FIG. 1 for instance, an image processing apparatus in which contrast for the image signal from the image-acquisition device is calculated in the contrast-calculating processor 108, the weighting factor is adjusted in the weighting-factor adjusting unit 153 shown in FIG. 6 on the basis of the calculated contrast, and adjustment processing in which the weighting factor is reflected is performed on the correction-coefficient group from the correction-coefficient extraction unit 150 in the filter processor 154.

In the first aspect of the present invention, the correction-coefficient-group adjusting part preferably includes a luminance-signal obtaining part for obtaining a luminance signal from the image signal subjected to the image processing; an image-signal extracting part for extracting, from the luminance signal, pixel values corresponding to a target region of prescribed size, including a target pixel and neighboring pixels of the target pixel; a correction-coefficient extracting part for extracting correction coefficients corresponding to the target region from the first correction-coefficient group created by the correction-coefficient calculating part; and an adjusting part for adjusting the correction coefficients, corresponding to the target pixels, extracted by the correction-coefficient extracting part by using a spatial distance function of the pixels in the target region extracted by the image-signal extracting part and a difference function of each pixel value forming the target region.

With this aspect, in the luminance-signal obtaining part, the luminance signal is obtained from the image signal subjected to image processing, and pixel values corresponding to a target region of prescribed size, including the target pixel and neighboring pixels of the target pixel, are extracted from the luminance signal by the image-signal extracting part. On the other hand, in the correction-coefficient extracting part, correction coefficients corresponding to the target region are extracted from the first correction-coefficient group created by the correction-coefficient calculating part. Then, the correction coefficient corresponding to the target pixel is adjusted using a spatial distance function of the pixels in the target region extracted by the image-signal extracting part and a difference function of each pixel value forming the target region (a luminance value difference function). For example, filter processing is performed on the correction coefficient corresponding to the target pixel taking into account the spatial distance of the target region and the difference of luminance values of each pixel forming the target region.

By performing adjustment in this way, it is possible to perform smoothing processing taking the edge portions into account, and it is possible to perform adjustment while keeping structural information about the edge portions. Accordingly, it is possible to make the image obtained after performing space-variant grayscale conversion processing more natural.

A description of this aspect, by specifically associating it with the embodiments described later, is as follows. Specifically, the embodiment corresponding to this aspect is the third embodiment. For example, the image-signal extraction unit 312 shown in FIG. 15 corresponds to the image-signal extracting part which is a constituent element of this invention. For example, a correction-coefficient extraction unit 310 shown in FIG. 15 corresponds to the correction-coefficient extracting part. Also, for example, the filter processor 313 shown in FIG. 15 corresponds to the adjusting part.

A preferable example application of this aspect is, as shown in FIG. 15 for instance, an image-acquisition apparatus which performs adjustment of the first correction-coefficient group by extracting, in the image-signal extraction unit 312, a target region of prescribed size formed of a target pixel and neighboring pixels; extracting, in the correction-coefficient extraction unit 310, correction coefficients corresponding to the target region; and realizing, in the filter processor 313, filter processing in which weighting is performed with a spatial distance function of the target region and a difference function of the luminance value of each pixel forming the target region, on the basis of the extracted correction coefficients.

A second aspect of the present invention is an image-acquisition apparatus for performing grayscale conversion processing on an image signal, in each region of an image represented by the image signal, including an image processing part for performing image processing on the image signal; a reduced-image generating part for reducing the image signal subjected to the image processing by a prescribed reduction ratio to generate a reduced-image signal; a correction-coefficient-group creating part for creating a reduced correction-coefficient group formed of a plurality of reduced correction coefficients corresponding to a plurality of pixels in the reduced-image signal; a correction-coefficient-group adjusting part for adjusting the reduced correction-coefficient group by using a feature of the reduced-image signal, to create an adjusted correction-coefficient group, and for creating a final correction-coefficient group corresponding to the image signal before reduction by magnifying the adjusted correction-coefficient group so as to cancel out the reduction by the reduction ratio; and a grayscale converting part for performing grayscale conversion processing in each of the regions by using the final correction-coefficient group.

According to the second aspect described above, for example, the image signal from the image-acquisition device is input to the reduced-image generating part after being subjected to image processing by the image processing part. The image signal subjected to image processing is reduced by a prescribed reduction ratio by the reduced-image generating part to be converted to a reduced-image signal, and is input to the correction-coefficient calculating part. In the correction-coefficient calculating part, on the basis of the reduced-image signal, correction coefficients involved in the grayscale conversion processing in each region, in other words, reduced correction coefficients related to the space-variant grayscale conversion processing, are calculated for the respective plurality of pixels in the reduced-image signal, and a reduced correction-coefficient group formed of these reduced correction coefficients is created. Next, in the adjusting part, the reduced correction-coefficient group created in the correction-coefficient-group calculating part is adjusted by using a feature of the reduced-image signal, and an adjusted reduced correction-coefficient group is created. Then, by magnifying this adjusted reduced correction-coefficient group so as to cancel out the reduction by the reduction ratio, the final correction-coefficient group corresponding to the image signal before reduction is created. Then, in the grayscale converting part, space-variant grayscale conversion processing is performed using this final correction-coefficient group.

Thus, with the image-acquisition apparatus according to the second aspect of the present invention, because the correction coefficients calculated on the basis of the image signal subjected to image processing are further adjusted and space-variant grayscale conversion processing is performed using the adjusted correction coefficients, it is possible to eliminate the phenomenon of the luminance gradient being unnaturally emphasized, which is observed after performing space-variant grayscale conversion processing. Thus, it is possible to obtain an image that appears natural to the eye. Furthermore, because calculation of the reduced correction coefficients and adjustment of these reduced correction coefficients are carried out using the reduced image signal, it is possible to simplify the processing, which allows the processing to be accelerated.

A description of the above-described aspect, by specifically associating it with the embodiments described later, is as follows. Specifically, the embodiments corresponding to this aspect are the fourth to sixth embodiments. For example, the WB adjusting unit 104, the interpolation processor 105, the Y/C separator 106, and the edge-enhancement processor 500 shown in FIG. 18 correspond to the image processing part which is a constituent element of this aspect. For example, a reduced-image generator 530 shown in FIG. 20 corresponds to the reduced-image generating part. For example, a correction-coefficient-group calculating unit 502 shown in FIG. 18 corresponds to the correction-coefficient calculating part. For example, a correction-coefficient-group adjusting unit 503 shown in FIG. 18 corresponds to the correction-coefficient-group adjusting part. Also, for example, the grayscale converter 111 shown in FIG. 18 corresponds to the grayscale converting part.

In a preferable example application of this aspect, as shown in FIG. 18 for instance, image processing such as WB adjustment, interpolation processing, Y/C separation, and edge-enhancement is performed on the image signal from the image-acquisition device in the WB adjusting unit 104, the interpolation processor 105, the Y/C separator 106, and the edge-enhancement processor 500, and correction coefficients related to the space-variant grayscale conversion processing are calculated in pixel units of the reduce-image signal in the correction-coefficient-group calculating unit 502. Next, it is an image-acquisition apparatus for subjecting the reduced correction-coefficient group for this reduced-image signal to adjustment in the correction-coefficient-group adjusting unit 503 to create a first correction-coefficient group, for creating a second correction-coefficient group formed of correction coefficients corresponding to the image signal before reduction, in other words, the original image signal, by magnifying the first correction-coefficient group, and for performing grayscale conversion processing using the second correction-coefficient group in the grayscale converter 111.

A third aspect of the present invention is an image-acquisition apparatus for performing grayscale conversion processing on an image signal from an image-acquisition device, independently in each region, the image-acquisition apparatus including an image processing part for performing image processing on the image signal from the image-acquisition device; a reduction-ratio setting part for setting a reduction ratio for the image signal obtained by the image processing part; a reduced-image generating part for generating a reduced-image signal on the basis of the reduction ratio set in the reduction-ratio setting part for the image signal obtained by the image processing part; a correction-coefficient calculating part for calculating a correction coefficient employed in the grayscale conversion processing in each of the regions, in units of pixels, on the basis of the reduced-image signal obtained by the reduced-image generating part; an adjusting part for adjusting a correction-coefficient group formed of the correction coefficients calculated in pixels units by the calculating part; a magnifying part for magnifying the correction-coefficient group corresponding to the reduced-image signal, so as to correspond to the image signal obtained by the image processing part, on the basis of the correction-coefficient group adjusted by the adjusting part and the reduction ratio set in the reduction-ratio setting part; and a grayscale converting part for performing grayscale conversion processing on the image signal obtained by the image processing part using the correction coefficients calculated by the magnifying part.

In the third aspect of the present invention, the correction-coefficient-group adjusting part preferably includes an extracting part for extracting, from the reduced correction-coefficient group, a correction coefficient corresponding to a target pixel and correction coefficients corresponding to neighboring pixels of the target pixel; and an adjusting part for adjusting the reduced correction-coefficient group by performing filter processing on the reduced correction-coefficient group using the correction coefficients extracted by the extracting part.

According to the above-described aspect, in the extracting part provided in the correction-coefficient-group adjusting part, correction coefficients corresponding to the target pixels and the neighboring pixels of the target pixel are extracted from the reduced correction-coefficient group created by the correction-coefficient calculating part, and the reduced correction coefficients are adjusted in the adjusting part by performing filter processing on the correction coefficients extracted by the extracting part.

The third aspect of the present invention preferably further includes an extracting part for extracting, from the reduced correction-coefficient group, a correction coefficient corresponding to a target pixel and correction coefficients corresponding to neighboring pixels of the target pixel; and an adjusting part for adjusting the reduced correction-coefficient group by performing filter processing on the reduced correction-coefficient group using the correction coefficients extracted by the extracting part and by performing a calculation in which a weighting factors is used.

According to the aspect described above, in the extracting part provided in the correction-coefficient-group adjusting part, correction coefficients corresponding to the target pixel and the neighboring pixels of the target pixel are extracted from the reduced correction-coefficient group created by the correction-coefficient calculating part, and the correction coefficients are adjusted in the adjusting part by performing filter processing on the correction coefficients extracted by the extracting part and by performing a calculation using a prescribed weighting factor.

An example of the above-mentioned calculation using the prescribed weighting factor is computational processing for performing smoothing processing, such as filter processing, on the reduced correction-coefficient group on the basis of the prescribed weighting factor. By performing filtering processing such as this kind of smoothing processing, it is possible to perform adjustment processing uniformly and rapidly.

A description of this aspect, by specifically associating it with the embodiments described later, is as follows. Specifically, the embodiment corresponding to this aspect is the fourth embodiment. For example, a correction-coefficient extraction unit 540 shown in FIG. 21 corresponds to the extracting part which is a constituent element of this aspect. Also, for example, a filter processor 542 shown in FIG. 21 corresponds to the adjusting part.

A preferable example application of this aspect is, as shown in FIG. 21 for instance, an image-acquisition apparatus for performing filter processing, in the filter processor 542, on correction coefficients corresponding to the target pixel and neighboring pixels of the target pixel, extracted by the correction-coefficient extraction unit 540, on the basis of a prescribed weighting factor.

In the third aspect of the present invention, the correction-coefficient-group adjusting part preferably includes a luminance-signal obtaining part for obtaining a luminance signal from the reduced-image signal; and an adjusting part for adjusting the reduced correction-coefficient group on the basis of the luminance signal obtained by the luminance-signal obtaining part.

According to this aspect, the luminance signal is obtained from the reduced-image signal by the luminance-signal obtaining part, and the reduced correction-coefficient group is adjusted in the adjusting part on the basis of this luminance signal. Thus, it is possible for the adjusted correction coefficients to be put in a more preferable state by employing the luminance signal as a feature of the image signal and adjusting the reduced correction-coefficient group using this luminance signal. Accordingly, it is possible to eliminate an unnatural appearance in the luminance gradient, which is conventionally caused when performing space-variant grayscale conversion processing, and therefore, it is possible to obtain a more natural image.

A description of this aspect, by specifically associating it with the embodiments described later, is as follows. Specifically, the embodiments corresponding to this invention are the fifth and sixth embodiments. For example, an image-signal extraction unit 611 shown in FIG. 25 and an image-signal extraction unit 711 shown in FIG. 29 correspond to the luminance-signal obtaining part which is a constituent element of this invention. Also, for example, a multiplication/addition processor 613 shown in FIG. 25 and a filter processor 713 shown in FIG. 29 correspond to the adjusting part.

A preferable example application of this aspect is, as shown in FIG. 25 for instance, an image-acquisition apparatus for performing adjustment of a correction coefficient corresponding to the target pixel with the multiplication/addition processor 214 on the basis of the luminance value of the target pixel extracted by the image-signal extraction unit 611.

In the third aspect of the present invention, the adjusting part preferably adjusts the reduced correction-coefficient group using the luminance signal multiplied by a weighting factor.

According to this aspect, adjustment of the reduced correction-coefficient group is performed in the adjusting part using the luminance signal multiplied by the weighting factor.

In the third aspect of the present invention, the adjusting part preferably adjusts the reduced correction-coefficient group by multiplying correction coefficients forming the reduced correction-coefficient group created by the correction-coefficient calculating part by the luminance signal multiplied by a weighting factor.

According to this aspect, the reduced correction coefficients are adjusted in the adjusting part by multiplying the luminance signal, which is multiplied by the weighting factor, by the correction coefficients forming the reduced correction-coefficient group created by the correction-coefficient calculating part, and the first correction-coefficient group is created from the adjusted correction coefficients. Thus, because it is possible to adjust the reduced correction-coefficient group with simple computational processing, namely multiplying the luminance signal, which is multiplied by a prescribed weighting factor, by the correction coefficients, the adjustment can be carried out rapidly.

A description of this aspect, by specifically associating it with the embodiments described later, is as follows. Specifically, the embodiment corresponding to this aspect is the fifth embodiment. For example, in a multiplication/addition processor 613 shown in FIG. 25, the correction coefficients are adjusted by multiplying the luminance signal, which is multiplied by the weighting factor, by the correction coefficients forming the reduced correction-coefficient group created by the correction-coefficient calculating part.

A preferable example application of this aspect is, as shown in FIG. 25 for instance, an image-acquisition apparatus for performing adjustment by multiplying the product of the luminance value of the target pixel and the prescribed weighting by the correction coefficient corresponding to the target pixel in the multiplication/addition processor 613.

In the third aspect of the present invention, the adjusting part preferably adjusts the reduced correction-coefficient group by adding the luminance signal, which is multiplied by a weighting factor, to the correction coefficients forming the reduced correction-coefficient group created by the correction-coefficient calculating part.

According to this aspect, the reduced correction-coefficient group is adjusted in the adjusting part by adding the luminance signal, which is multiplied by the weighting factor, to the correction coefficients forming the reduced correction-coefficient group created by the correction-coefficient calculating part, and the first correction-coefficient group is created from the adjusted reduced correction coefficients. Thus, because it is possible to adjust the reduced correction-coefficient group with simple computational processing, namely, adding the luminance signal which is multiplied by the prescribed weighting factor to the reduced correction coefficients, the adjustment can be carried out rapidly.

A description of this aspect, by specifically associating it with the embodiments described later, is as follows. Specifically, the embodiment corresponding to this aspect is the fifth embodiment. For example, in the multiplication/addition processor 613 shown in FIG. 25, the correction coefficients are adjusted by adding the luminance signal, which is multiplied by the weighting factor, to the correction coefficients forming the reduced correction-coefficient group created by the correction-coefficient calculating part.

A preferable example application of this aspect is, as shown in FIG. 25 for instance, an image-acquisition apparatus for performing adjustment by adding the product of the luminance value of the target pixel and the prescribed weighting to the correction coefficient corresponding to the target pixel in the multiplication/addition processor 613.

In the third aspect of the present invention, the correction-coefficient-group adjusting part preferably includes a luminance-signal obtaining part for obtaining a luminance signal from the reduced-image signal; an image-signal extracting part for extracting, from the luminance signal, pixel values corresponding to a target region of prescribed size, including a target pixel and neighboring pixels of the target pixel; a correction-coefficient extracting part for extracting correction coefficients corresponding to the target region from the reduced correction-coefficient group created by the correction-coefficient calculating part; and an adjusting part for adjusting the correction coefficient corresponding to the target pixels, extracted by the correction-coefficient extracting part, by using a spatial distance function of the pixels in the target region extracted by the image-signal extracting part and a difference function of each pixel value forming the target region.

According to this aspect, the luminance signal is obtained from the reduced-image signal in the luminance-signal obtaining part, and in the image-signal extracting part, the pixel values corresponding to the target region of prescribed size, including the target pixel and neighboring pixels of the target pixel, are extracted from the luminance signal. On the other hand, in the correction-coefficient extracting part, the correction coefficients corresponding to the target region are extracted from the reduced correction-coefficient group created by the correction-coefficient calculating part. Then, the correction coefficient corresponding to the target pixel is adjusted using a spatial distance function of the pixels in the target region extracted by the image-signal extracting part and a difference function of each pixel value forming the target region (luminance value difference function). For example, the correction coefficient corresponding to the target pixel is subjected to filter processing taking into account the spatial distance of the target region and the difference of the luminance value of each pixel forming the target region.

By performing such adjustment, it is possible to perform smoothing processing taking edge portions into account, and it is thus possible to perform adjustment while keeping structural information about the edge portions.

A description of this aspect, by specifically associating it with the embodiments described later, is as follows. Specifically, the embodiment corresponding to this aspect is the sixth embodiment. For example, the image-signal extraction unit 711 shown in FIG. 29 corresponds to the image-signal extracting part which is a constituent element of this aspect. For example, a correction-coefficient extraction unit 710 shown in FIG. 29 corresponds to the correction-coefficient extracting part. Also, for example, a filter processor 713 shown in FIG. 29 corresponds to the adjusting part.

A preferable example application of this aspect is, as shown in FIG. 29 for instance, an image-acquisition apparatus for performing adjustment of the first correction-coefficient group by extracting, in the image-signal extraction unit 711, a target region of prescribed size, formed of a target pixel and neighboring pixels; extracting, in the correction-coefficient extraction unit 710, correction coefficients corresponding to the target region; and realizing, in the filter processor 713, filter processing in which weighting is performed with a spatial distance function of the target region and a difference function of the luminance value of each pixel forming the target region, on the basis of the extracted correction coefficients.

In the above description, the constituent elements of the invention are associated with the actual constituent elements in the embodiments; however, these are merely to illustrate examples and should not be construed to limit the interpretation of this invention at all.

A fourth aspect of the present invention is an image processing program for executing grayscale conversion processing on an image signal from an image-acquisition device, in each region of an image represented by the image signal, the image processing program causing a computer to execute: a first step of performing image processing on the image signal from the image-acquisition device; a second step of obtaining the image signal subjected to the image processing and creating, in each of the regions, a first correction-coefficient group formed of a plurality of correction coefficients corresponding to a plurality of pixels; a third step of creating a second correction-coefficient group by adjusting the first correction-coefficient group using the image signal from the image-acquisition device or a feature of the image signal subjected to the image processing; and a fourth step of performing grayscale conversion processing in each of the regions using the second correction-coefficient group.

In the fourth aspect of the present invention, the second step preferably includes a step of reducing the image signal subjected to the image processing by a prescribed reduction ratio to generate a reduced-image signal; and a step of creating the first correction-coefficient group using the reduced-image signal.

In the fourth aspect of the present invention, the third step preferably includes a step of extracting, from the first correction-coefficient group, a correction coefficient corresponding to a target pixel and correction coefficients corresponding to neighboring pixels of the target pixel; and a step of adjusting the first correction-coefficient group by performing filter processing on the first correction-coefficient group using the extracted correction coefficients and by performing a calculation in which a weighting factor is used.

In the fourth aspect of the present invention, the third step preferably includes a step of extracting, from the first correction-coefficient group, a correction coefficient corresponding to a target pixel and correction coefficients corresponding to neighboring pixels of the target pixel; and a step of adjusting the first correction-coefficient group by performing filter processing on the first correction-coefficient group using the extracted correction coefficients and by performing a calculation in which a weighting factor is used.

In the fourth aspect of the present invention, the third step preferably includes a step of obtaining a luminance signal from the image signal subjected to the image processing; and a step of adjusting the first correction-coefficient group on the basis of the obtained luminance signal.

A fifth aspect of the present invention is an image processing program for executing grayscale conversion processing on an image signal, in each region of an image represented by the image signal, the image processing program causing a computer to execute: a first step of performing image processing on the image signal; a second step of reducing the image signal subjected to the image processing by a prescribed reduction ratio to generate a reduced-image signal; a third step of creating a reduced correction-coefficient group formed of a plurality of reduced correction coefficients corresponding to a plurality of pixels in the reduced-image signal; a fourth step of adjusting the reduced correction-coefficient group, using a feature of the reduced-image signal, to create an adjusted correction-coefficient group and creating a final correction-coefficient group corresponding to the image signal before reduction by magnifying the adjusted correction-coefficient group so as to cancel out the reduction by the reduction ratio; and a fifth step of performing grayscale conversion processing on each of the regions using the final correction-coefficient group.

In the fifth aspect of the present invention, the fourth step preferably includes a step of extracting, from the reduced correction-coefficient group, a correction coefficient corresponding to a target pixel and correction coefficients corresponding to neighboring pixels of the target pixel; and a step of adjusting the reduced correction-coefficient group by performing filter processing on the reduced correction-coefficient group using the extracted correction coefficients.

In the fifth aspect of the present invention, the fourth step preferably includes a step of extracting, from the reduced correction-coefficient group, a correction coefficient corresponding to a target pixel and correction coefficients corresponding to neighboring pixels of the target pixel; and a step of adjusting the reduced correction-coefficient group by performing filter processing on the reduced correction-coefficient group using the extracted correction coefficients and by performing a calculation in which a weighting factor is used.

In the fifth aspect of the present invention, the fourth step preferably includes a step of obtaining a luminance signal from the reduced-image signal; and a step of adjusting the reduced correction-coefficient group on the basis of the obtained luminance signal.

The present invention affords an advantage in that it is possible to reduce unnatural emphasis of a luminance gradient in an entire image signal.

BEST MODE FOR CARRYING OUT THE INVENTION

Embodiments in which an image-acquisition apparatus according to the present invention is applied to a digital still camera will be described below with reference to the drawings.

First Embodiment

Figure 1:
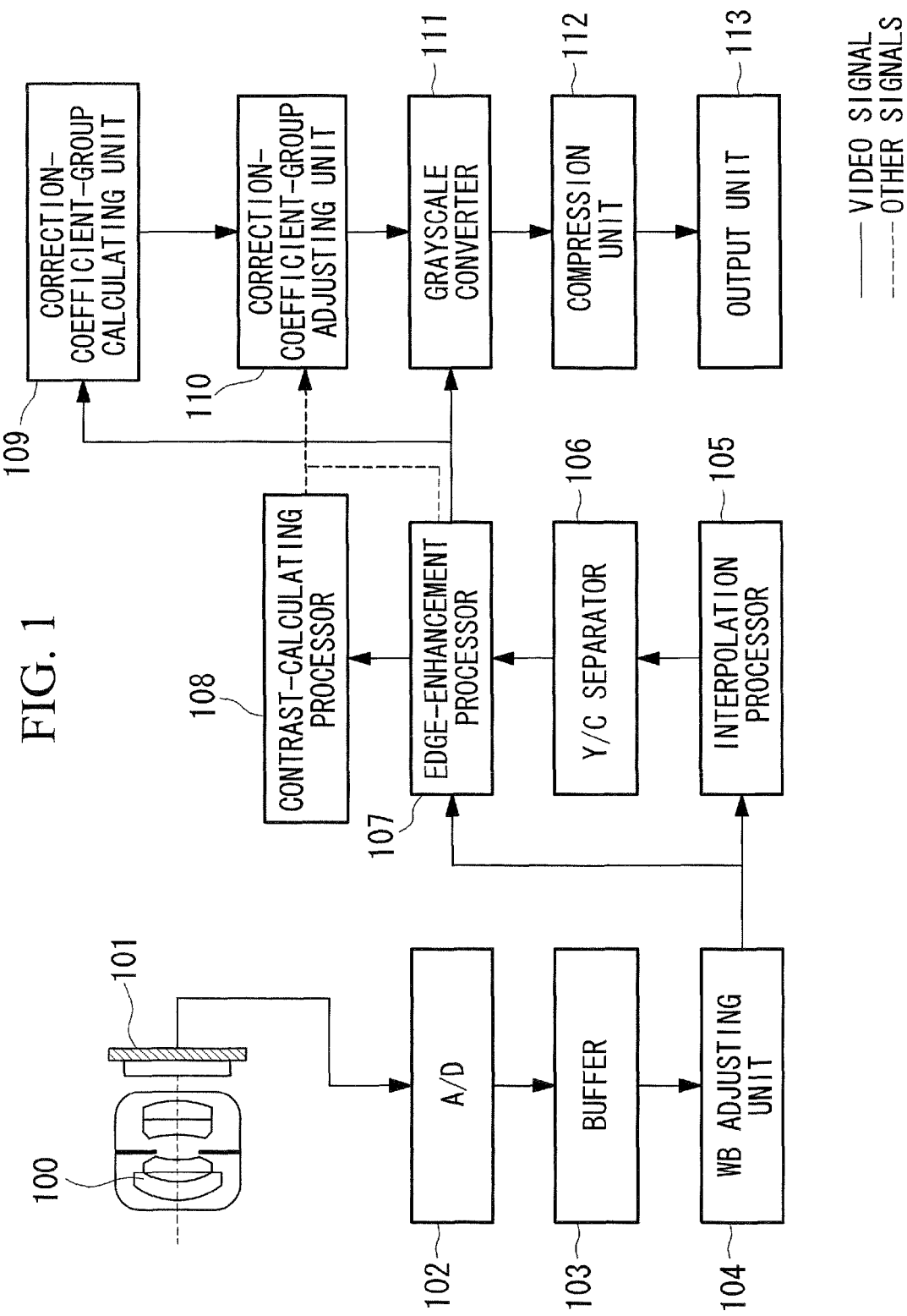
FIG. 1 is a block diagram showing, in outline, the configuration of a digital still camera according to a first embodiment of the present invention.

FIG. 1 is a block diagram showing an example configuration of a digital still camera according to a first embodiment of the present invention. As shown in FIG. 1, the digital still camera according to this embodiment is formed of a lens system 100, a CCD 101, an A/D converter 102, a buffer 103, a WB adjusting unit 104, an interpolation processor 105, a Y/C separator 106, an edge-enhancement processor 107, a contrast-calculating processor 108, a correction-coefficient-group calculating unit 109, a correction-coefficient-group adjusting unit 110, a grayscale converter 111, a compression unit 112, and an output unit 113.

In FIG. 1, the lens system 100 and the CCD 101 are arranged along the optical axis. The output signal from the CCD 101 is transferred to the A/D converter 102. The output signal from the A/D converter 102 is transferred to the WB adjusting unit 104 via the buffer 103. The output signal from the WB adjusting unit 104 is transferred to the edge-enhancement processor 107 and the interpolation processor 105. The output signal from the interpolation processor 105 is transferred to the Y/C separator 106. The output signal from the Y/C separator 106 is transferred to the edge-enhancement processor 107. The output signal from the edge-enhancement processor 107 is transferred to the contrast-calculating processor 108, the correction-coefficient-group calculating unit 109, the correction-coefficient-group adjusting unit 110, and the grayscale converter 111. The output signals from the contrast-calculating processor 108 and the correction-coefficient-group calculating unit 109 are transferred to the correction-coefficient-group adjusting unit 110. The output signal from the correction-coefficient-group adjusting unit 110 is transferred to the grayscale converter 111. The output signal from the grayscale converter 111 is transferred to the compression unit 112. The output signal from the compression unit 112 is transferred to the output unit 113, such as a memory card.

Next, the flow of the signals described above is described in more detail.

In FIG. 1, first, after setting image-capturing conditions, such as the ISO sensitivity, via an external interface which is not shown in the drawing, a subject image formed by the lens system 100 is converted from an optical subject to an electrical signal by the CCD 101 and is output as an analog signal. In this embodiment, the CCD 101 is assumed to be a single CCD in which Bayer-type primary-color filters are disposed on the front surface. The analog signal is converted to a digital signal by the A/D converter 102 and is transferred to the buffer 103. The A/D converter 102 in this embodiment is assumed to be a device that converts to a digital signal with 8-bit grayscale.

The image signal in the buffer 103 is transferred to the WB adjusting unit 104. The WB adjusting unit 104 performs WB adjustment by multiplying the image signal by a predetermined WB coefficient on the basis of image-acquisition information. The WB-adjusted image signal is transferred to the interpolation processor 105 and the edge-enhancement processor 107. The interpolation processor 105 performs interpolation processing on the WB-adjusted image signal. R, G, and B color signals, after interpolation processing, are transferred to the Y/C separator 106. The Y/C separator 106 separates each color signal into a luminance signal Y and a chrominance signal C on the basis of Equation (1) below.

$$Y = 0.29900R + 0.58700G + 0.11400B$$

$$Cb = -0.16874R - 0.33126G + 0.50000B$$

$$Cr = 0.50000R - 0.41869G - 0.08131B \quad (1)$$

The luminance signal Y and the chrominance signal C separated in this way are transferred to the edge-enhancement processor 107. The edge-enhancement processor 107 extracts an edge component by performing filter processing on each R, G, and B color signal subjected to WB adjustment by the WB adjusting unit 104, and performs edge-enhancement processing by adding this edge component to the luminance signal Y from the Y/C separator 106. The edge-enhanced luminance signal Y is transferred to the contrast-calculating processor 108, the correction-coefficient-group calculating unit 109, and the grayscale converter 111, whereas the chrominance signal C is transferred to the grayscale converter 111. The edge-enhancement processor 107 calculates an edge-correcting coefficient on the basis of the extracted edge component described above and transfers this edge-correction coefficient to the correction-coefficient-group adjusting unit 110.

The contrast-calculating processor 108 calculates a contrast on the basis of the luminance signal Y from the edge-enhancement processor 107 and transfers the calculated contrast to the correction-coefficient-group adjusting unit 110.

The correction-coefficient-group calculating unit 109, with the aim of speeding up the processing, creates a reduced-image signal from the luminance signal Y for correction-coefficient calculation. The image reduction method can employ a known method. For example, a well-known downsampling technique can be used as the image reduction method. More importance may be placed on the correction-coefficient computational accuracy by canceling the reduction processing if the reduction ratio is set to unity.

Next, the correction-coefficient-group calculating unit 109 extracts a local region of predetermined size in which a target pixel is defined as the center, on the basis of the generated reduced-image signal. Then, a grayscale conversion curve is defined on the basis of a histogram of the extracted local region, and a correction coefficient for the each target pixel is obtained in grayscale conversion processing on the basis of the conversion curve.

In this embodiment, one group of correction coefficients for each target pixel in the local region obtained in this way is handled as a correction-coefficient group corresponding to each local region. The correction-coefficient-group calculating unit 109 performs magnification processing on the correction-coefficient group formed of the correction coefficients corresponding to each pixel of the reduced-image signal using a known image magnification method. At this time, the correction-coefficient-group calculating unit 109 performs magnification processing to cancel out the reduction by this reduction ratio on the basis of the reduction ratio used when the reduced signal is created. With this magnification processing, the correction-coefficient group corresponding to the image size of the luminance signal Y before reduction (original image) is calculated. In other words, the correction-coefficient group formed with the group of correction coefficients corresponding to each pixel of the original image (in this embodiment, this is hereinafter referred to as "first correction-coefficient group") by the magnification processing is calculated and stored. The first correction-coefficient group calculated in this way is transferred to the correction-coefficient-group adjusting unit 110.

The correction-coefficient-group adjusting unit 110 extracts, from the first correction-coefficient group, the correction coefficients corresponding to the pixels in the local region of the predetermined size, in which the target pixel in the original image is defined as the center, and adjusts a predetermined weighting factor on the basis of the extracted correction coefficients, the edge-correction coefficient transferred by the edge-enhancement processor 107, and the contrast transferred by the contrast-calculating processor 108. Then, it performs filter processing using the adjusted weighting factor and adjusts the correction coefficients corresponding to the target pixel. Then, the correction-coefficient-group adjusting unit 110 creates a correction-coefficient group formed with the group of adjusted correction coefficients for each target pixel (in this embodiment, this is hereinafter referred to as "second correction-coefficient group"), and transfers this second correction-coefficient group to the grayscale converter 111.

The grayscale converter 111 performs grayscale conversion processing on the luminance signal Y and the chrominance signal C transferred from the edge-enhancement processor 107 by multiplying the correction coefficients in the second correction-coefficient group transferred from the correction-coefficient-group adjusting unit 110. Here, if the signal level after grayscale conversion exceeds a certain level, the level is corrected by clipping processing so as to be contained within a certain range. The luminance signal Y and the chrominance signal C subjected to such grayscale conversion processing are transferred to the compression unit 112. After the compression unit 112 converts the grayscale-converted image signal to an RGB signal using Equation (2) below, it performs known compression processing on this RGB signal and transfers it to the output unit 113.

$R = Y + 1.40200 Cr$ $G = Y - 0.34414 Cb - 0.71414 Cr$ $B = Y + 1.77200 Cb$ \hfill (2)

The output unit 113 stores the image signal in a memory card or the like.

Next, the edge-enhancement processor 107 mentioned above will be described in detail with reference to the drawings.

Figure 2:
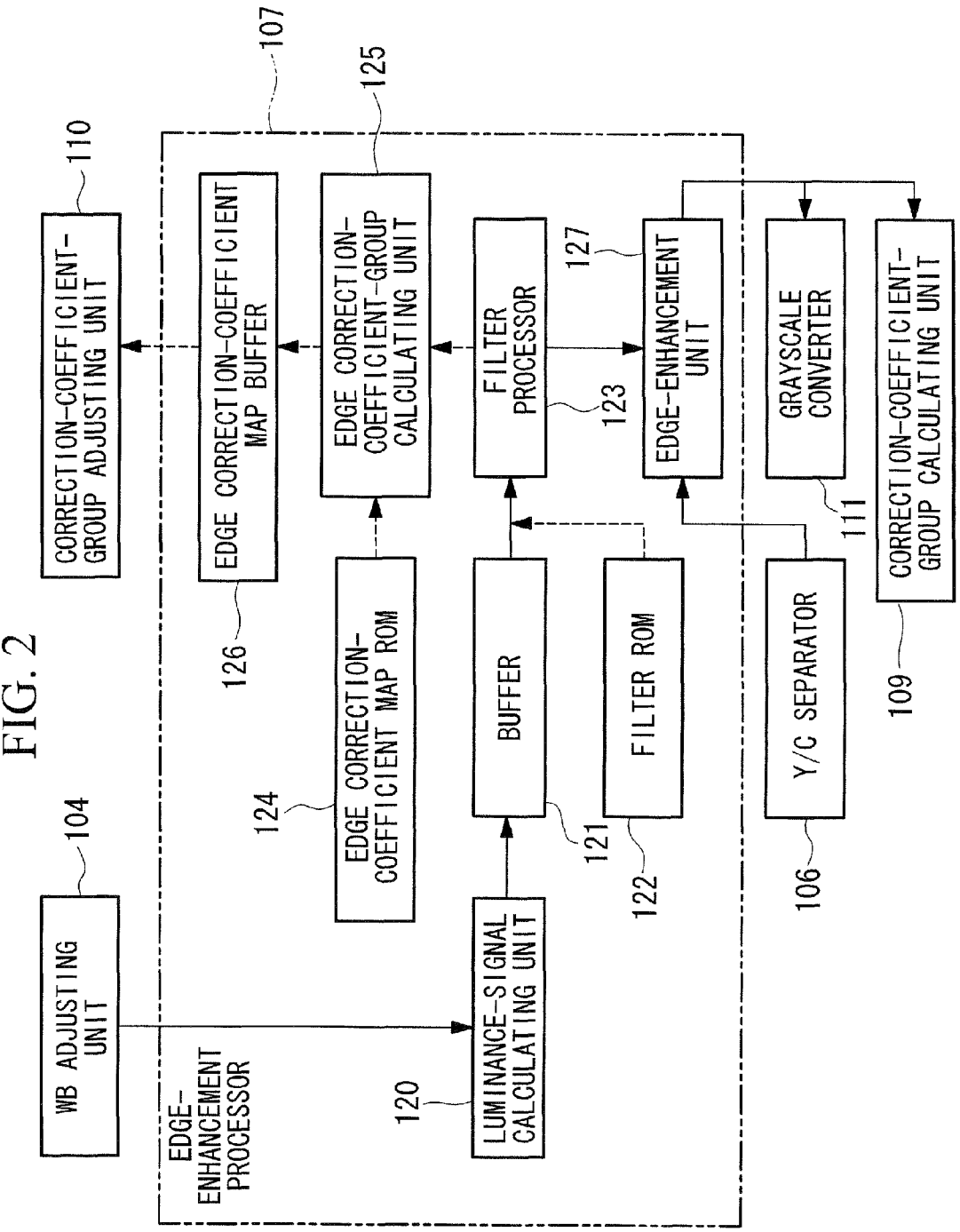
FIG. 2 is a block diagram showing, in outline, an edge-enhancement processor shown in FIG. 1.

FIG. 2 is a block diagram showing, in outline, the configuration of the edge-enhancement processor 107. As shown in this figure, it is formed of a luminance-signal calculating unit 120, a buffer 121, a filter ROM 122, a filter processor 123, an edge-correction-coefficient map ROM 124, an edge-correction-coefficient-group calculating unit 125, an edge-correction-coefficient map buffer 126, and an edge-enhancement unit 127.

In FIG. 2, the output signal from the WB adjusting unit 104 is transferred to the luminance-signal calculating unit 120 in the edge-enhancement processor 107. The output signal from the luminance-signal calculating unit 120 is transferred to the buffer 121. The output signals from the filter ROM 122 and the buffer 121 are transferred to the filter processor 123. The output signal from the filter processor 123 is transferred to the edge-correction-coefficient-group calculating unit 125 and the edge-enhancement unit 127.

The output signal from the Y/C separator 106 is transferred to the edge-enhancement unit 127. The output signal from the edge-enhancement unit 127 is transferred to the correction-coefficient-group calculating unit 109 and the grayscale converter 111. The output signal from the edge-correction-coefficient map ROM 124 is transferred to the edge-correction-coefficient-group calculating unit 125. The output signal from the edge-correction-coefficient-group calculating unit 125 is transferred to the edge-correction-coefficient map buffer 126. The output signal from the edge-correction-coefficient map buffer 126 is transferred to the correction-coefficient-group adjusting unit 110.

Details of the processing performed in each of the above units will be described more concretely below.

First, the luminance-signal calculating unit 120 reads the WB-adjusted image signal transferred from the WB adjusting unit 104 in units of pixels, calculates the luminance signal according to Equation (1) above, and transfers it to the buffer 121.

The filter processor 123 initially reads out from the filter ROM 122 a spatial filter required for known edge-component extraction and filter processing. For example, in the case of a 5×5 pixel size filter, a local region of 5×5 pixel units is read out from the buffer 121, the edge component is obtained using this spatial filter, and it is transferred to the edge-correction-coefficient-group calculating unit 125 and the edge-enhancement unit 127.

The edge-enhancement unit 127 extracts the local region of predetermined size from the luminance signal Y converted according to Equation (1) above in the Y/C separator 106 and adds the edge component from the filter processor 123 to the luminance signal Y to perform edge-enhancement processing. The edge-enhanced luminance signal Y is transferred to the correction-coefficient-group calculating unit 109 and the grayscale converter 111, and the chrominance signal C is transferred to the grayscale converter 111.

Figure 3:
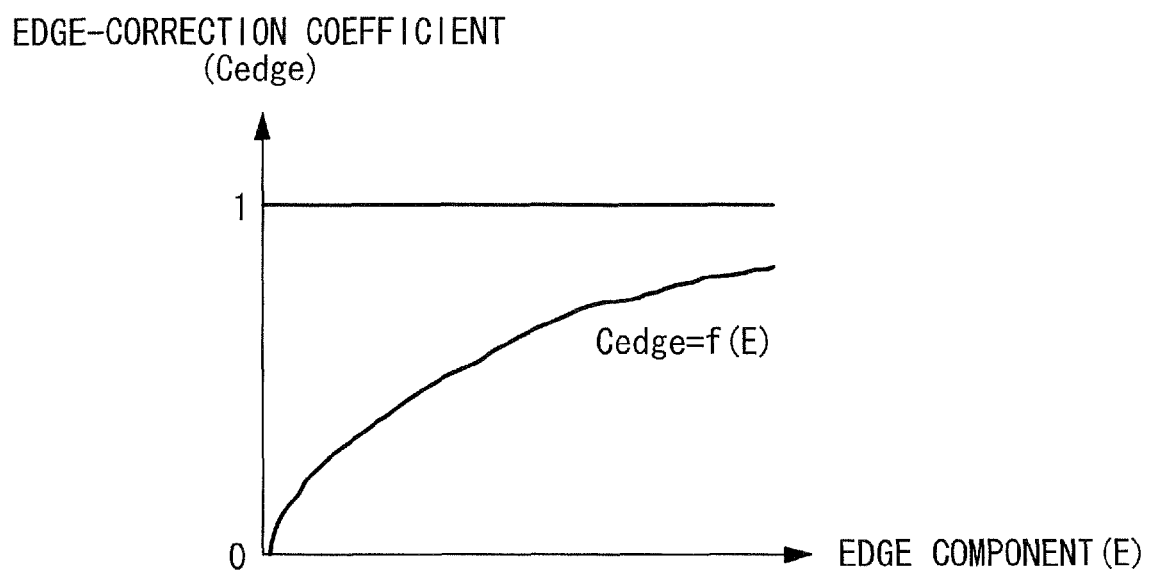
FIG. 3 is a diagram showing an example of a table relating an input edge component and an edge-correction coefficient, which is looked-up in edge-enhancement processing.

On the other hand, the edge-correction-coefficient-group calculating unit 125 first reads out a function or table for correcting the edge from the edge-correction-coefficient map ROM 124. A function or table relating the edge-correction coefficient with the input edge component, as shown in FIG. 3, is stored in the edge-correction-coefficient map ROM 124.

An edge-correction coefficient Cedge:x,y is given by Equation (3) below, where the conversion curve is f( ), the input edge component of the target pixel Px,y is Ex,y, and the edge-correction coefficient of the target pixels Px,y is Cedge:x,y.

$Cedge{:}x,y = f(Ex,y)$ \hfill (3)

The edge-correction-coefficient-group calculating unit 125 calculates the edge-correction coefficient Cedge:x,y on the basis of values of the function or table read out from the edge-correction-coefficient map ROM 124. The calculated edge-correction coefficient Cedge:x,y is transferred to the edge-correction-coefficient map buffer 126. Accordingly, the edge-correction coefficient Cedge corresponding to each pixel in the original image is stored in the edge-correction-coefficient map buffer 126 and is used in a subsequent noise-reduction processing.

Examples of the method of interpolation described above include nearest-neighbor interpolation, bilinear interpolation, bicubic interpolation, and so forth.

Next, the contrast-calculating processor 108 shown in FIG. 1 will be described in detail with reference to the drawings.

Figure 4:
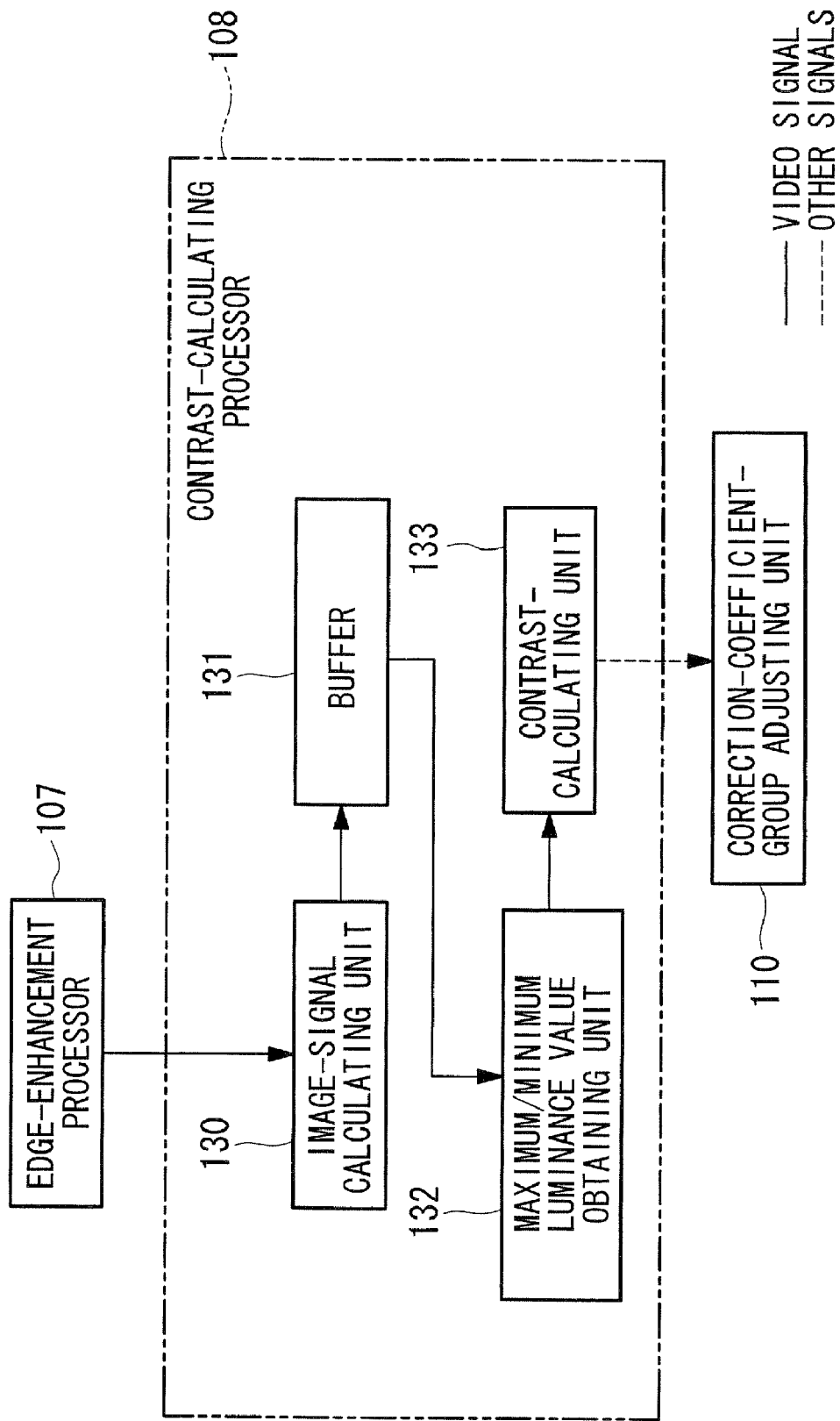
FIG. 4 is a block diagram showing, in outline, the configuration of a contrast-calculating processor shown in FIG. 1.

FIG. 4 is a block diagram showing, in outline, the configuration of the contrast-calculating processor 108. As shown in this figure, the contrast-calculating processor 108 is formed of an image-signal extraction unit 130, a maximum/minimum luminance-value obtaining unit 132, and a contrast calculating unit 133.

In FIG. 4, the output signal from the edge-enhancement processor 107 is transferred to the image-signal extraction unit 130. The output signal from the image-signal extraction unit 130 is transferred to the buffer 131. The output signal from the buffer 131 is transferred to the maximum/minimum luminance-value obtaining unit 132. The output signal from the maximum/minimum luminance-value obtaining unit 132 is transferred to the contrast-calculating unit 133. The output signal from the contrast-calculating unit 133 is transferred to the correction-coefficient-group adjusting unit 110.

Details of the processing carried out in each of the above units will be described more concretely below.

First, the image-signal extraction unit 130 reads out the edge-enhanced image signal transferred from the edge-enhancement processor 107, in other words, the luminance signal Y, in pixel units, and transfers it to the buffer 131.

The maximum/minimum luminance-value obtaining unit 132 reads out the luminance value contained in the luminance signal Y in the buffer 131, and by sequentially comparing it with the luminance values the before and after, it obtains the maximum luminance value (hereinafter referred to as "luminance maximum value Imax") and the minimum luminance value (hereinafter referred to as "luminance minimum value Imin") and transfers the obtained luminance maximum value Imax and minimum value Imin to the contrast-calculating unit 133.

The contrast-calculating unit 133 uses the obtained luminance maximum value Imax and luminance minimum value Imin to calculate the contrast Ccont in each region according to Equation (4) below. The term region used here means a region corresponding to a local region in the reduced image extracted by an extraction unit 142, which is described later.

$$Ccont=(Imax-Imin)/(Imax+Imin) \quad (4)$$

The contrast Ccont calculated in this way is transferred to the correction-coefficient-group adjusting unit 110 and is used in adjustment of the correction coefficients at a later stage.

Next, the correction-coefficient-group calculating unit 109 shown in FIG. 1 will be described with reference to the drawings.

Figure 5:
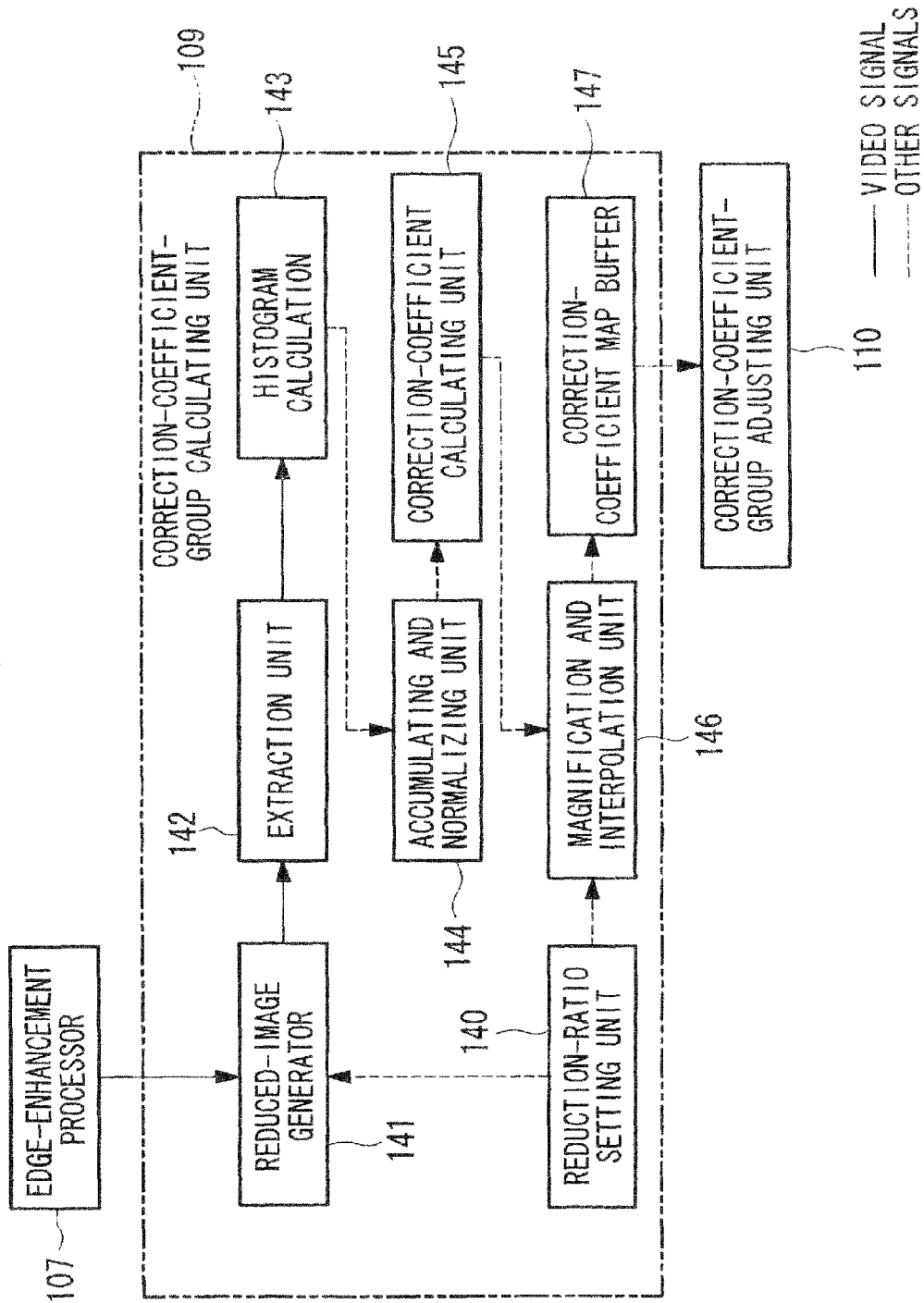
FIG. 5 is a block diagram showing, in outline, the configuration of a correction-coefficient-group calculating unit shown in FIG. 1.

FIG. 5 is a block diagram showing, in outline, the configuration of the correction-coefficient-group calculating unit 109. As shown in this figure, the correction-coefficient-group calculating unit 109 is formed of a reduction-ratio setting unit 140, a reduced-image generator 141, an extraction unit 142, a histogram calculating unit 143, an accumulating and normalizing unit 144, a correction-coefficient calculating unit 145, a magnification and interpolation unit 146, and a correction-coefficient map buffer 147.

In FIG. 5, the output signal from the edge-enhancement processor 107 is transferred to the reduced-image generator 141. The output signal from the reduced-image generator 141 is transferred to the extraction unit 142. The output signal from the extraction unit 142 is transferred to the histogram calculating unit 143. The output signal from the histogram calculating unit 143 is transferred to the accumulating and normalizing unit 144. The output signal from the accumulating and normalizing unit 144 is transferred to the correction-coefficient calculating unit 145. The output signal from the correction-coefficient calculating unit 145 is transferred to the magnification and interpolation unit 146. The output signal from the magnification and interpolation unit 146 is transferred to the correction-coefficient map buffer 147. The output signal from the reduction-ratio setting unit 140 is transferred to the reduced-image generator 141 and the magnification and interpolation unit 146.

Details of the processing performed in each of the above units will be described more concretely below.

First, the reduced-image generator 141 generates a reduced-image signal from the luminance signal Y transferred from the edge-enhancement processor 107 on the basis of the reduction ratio set by the reduction-ratio setting unit 140 and transfers the generated reduced-image signal to the extraction unit 142. In other words, the reduced-image generator 141 generates a reduced-image signal representing an image in which the size of the image represented by the luminance signal Y from the edge-enhancement processor 107 is reduced. The image reduction method uses, for example, a well-known down-sampling method.

The extraction unit 142 extracts a local-region signal from the reduced-image signal generated by the reduced-image generator and transfers it to the histogram calculating unit 143. The histogram calculating unit 143 generates a histogram for each local region and transfers them to the accumulating and normalizing unit 144. The accumulating and normalizing unit 144 generates a cumulative histogram by accumulating the histograms, normalizes it by matching it to the grayscale depth to generate a grayscale conversion curve, which it transfers to the correction-coefficient calculating unit 145. The correction-coefficient calculating unit 145 calculates correction coefficients involved in grayscale conversion for the pixels in each region on the basis of the grayscale conversion curve from the accumulating and normalizing unit 144.

The correction coefficient is given by Equation (5) below, where the to is the grayscale conversion curve, AVc is the input signal level of the target pixel, and g is the correction coefficient of each target pixel in the grayscale conversion processing.

$$g=t(AVc)/AVc \quad (5)$$

The correction coefficients g calculated in this way correspond to the pixels of the reduced image. Therefore, to associate the correction-coefficient group formed of the correction coefficients g with the pixels of the original image before reduction, the correction-coefficient calculating unit 145 transfers the correction-coefficient group formed of the calculated correction coefficients g to the magnification and interpolation unit 146.

The correction-coefficient group formed of the correction coefficients g corresponding to the target pixels in the local region can be handled in the same way as the image signal specified by the pixel value for each pixel. Therefore, it is possible to perform both magnification and reduction of the correction-coefficient group with the same method as for magnification and reduction of the image. Thus, the magnification and interpolation unit 146 performs magnification processing on the correction-coefficient group formed of the correction coefficients g by using a known image magnification method (for example, nearest neighbor interpolation, bilinear interpolation, bicubic interpolation, etc.), on the basis of the spatial positional relationship of the pixels corresponding to the correction coefficients g. At this time, the magnification and interpolation unit 146 performs magnification processing to cancel out the reduction with this reduction ratio on the basis of the reduction ratio at the time when the reduced image was created from the original image. From this magnification processing, a first correction-coefficient group formed of the correction coefficients corresponding to each pixel of the luminance signal Y before reduction (original image) is calculated.

The calculated first correction-coefficient group is transferred to and stored in the correction-coefficient map buffer 147. The first correction-coefficient group stored in the correction-coefficient map buffer 147 is adjusted at the subsequent stage in the correction-coefficient-group adjusting unit 110, and thereafter is used during grayscale conversion processing in the grayscale converter 111.

Next, the correction-coefficient-group adjusting unit 110 shown in FIG. 1 will be described more concretely with reference to the drawings.

Figure 6:
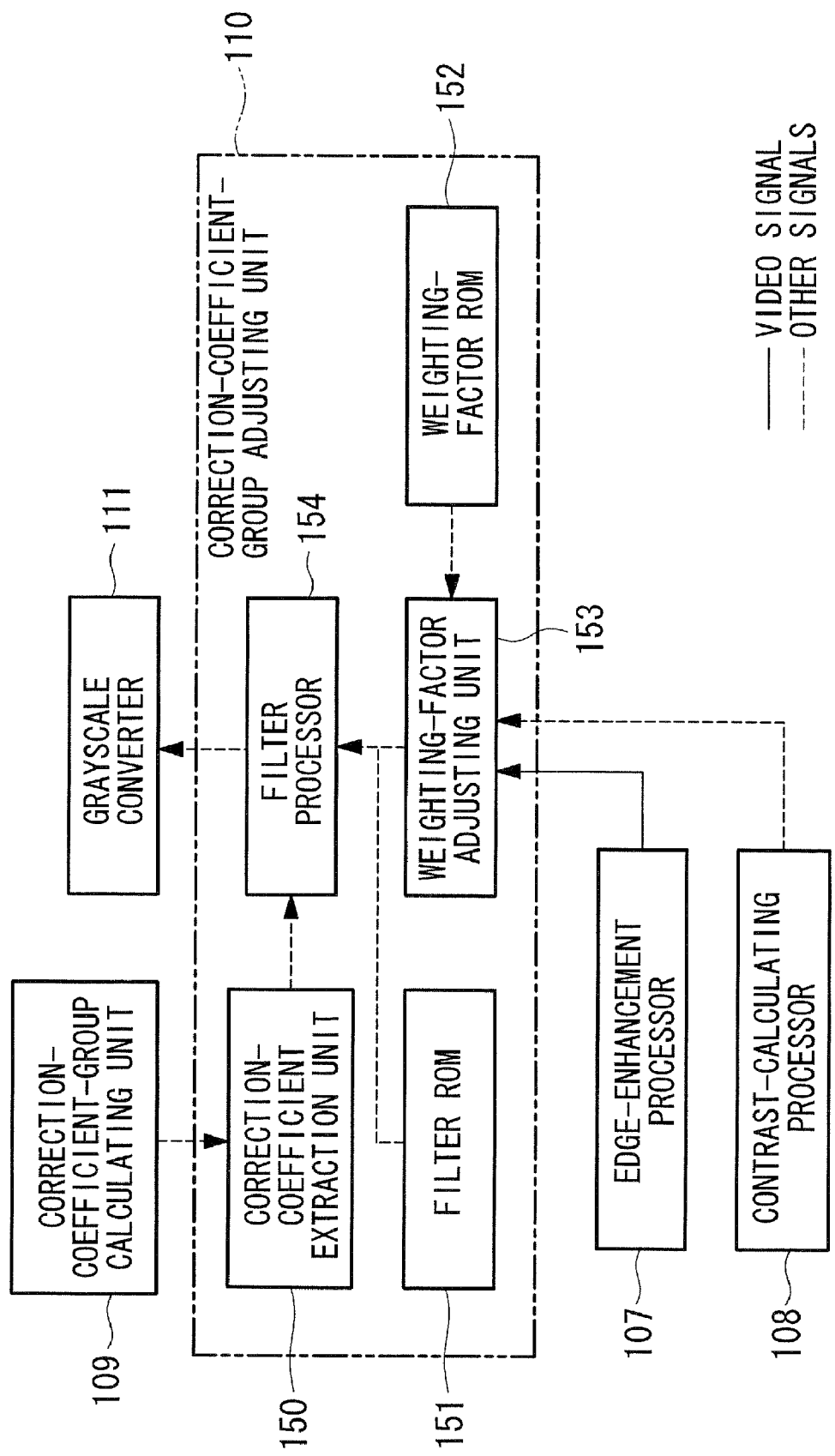
FIG. 6 is a block diagram showing, in outline, the configuration of a correction-coefficient-group adjusting unit shown in FIG. 1.

FIG. 6 is a block diagram showing, in outline, the configuration of the correction-coefficient-group adjusting unit 110. As shown in this figure, the correction-coefficient-group adjusting unit 110 is formed of a correction-coefficient extraction unit 150, a filter ROM 151, a weighting-factor ROM 152, a weighting-factor adjusting unit 153, and a filter processor 154.

In FIG. 6, the signal from the correction-coefficient-group calculating unit 109 is transferred to the correction-coefficient extraction unit 150. On the other hand, signals from the edge-enhancement processor 107 and the contrast-calculating processor 108 are transferred to the weighting-factor adjusting unit 153. The weighting-factor ROM 152 is connected to the weighting-factor adjusting unit 153. Signals from the correction-coefficient extraction unit 150 and the weighting-factor adjusting unit 153 are transferred to the filter processor 154. The filter processor 154 is connected to the filter ROM 151. The output signal from the filter processor 154 is transferred to the grayscale converter 111.

Details of the processing carried out in each of the above units will be described more concretely below.

First, the correction-coefficient extraction unit 150 reads correction coefficients corresponding to the pixels in a local region of prescribed size, including the target pixel in the original image and neighboring pixels of the target pixel, from the first correction-coefficient group formed of the correction coefficients corresponding to each pixel in the original image, which is stored in the correction-coefficient map buffer 147 (see FIG. 5) in the correction-coefficient-group calculating unit 109, and transfers them to the filter processor 154. At this time, the correction-coefficient extraction unit 150 determines the number of pixels to be read out according to the size of the filter used by the filter processor 154 in the subsequent stage. For example, if the filter size is 5×5 pixels, correction coefficients corresponding to the pixels in the local region are read out in 5×5 pixel units.

On the other hand, the weighting-factor adjusting unit 153 calculates a final weighting factor W1 on the basis of Equation (6) below by using a weighting factor Wf read out from the weighting-factor ROM 152, the edge-correction coefficient Cedge obtained by the edge-enhancement processor 107, and the contrast Ccont obtained by the contrast-calculating processor 108.

$$W1 = Wf * Cedge * Ccont \quad (6)$$

The weighting-factor adjusting unit 153 outputs the calculated weighting factor W1 to the filter processor 154.

The equation for calculating the weighting factor W1 is not limited to Equation (6) above. For example, it is possible to use another computational expression involving Wf, Cedge, and Ccont. It is also possible to use a computational expression involving only Cedge or Ccont. And, W1 may equal Wf. In addition, a plurality of Wf values may be registered in the weighting-factor ROM 152, and a value selected from them on the basis of an instruction from the user may be used.

The filter processor 154 reads out a smoothing filter, required in known smoothing filter processing, from the filter ROM 151, performs smoothing of the correction-coefficient group by performing computations on the correction coefficient from the correction-coefficient extraction unit 150 using the smoothing filter, and calculates smoothed correction coefficients corresponding to the target pixels.

Then, with the weighting factor W1 obtained from the weighting-factor adjusting unit 153 defining a mixing ratio of a correction coefficient Pnrm before smoothing and a correction coefficient Pfil after smoothing, the filter processor 154 adjusts the correction coefficients by performing the calculation according to Equation (7) below to calculate a final correction coefficient P1.

$$P1 = Pnrm * (1 - W1) + Pfil * W1 \quad (7)$$

The equation for calculating P1 is not limited to Equation (7) above; it is possible to use another expression involving Wf and Pfil.

Once the filter processor 154 calculates the correction coefficient P1 for each target pixel using Equation (7) above, a second correction-coefficient group formed of the correction coefficients P1 is output to the grayscale converter 111. The grayscale converter 111 performs grayscale conversion processing by multiplying each pixel value in the luminance signal Y and the chrominance signal C by the correction coefficient P1 obtained from the filter processor 154.

With the digital still camera according to this embodiment, as described above, the correction coefficients in the first correction-coefficient group calculated by the correction-coefficient-group calculating unit 109 are smoothed by performing filter processing in the correction-coefficient-group adjusting unit 110. Thus, a final correction coefficient is obtained for each pixel by calculation using the smoothed correction coefficient and weighting factor. The second correction-coefficient group formed of the final correction coefficients corresponding to each pixel is output to the grayscale converter 111, where it is used in grayscale conversion.

Thus, by using the smoothed correction coefficients in the grayscale conversion, it is possible to reduce unnatural emphasis in the luminance gradient in uniform portions, which occurs when performing conventional space-variant grayscale conversion processing.

In the embodiment described above, smoothing processing is performed using the smoothing filter in the filter processor 154; however, it is also possible to employ another filter processing by changing the filter settings. For example, by enhancing the slope of edges by applying a sharpening filter, it is possible to make the gradient in relatively uniform portions stand out less.

In the embodiment described above, the CCD 101 is assumed to be a single CCD in which a Bayer-type primary-color filter is disposed on the front surface; however, it is not limited to such a configuration. For example, it is possible to employ a color-difference line-sequential-type complementary-color filter and two or three CCDS.

Furthermore, in the embodiment described above, the processing is assumed to be hardware-based; however, it is not necessarily limited to such a configuration. For example, it is also possible to output the signal from the CCD 101 as unprocessed Raw data and to output the image-acquisition information, such as the ISO sensitivity, input via the external interface as header information, and to process them with separate software. The software process for signal processing is described below with reference to FIG. 7.

Figure 7:
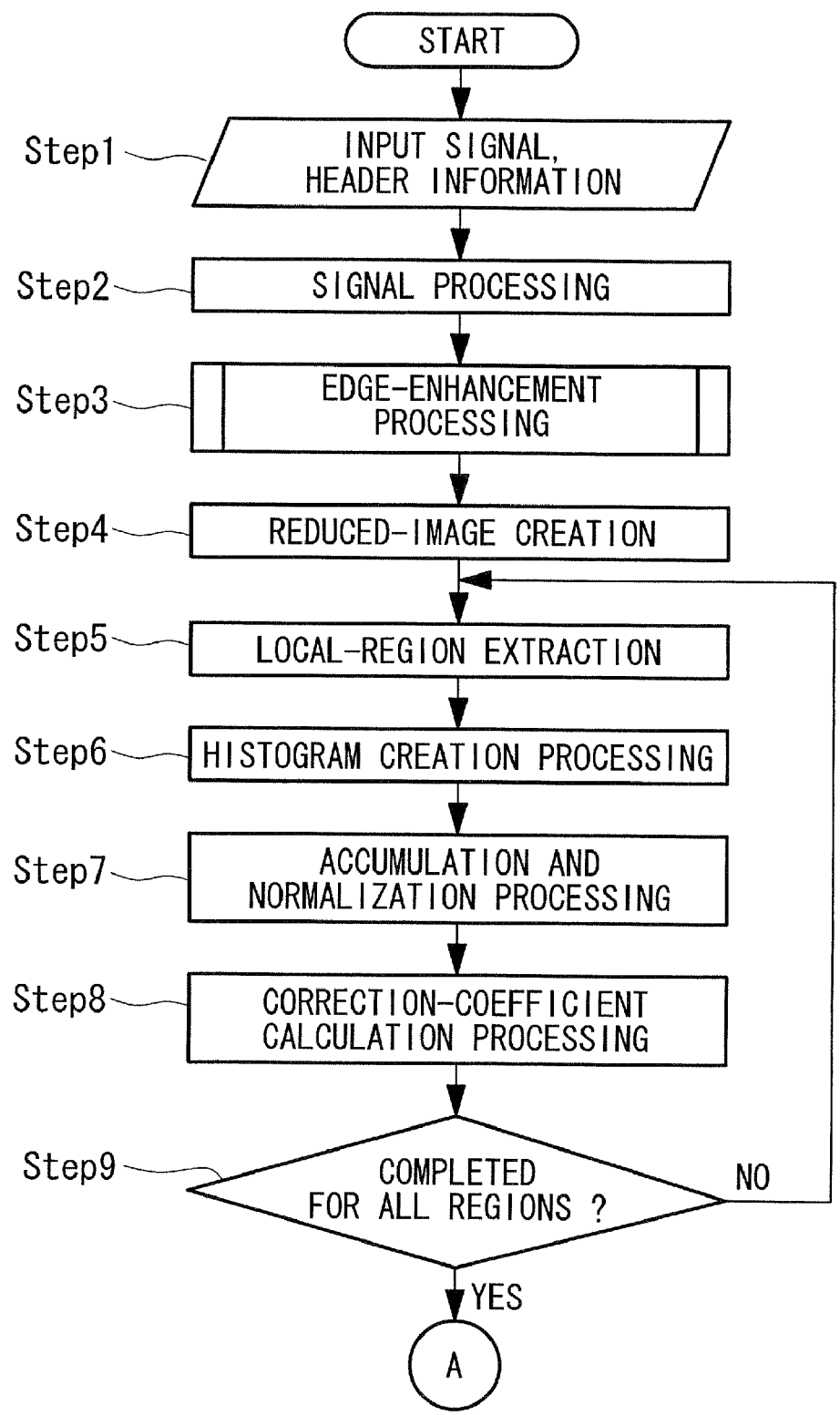
FIG. 7 is a flowchart showing a signal processing procedure realized by the digital still camera according to the first embodiment of the present invention.
Figure 8:
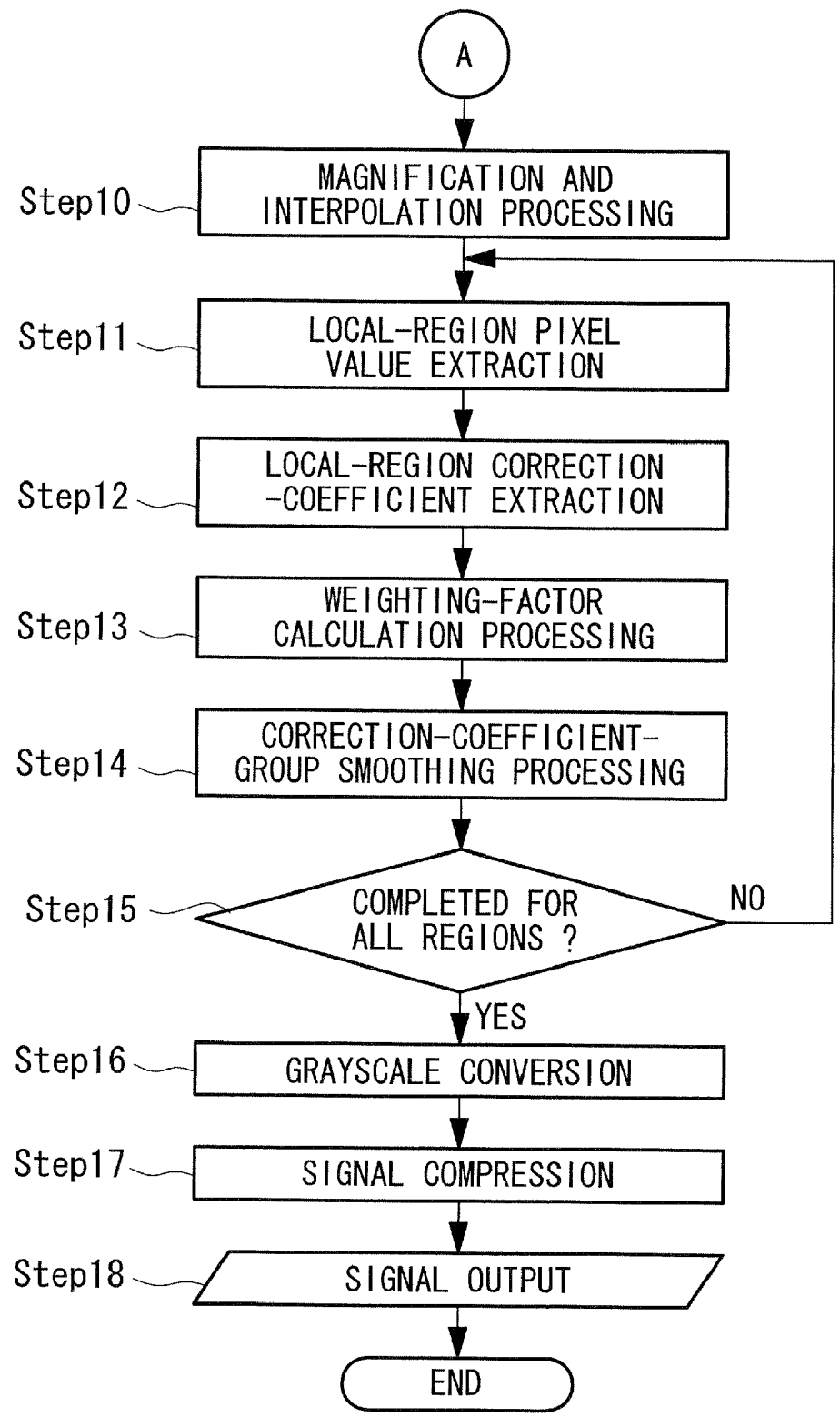
FIG. 8 is a flowchart showing the signal processing procedure realized by the digital still camera according to the first embodiment of the present invention.

FIG. 7 and FIG. 8 are flowcharts showing the processing procedure related to the software process for signal processing executed in the digital still camera according to the first embodiment of the present invention. The same processing as the above-described processing carried out by each structure shown in FIG. 1 is performed in each processing step.

In Step 1, the header information containing the image-acquisition information, such as the signal and the ISO sensitivity, is read out. In Step 2, signal processing for WB adjustment, color interpolation, Y/C separation, etc. is performed. In Step 3, edge-enhancement processing is performed, and the edge-correction coefficients and contrast are calculated. In Step 4, a reduced image for correction-coefficient calculation is created.

In Step 5, a local region of prescribed size is extracted from the reduced image created in Step 4, and in Step 6, histogram creation processing is performed. Then, in Step 7, the histograms created in Step 5 are accumulated and normalization processing is performed. In Step 8, a grayscale conversion curve is defined on the basis of the cumulative histogram, and a correction coefficient for each pixel is calculated on the basis of the created grayscale conversion curve. Then, in Step 9, it is determined whether extraction has been completed for all regions. If it is completed, the process goes to Step 10, and if is not completed, the process goes to Step 5.

In Step 10, the correction coefficients for the pixels corresponding to the original image signal are calculated and stored on the basis of the correction coefficients for the reduced-image signal. In Step 11, pixel values in a local region with a size of, for example, 5×5 pixels are extracted, and in Step 12, correction coefficients corresponding to extracted pixels in the local region are extracted in Step 11. In Step 13, weighting factors are calculated on the basis of Equations (3), (4), and (6) above. In Step 14, smoothing processing of the correction-coefficient group is performed by using the pixel values, the correction coefficients, and the weighting factors in Step 11, Step 12, and Step 13.

In Step 15, it is determined whether the extraction has been completed for all regions. If it is completed, the process goes to Step 16, and if it is not completed, the process goes to Step 11. In Step 16, the image signal edge-enhanced in Step 3 is multiplied by the correction-coefficient group. In Step 17, signal compression is performed using a known signal compression technique, and in Step 18, the processed signal is output, whereupon the process ends.

Figure 9:
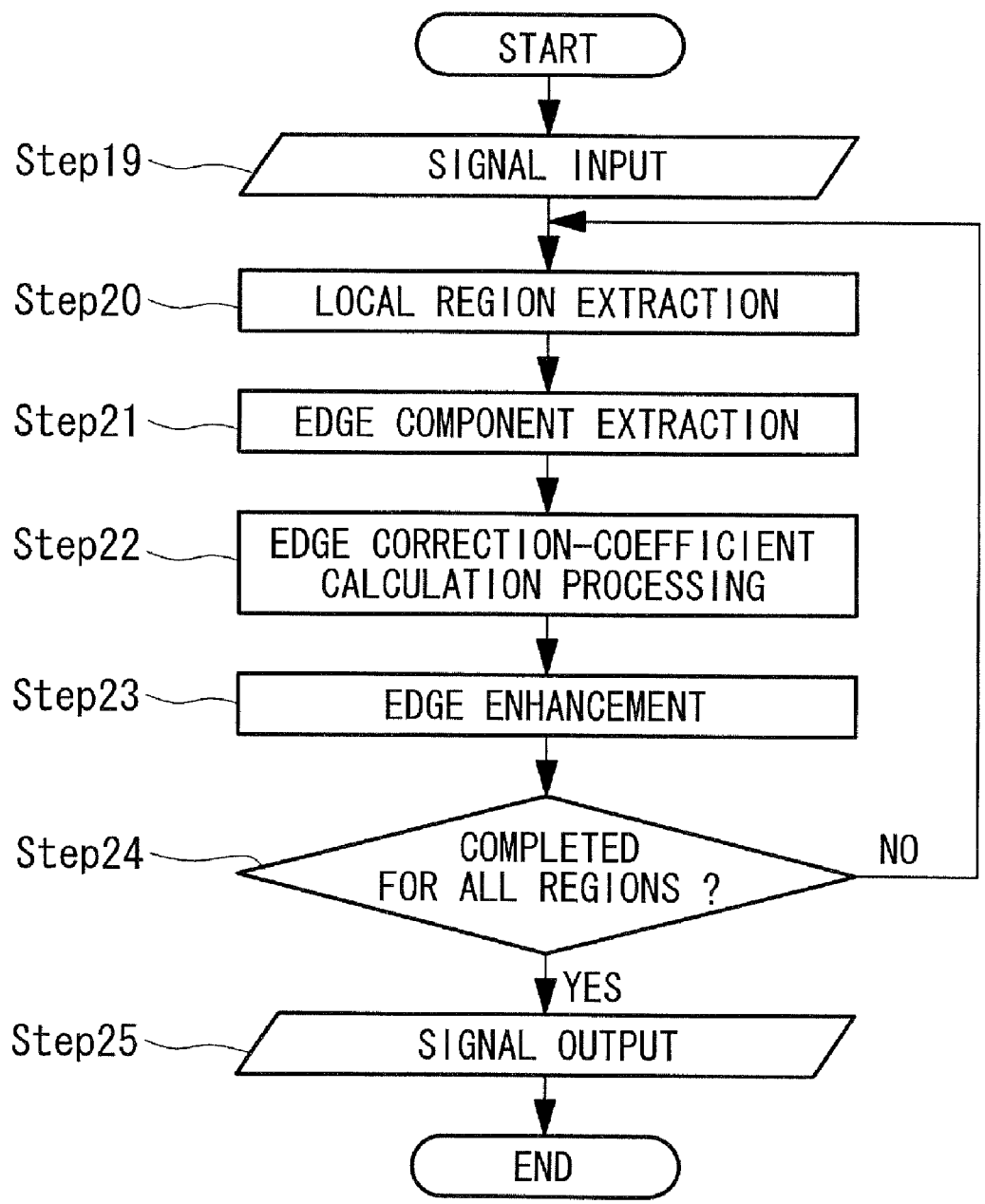
FIG. 9 is a flowchart showing an edge-enhancement processing procedure shown in FIG. 7.

FIG. 9 is a flowchart showing the processing procedure related to the edge-enhancement processing performed in Step 3 described above.

First, the image signal is transferred in Step 19. In Step 20, a local region is extracted from the image signal. In Step 21, edge components are extracted by filter processing. In Step 22, edge-correction coefficients are calculated from the edge components on the basis of Equation (3) above. In Step 23, edge-enhancement is performed on the basis of the edge components. In Step 24, it is determined whether extraction has been completed for all regions. If it is not completed, the process goes to Step 20, and if it is completed, the process goes to Step 25. In Step 25, the image signal that has been subjected to edge-enhancement processing is output, whereupon this process ends.

Second Embodiment

Next, a digital still camera according to a second embodiment of the present invention will be described with reference to the drawings.

In the first embodiment described above, when obtaining the second correction-coefficient group, which is the final correction-coefficient group, the correction coefficients P1 forming the second correction-coefficient group are calculated by multiplying the smoothed correction-coefficient group, in which the smoothing filter is applied to the original correction-coefficient group, that is, the first correction-coefficient group, and the first correction-coefficient group by the weighting factors and adding them. In contrast, in this embodiment, final correction coefficients P2 are obtained by using luminance values for the first correction-coefficient group.

For the digital still camera of this embodiment, a description of aspects that are the same as those in the first embodiment is omitted, and only the differences are described. Structures which are the same as those in the first embodiment are assigned the same names and numerals.

Figure 10:
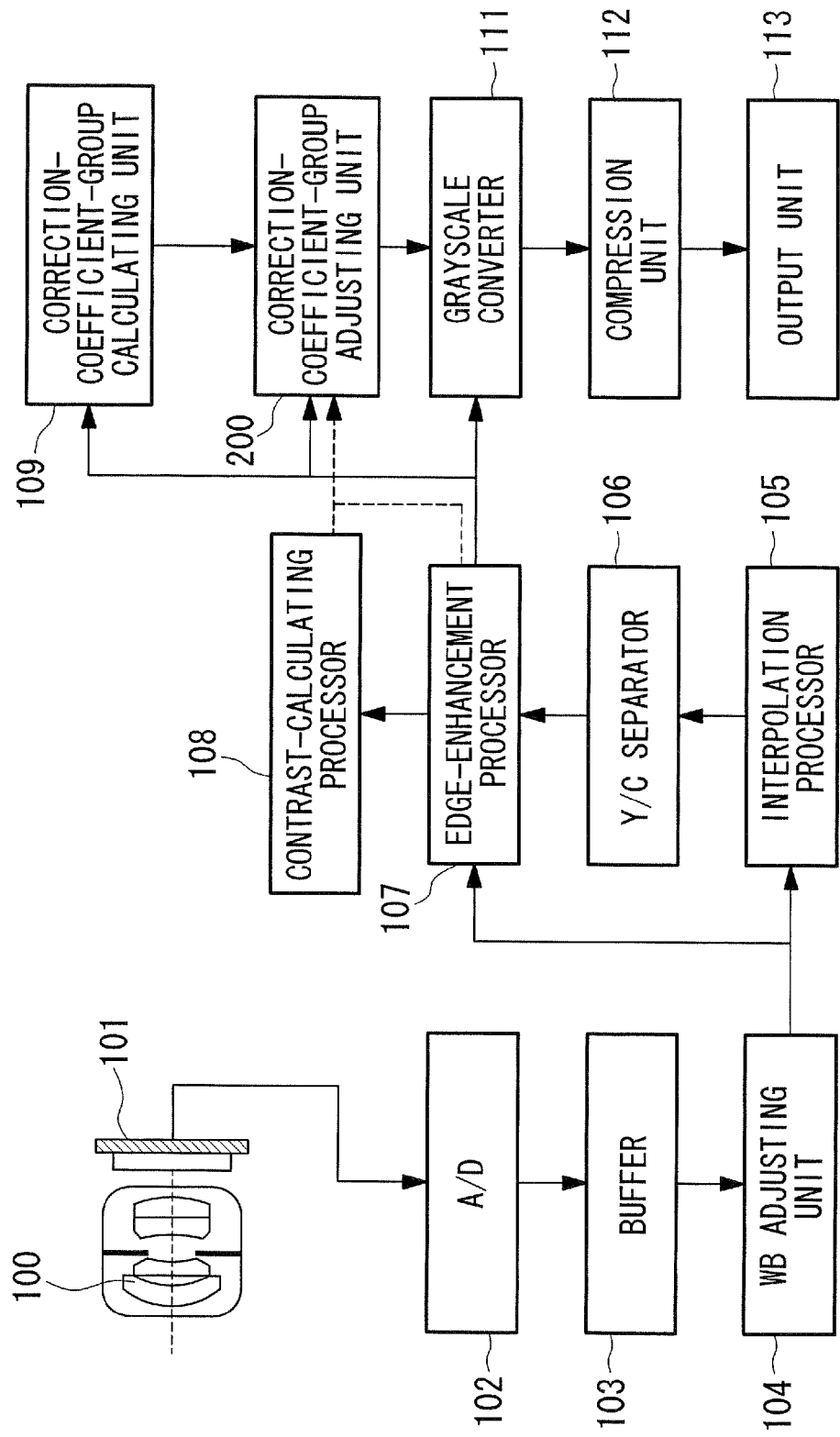
FIG. 10 is a block diagram showing, in outline, the configuration of a digital still camera according to a second embodiment of the present invention.

FIG. 10 is a block diagram showing, in outline, the configuration of the digital still camera according to the second embodiment of the present invention.

As shown in FIG. 10, the digital still camera according to this embodiment includes a correction-coefficient-group adjusting unit 200 instead of the correction-coefficient-group adjusting unit 110 shown in FIG. 1 (see FIG. 1), and is configured such that the output signal from the edge-enhancement processor 107 is transferred to the correction-coefficient-group calculating unit 109, the correction-coefficient-group adjusting unit 200, and the grayscale converter 111.

Next, the correction-coefficient-group adjusting unit 200 according to this embodiment will be described more concretely with reference to the drawings.

Figure 11:
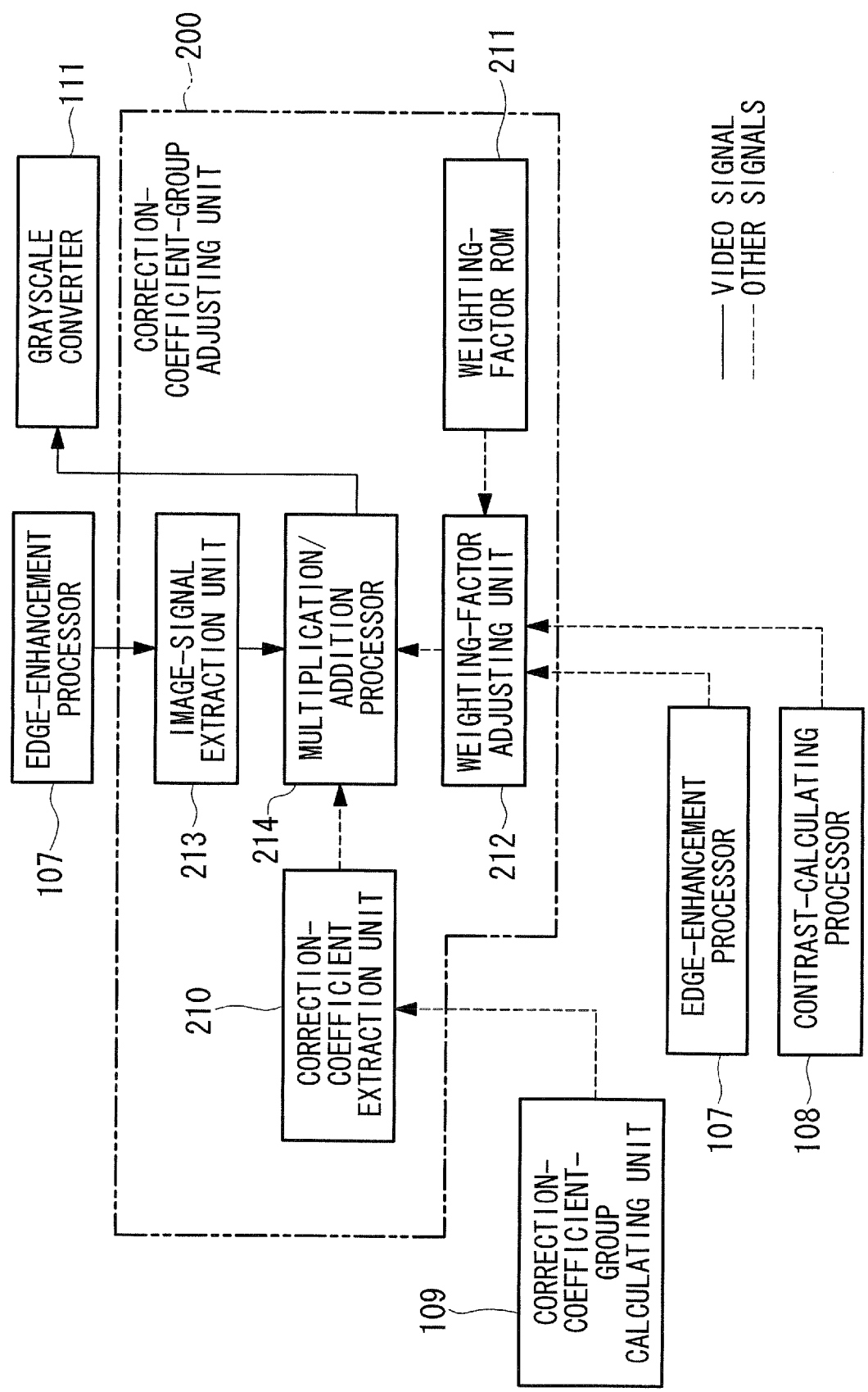
FIG. 11 is a block diagram showing, in outline, the configuration of a correction-coefficient-group adjusting unit shown in FIG. 10.

FIG. 11 is a block diagram showing, in outline, the configuration of the correction-coefficient-group adjusting unit 200 according to this embodiment. As shown in this figure, the correction-coefficient-group adjusting unit 200 is formed of a correction-coefficient extraction unit 210, a weighting-factor ROM 211, a weighting-factor adjusting unit 212, an image-signal extraction unit 213, and a multiplication/addition processor 214.

In FIG. 11, the signal from the correction-coefficient-group calculating unit 109 is transferred to the correction-coefficient extraction unit 210. The signal from the edge-enhancement processor 107 is transferred to the weighting-factor adjusting unit 212 and the image-signal extraction unit 213. The signal from the contrast-calculating processor 108 is transferred to the weighting-factor adjusting unit 212. The weighting-factor ROM 211 is connected to the weighting-factor adjusting unit 212. The outputs from the correction-coefficient extraction unit 210 and the image-signal extraction unit 213 are transferred to the multiplication/addition processor 214. The output from the multiplication/addition processor 214 is transferred to the grayscale converter 111.

Details of the processing performed in each of the above units will be described more concretely below.

The correction-coefficient extraction unit 210 reads a correction coefficient corresponding to the target pixel in the original image from a correction-coefficient group (in this embodiment, this is hereinafter referred to as "first correction coefficient group") formed of correction coefficients corresponding to each pixel in the original image stored in the correction-coefficient map buffer 147 (see FIG. 5) in the correction-coefficient-group calculating unit 109, and sends it to the multiplication/addition processor 214.

The image-signal extraction unit 213 reads out the luminance value of the target pixel from the luminance signal Y obtained from the edge-enhancement processor 107 and sends it to the multiplication/addition processor 214.

The weighting-factor adjusting unit 212 reads out a weighting factor Wab, which is stored in advance, from the weighting-factor ROM 211 and calculates a final weighting factor W2 according to Equation (8) below by using this weighting factor Wab, the edge-correction coefficient Cedge obtained from the edge-enhancement processor 107, and the contrast Ccont obtained from the contrast-calculating processor 108.

$$W2 = Wab * Cedge * Ccont \quad (8)$$

The expression for calculating the weighting factor W2 is not limited to Equation (8) above; for example, it is possible to use another computational expression involving Wab, Cedge, and Ccont. It is also possible to use a computational expression involving only Cedge or Ccont. And, W2 may equal Wab. In addition, a plurality of Wab values may be registered in the weighting-factor ROM 211 and one of these values selected on the basis of a user instruction may be used.

Once the weighting-factor adjusting unit 212 calculates the final weighting factor W2, it is transferred to the multiplication/addition processor 214.

The multiplication/addition processor 214 adjusts the correction coefficient calculated in the correction-coefficient calculating unit 109 according to Equation (9) below by using a correction coefficient Pr corresponding to the target pixel extracted by the correction-coefficient extraction unit 210, the final weighting factor W2 obtained from the weighting-factor adjusting unit 212, and the luminance value L of the target pixel extracted by the image-signal extraction unit 213, and calculates the final correction coefficient P2.

$$P2 = Pr * W2 * Lp \quad (9)$$

Here, for W2 in Equation (9), a suitable upper limit and lower limit are set and clipped.

The correction-coefficient group formed of the correction coefficients P2 calculated in the multiplication/addition processor 214 (hereinafter referred to as "second correction-coefficient group" in this embodiment) is transferred to the grayscale converter 111, and the grayscale conversion processing is realized by multiplying the luminance signal Y and the chrominance signal C thereby.

The correction coefficient P2 described above may be obtained by adding the product of the luminance value Lp of the target pixel and the final weighting factor W2 to the correction coefficient Pr corresponding to the target pixel, as shown in Equation (10) below.

$$P2 = Pr + W2 * Lp \quad (10)$$

The expression for calculating P2 is not limited to Equation (9) and Equation (10) above; it is possible to use another computational expression involving Pr, W2, and Lp. In addition, instead of the luminance value Lp, it is possible to use various image values, called a shading value, a grayscale value, or an intensity value.

With the digital still camera according to this embodiment, as described above, the correction coefficient is adjusted in the correction-coefficient-group adjusting unit 200 by performing calculations (multiplication, addition, etc.) using the correction coefficients in the first correction-coefficient group calculated by the correction-coefficient calculating unit 109, the luminance signal, and the weighting factor, and a second correction-coefficient group formed of the adjusted correction coefficient is output to the grayscale converter 111. Thus, by performing space-variant grayscale conversion processing using the second correction-coefficient group obtained in this way, it is possible to reduce unnatural emphasis in the luminance gradient in uniform portions, which occurs when performing conventional space-variant grayscale conversion processing.

In the above embodiment, the processing is assumed to be hardware-based, but it is not necessarily limited to this configuration. For example, it is also possible to output the signal from the CCD as unprocessed Raw data, and to output the image-acquisition information, such as the ISO sensitivity, input via the external interface as header information and to process them with separate software. The software process for signal processing is described below with reference to FIGS. 12 and 13.

Figure 12:
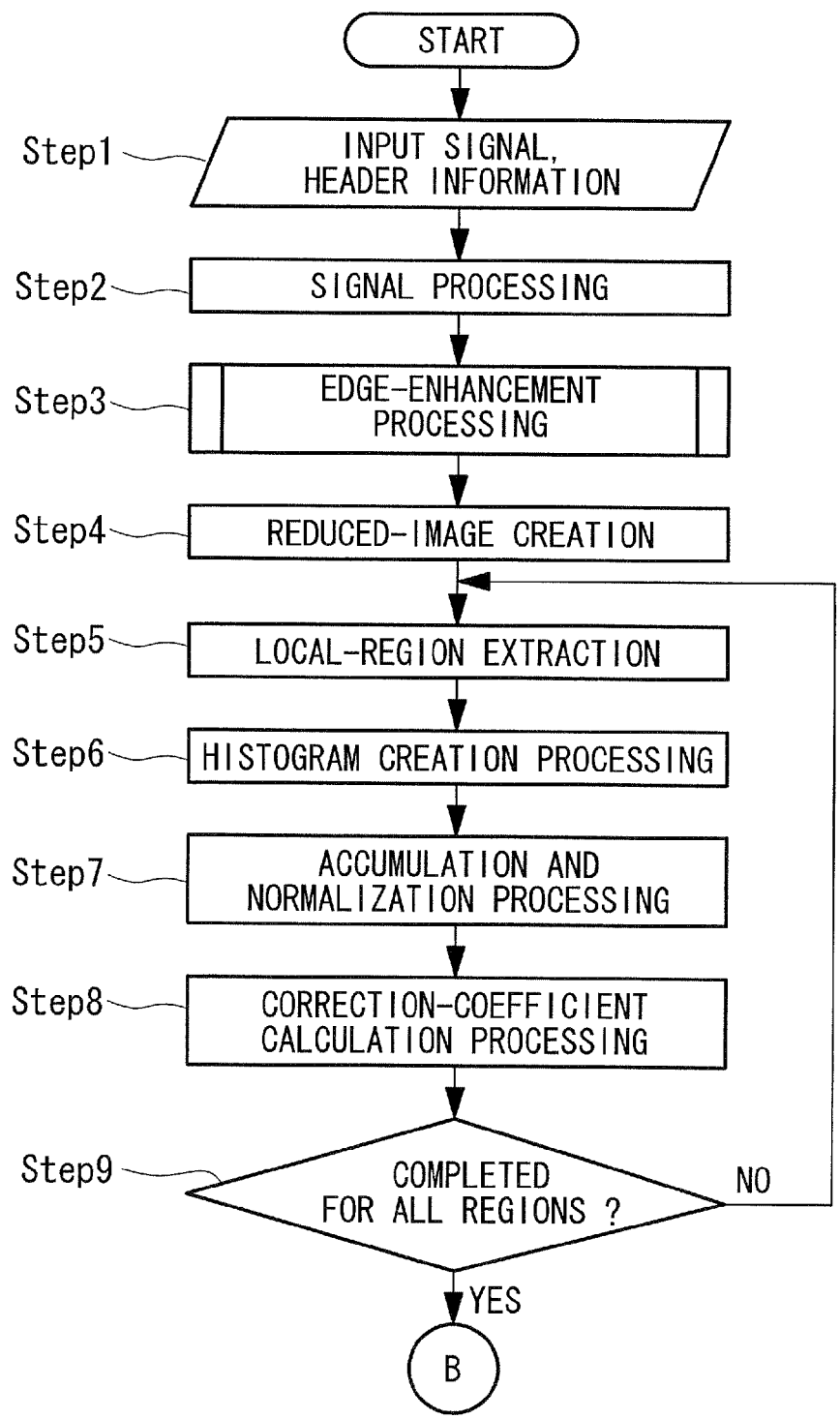
FIG. 12 is a flowchart showing a signal processing procedure realized by a digital still camera according to a second embodiment of the present invention.
Figure 13:
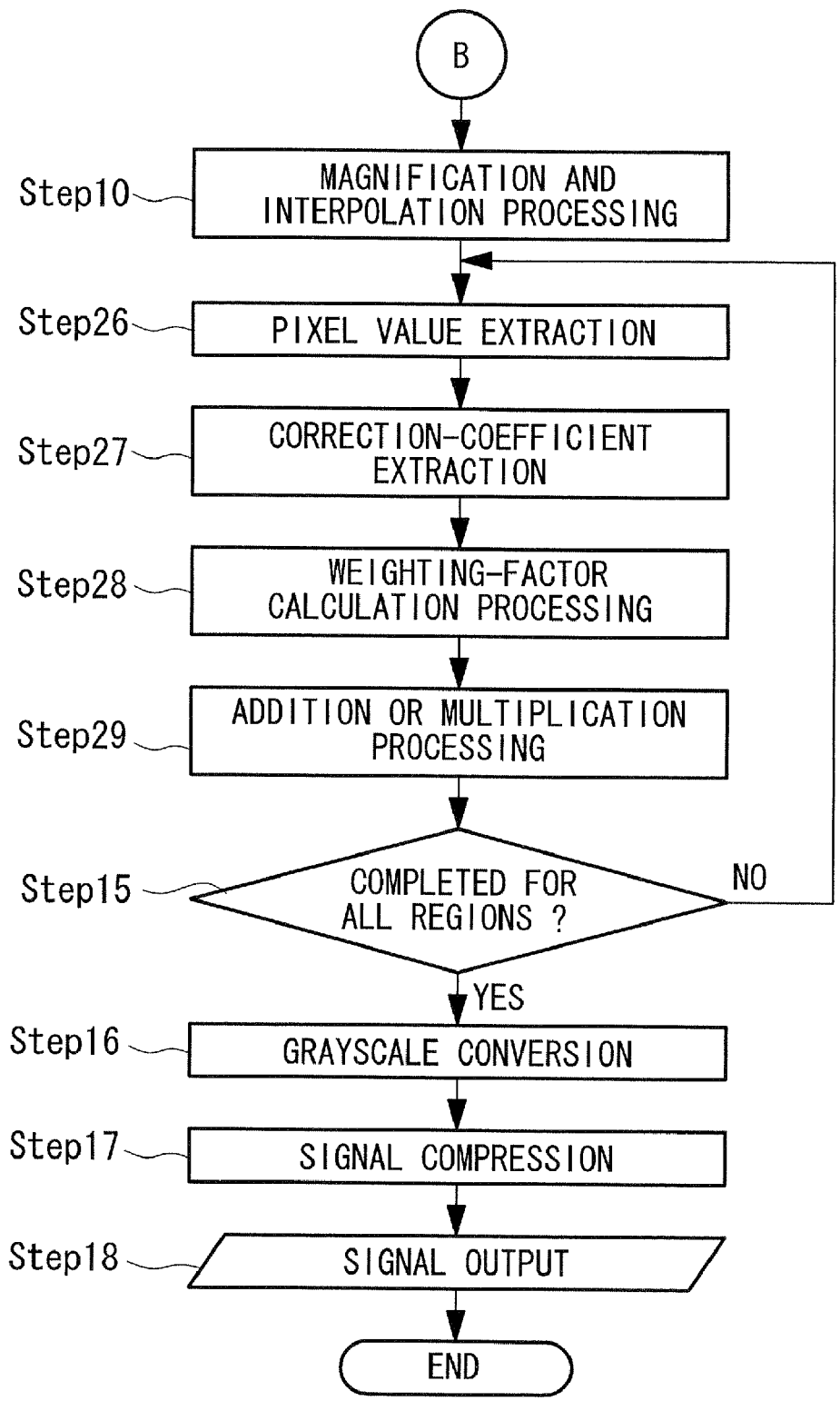
FIG. 13 is a flowchart showing the signal processing procedure realized by the digital still camera according to the second embodiment of the present invention.

FIGS. 12 and 13 are flowcharts showing the processing procedure for the software process for signal processing executed in the digital still camera according to the second embodiment of the present invention. In this figure, processes that are the same as those in the first embodiment described above are assigned the same step number. The same processing as the above-described processing performed in each structure shown in FIG. 10 is carried out in each processing step.

As shown in FIGS. 12 and 13, Step 1 to Step 10 are the same processing as the processing shown in FIGS. 7 and 8. In Step 26, which continues from Step 10, the pixel value of the target pixel is extracted from the image signal. Next, in Step 27, the correction coefficient corresponding to the target pixel extracted in Step 26 is extracted. In Step 28, the final weighting factor W2 is calculated on the basis of Equations (3), (4), and (8). In Step 29, the final correction coefficient P2 is calculated by computational processing according to Equation (9) or Equation (10), using the pixel value and correction coefficient extracted in Step 26 and Step 27, on the basis of the final weighting factor W2 in Step 28. Then, in the same way as in the first embodiment described above, after going through Steps 16 to 18, the process ends.

Third Embodiment

Next, a digital still camera according to a third embodiment of the present invention will be described with reference to the drawings.

In the first embodiment described above, when obtaining the second correction-coefficient group, which is the final correction-coefficient group, each correction coefficient P1 forming the second correction-coefficient group is calculated by adding the product of the weighting factor and the original correction-coefficient group, that is, the first correction-coefficient group, and the product of the weighting factor and the smoothed correction-coefficient group, in which the smoothing filter is applied to the first correction-coefficient group. In contrast, in this embodiment, smoothing is performed on the first correction-coefficient group to obtain a final correction coefficient P3 by subjecting the first correction-coefficient group to a bilateral filter in which the luminance value of the original image signal serves as a parameter, and the second correction-coefficient group is created using this correction coefficient P3.

In the digital still camera of this embodiment, a description of the features that are common to the first embodiment is omitted, and only the differences are described. The structures that are the same as those in the first embodiment are assigned the same names and reference numerals.

Figure 14:
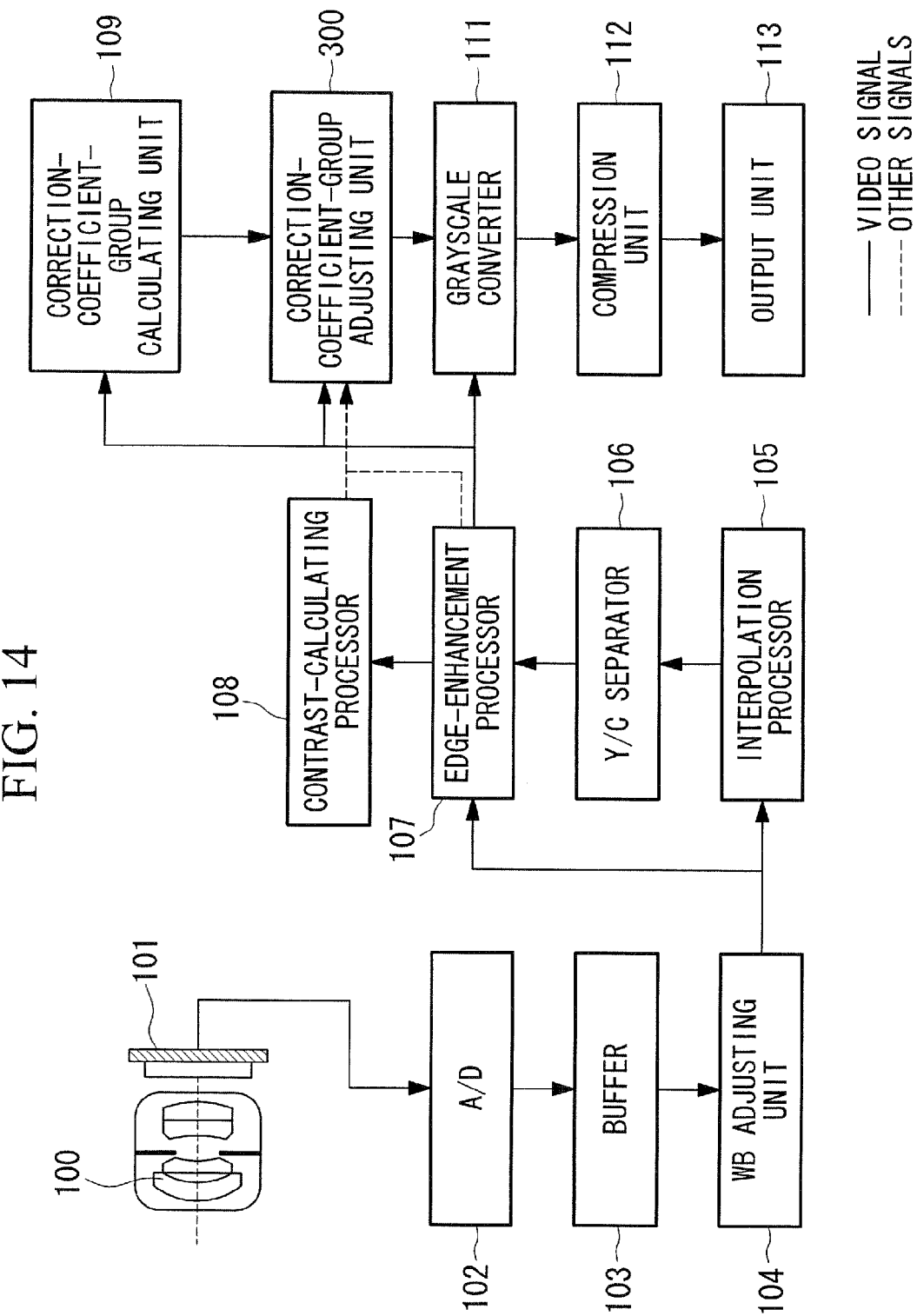
FIG. 14 is a block diagram showing, in outline, the configuration of a digital still camera according to a third embodiment of the present invention.

FIG. 14 is a block diagram showing, in outline, the configuration of the digital still camera according to the third embodiment of the present invention.

As shown in FIG. 14, the digital still camera according to this embodiment has substantially the same configuration as the digital still camera according to the first embodiment shown in FIG. 1, but the difference is that it includes a correction-coefficient-group adjusting unit 300 instead of the correction-coefficient-group adjusting unit 110 (see FIG. 1), and the output signal from the edge-enhancement processor 107 is transferred to the correction-coefficient-group calculating unit 109, the correction-coefficient-group adjusting unit 300, and the grayscale converter 111.

Next, the correction-coefficient-group adjusting unit 300 according to this embodiment is described more concretely with reference to the drawings.

Figure 15:
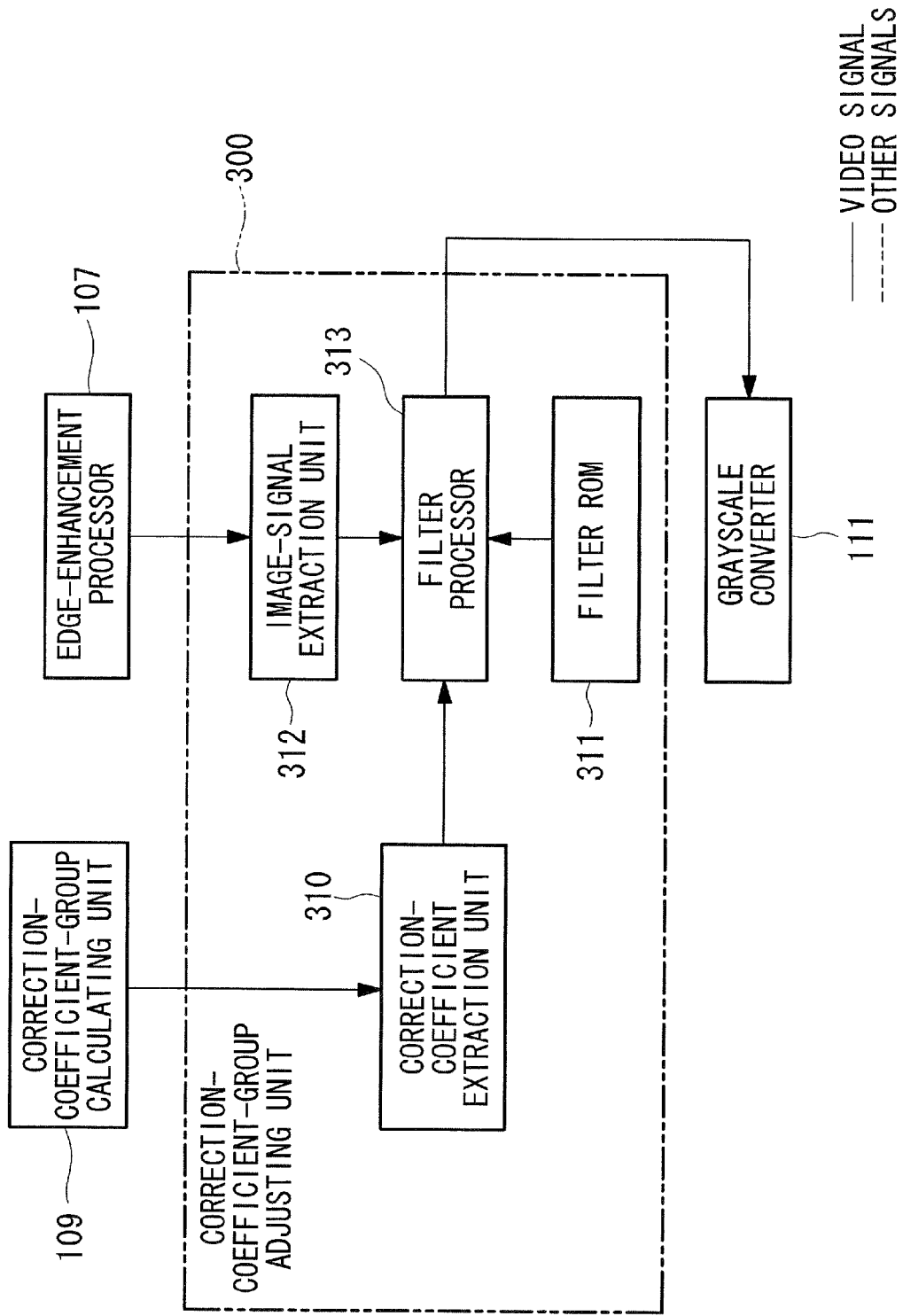
FIG. 15 is a block diagram showing, in outline, a correction-coefficient-group adjusting unit shown in FIG. 14.

FIG. 15 is a block diagram showing, in outline, the configuration of the correction-coefficient-group adjusting unit 300 according to this embodiment. As shown in this figure, the correction-coefficient-group adjusting unit 300 is formed of a correction-coefficient extraction unit 310, a filter ROM 311, an image-signal extraction unit 312, and a filter processor 313.

In FIG. 15, the signal from the correction-coefficient-group calculating unit 109 is transferred to the correction-coefficient extraction unit 310. The signal from the edge-enhancement processor 107 is transferred to the image-signal extraction unit 312. The signal from the image-signal extraction unit 312 is output to the filter processor 313. The filter processor 313 is connected to the filter ROM 311. The output from the filter processor 313 is transferred to the grayscale converter 111.

Details of the processing performed in each of the units described above will be described more concretely below.

The image-signal extraction unit 312 reads out, from the luminance signal Y transferred from the edge-enhancement processor 107, luminance values of a target region formed of the target pixel and neighboring pixels of the target pixel and transfers them to the filter processor 313.

The correction-coefficient extraction unit 310 reads out correction coefficients corresponding to the above-described target region from the correction-coefficient group (hereinafter referred to as "first correction-coefficient group" in this embodiment) formed of correction coefficients corresponding to each pixel in the original image signal, stored in the correction-coefficient map buffer 147 (see FIG. 5) in the correction-coefficient calculating unit 109, and transfers them to the filter processor 313.

The filter processor 313 calculates final correction coefficients P(i,j) by performing computational processing according to Equation (11) using correction coefficients Pr corresponding to the target region obtained from the correction-coefficient extraction unit 310, using a filter coefficient (o described later) read out from the filter ROM 311, and luminance values Lp in the target region, obtained from the image-signal extraction unit 312, and obtains a correction-coefficient group formed of these correction coefficients P(i,j) (hereinafter referred to as "second correction-coefficient group" in this embodiment).

$$P(i,j)=(\Sigma\Sigma(Pr(i+m,j+n)\exp A\exp B))/N(i,j) \quad (11)$$

$$N(i,j)=\Sigma\Sigma\exp A\exp B$$

$$A=-(m^2+n^2)/(2\sigma^2)$$

$$B=-((Lp(i,j)-Lp(i+m,j+n))^2/(2\sigma^2)$$

In Equation (11) above, σ is the variance of a Gaussian distribution, i and j are a vertical pixel position and a horizontal pixel position in a pixel group in the image signal, and m and n are vertical and horizontal inter-pixel distances of the neighboring pixels from the target pixel. As shown in this Equation (11), the correction coefficients P(i,j) are obtained by adjusting the correction coefficient corresponding to the target pixel extracted by the correction-coefficient extraction unit 310 using a spatial distance function of the pixels in the target region extracted by the image-signal extraction unit 312 and a difference function of each pixel value forming the target region. The second correction-coefficient group formed of the plurality of correction coefficients P(i,j) calculated in this way is transferred from the filter processor 313 to the grayscale converter 111. The grayscale converter 111 performs grayscale conversion by multiplying the luminance signal Y and the chrominance signal C by these adjusted correction coefficients P(i,j).

As described above, with the digital still camera according to this embodiment, in the correction-coefficient adjusting unit 300, as shown in Equation (11) above, the second correction-coefficient group is calculated by adjusting the first correction-coefficient group corresponding to the target pixels extracted by the correction-coefficient extraction unit 310, by using the spatial distance function of the pixel in the target region extracted by the image-signal extraction unit 312 and the difference function of each pixel value forming the target region. Thus, by performing space-variant grayscale conversion processing using this second correction-coefficient group, it is possible to smooth a uniform portion, while leaving edges. Therefore, it is possible to reduce unnatural emphasis in the luminance gradient in uniform portions, which occurs conventionally.

In the embodiment described above, the processing is assumed to be realized by hardware, but it is not limited to this configuration. For example, it is also possible to output the signal from the CCD as unprocessed Raw data, and to output the image-acquisition information, such as the ISO sensitivity, input via the external interface as header information and to process them with separate software. The software process for signal processing is described below with reference to FIGS. 16 and 17.

Figure 16:
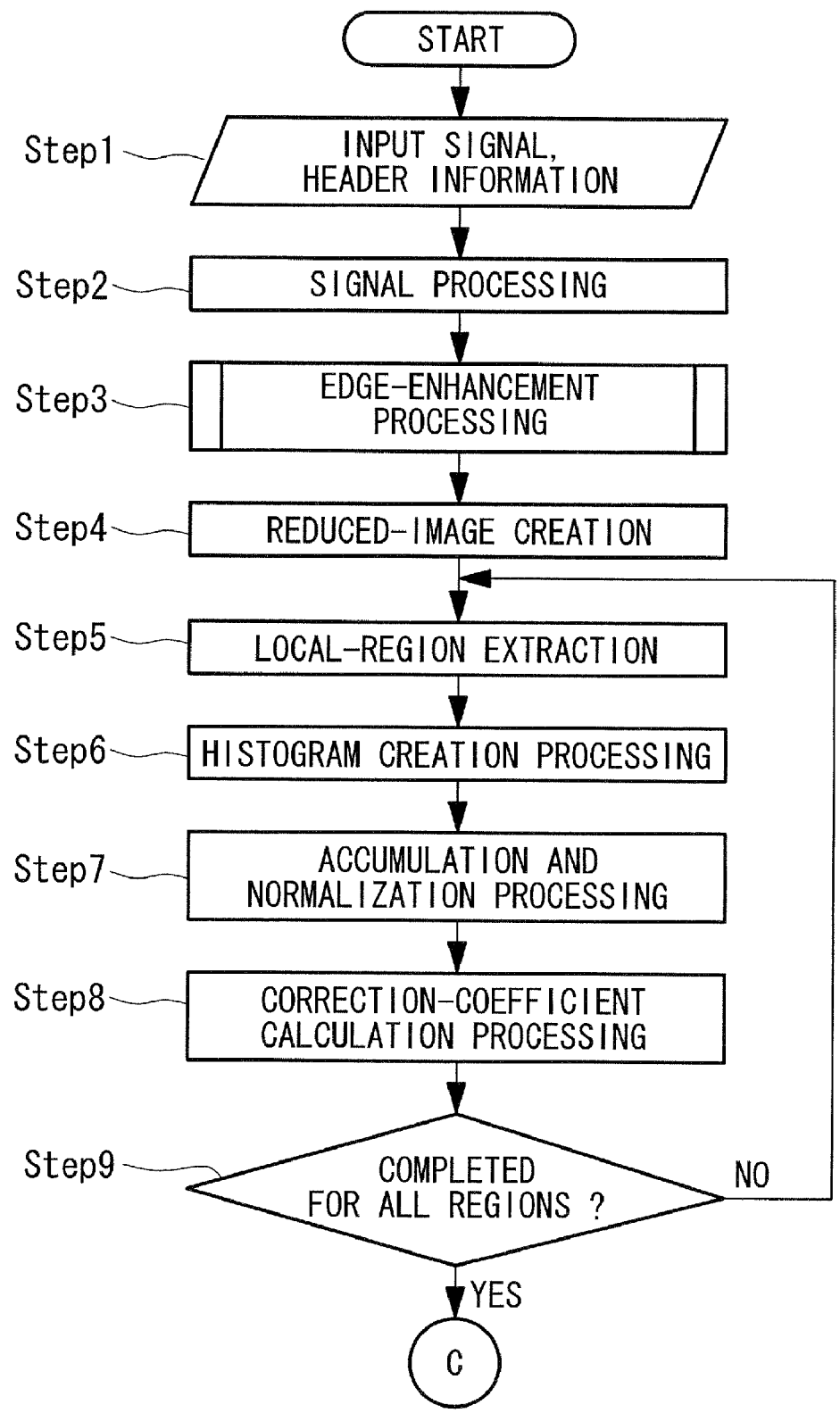
FIG. 16 is a flowchart showing a signal processing procedure realized by the digital still camera according to the third embodiment of the present invention.
Figure 17:
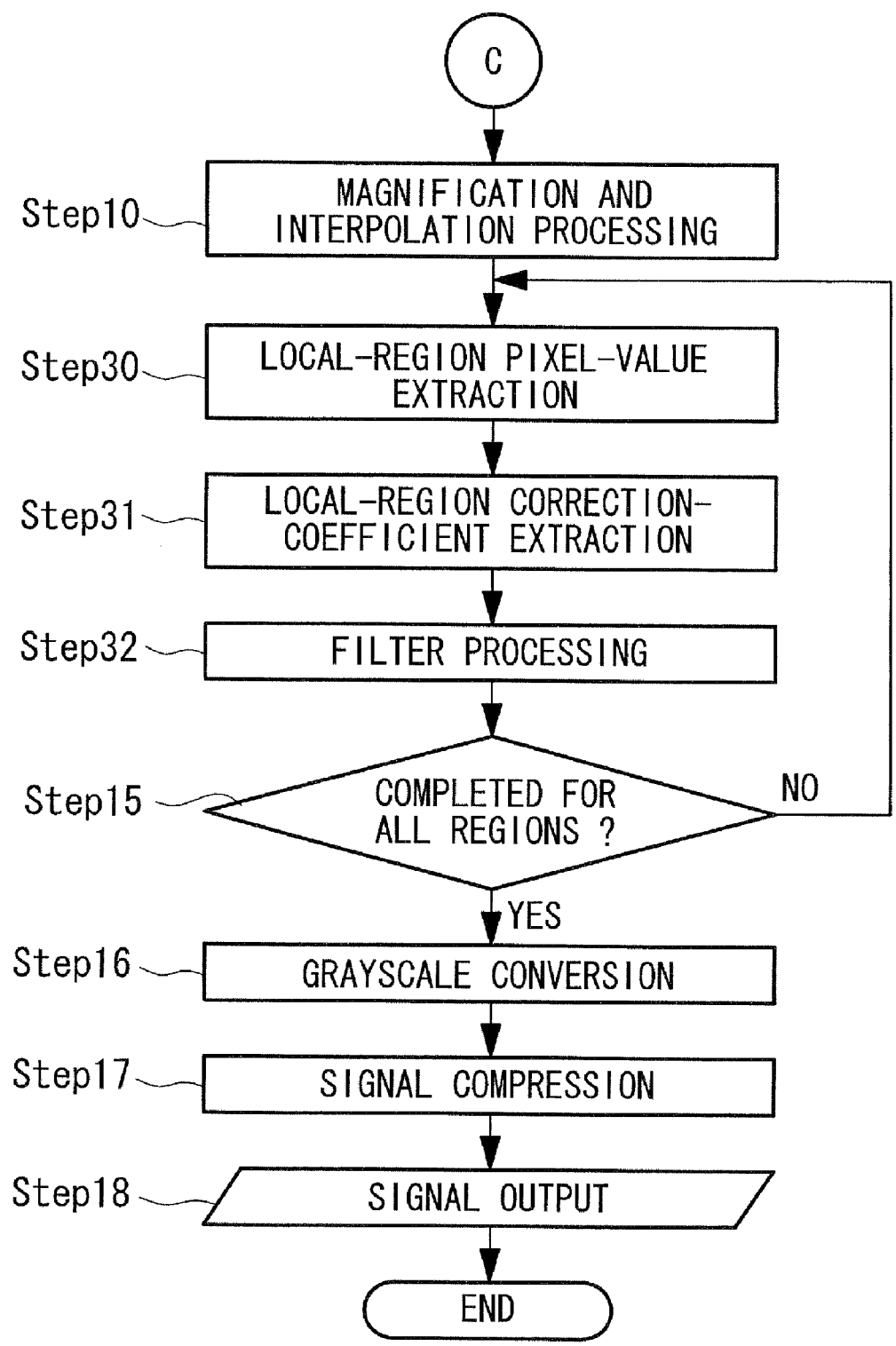
FIG. 17 is a flowchart showing the signal processing procedure realized by the digital still camera according to the third embodiment of the present invention.

FIGS. 16 and 17 are flowcharts showing the processing procedure for the software process for signal processing executed in the digital still camera according to the third embodiment of the present invention. In this figure, processes that are the same as those in the first embodiment described above are assigned the same step number. The same processing as the above-described processing performed in each structure shown in FIG. 14 is carried out in each processing step.

As shown in FIGS. 16 and 17, Step 1 to Step 10 are the same processes as those shown in FIGS. 7 and 8. In Step 30, which continues from Step 10, for example, the pixel values in a local region of size 5×5 pixels are extracted, and in Step 31, correction coefficients corresponding to the pixels extracted from the local region in Step 30 are extracted. In Step 32, the final correction coefficients P3 are calculated by performing filter processing according to Equation (11) on the pixel values and correction coefficients extracted in Step 30 and Step 31 above on the basis of prescribed weighting factor. Then, in the same way as in the first embodiment described above, after going through Steps 15 to 18, the process ends.

Fourth Embodiment

Next, a digital still camera according to a fourth embodiment of the present invention will be described with reference to the drawings.

In the first embodiment described above, as the procedure for obtaining the final correction coefficients, first, a reduced image is created from the original image, a correction-coefficient group is obtained for this reduced image, a first correction-coefficient group corresponding to the original image is obtained by subjecting the correction coefficients for this reduced image to magnification processing, and thereafter, the second correction-coefficient group is obtained by adjusting this first correction-coefficient group.

In contrast, in this embodiment, a reduced image is created from the original image and a correction-coefficient group (hereinafter referred to as "reduced correction-coefficient group" in this embodiment) formed of correction coefficients corresponding to this reduced image (hereinafter referred to as "reduced correction coefficients" in this embodiment) is created. Furthermore, an adjusted correction-coefficient group is obtained by adjusting this reduced correction-coefficient group. Then, by subjecting this adjusted correction-coefficient group to magnification processing, a final correction-coefficient group corresponding to the original image size (hereinafter referred to as "final correction-coefficient group" in this embodiment) is obtained. Then, grayscale conversion processing is performed using this final correction-coefficient group.

For the digital still camera of this embodiment, a description of parts that are common to the first embodiment is omitted, and only the differences will be described. The structures that are the same as those in the first embodiment are assigned the same names and reference numerals.

Figure 18:
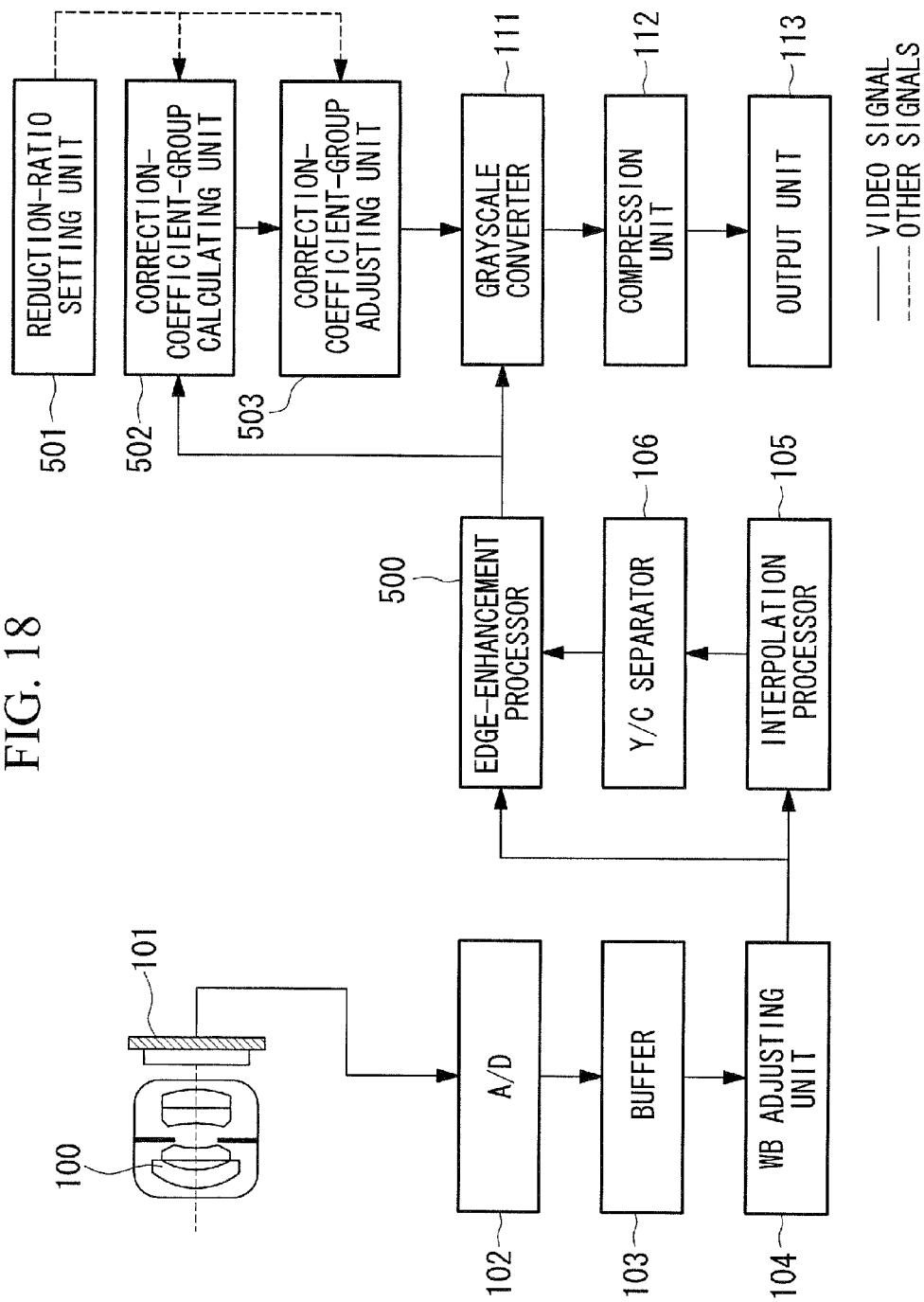
FIG. 18 is a block diagram showing, in outline, a digital still camera according to a fourth embodiment of the present invention.

FIG. 18 is a block diagram showing, in outline, the configuration of a digital still camera according to the fourth embodiment of the present invention.

As shown in FIG. 18, the digital still camera according to this embodiment has substantially the same configuration as the digital still camera according to the first embodiment, shown in FIG. 1; however, the differences are that the contrast-calculating processor 108 shown in FIG. 1 is not provided, and instead of the edge-enhancement processor 107, the correction-coefficient-group calculating unit, and the correction-coefficient-group adjusting unit 110, it includes an edge-enhancement processor 500, a reduction-ratio setting unit 501, a correction-coefficient-group calculating unit 502, and a correction-coefficient-group adjusting unit 503.

In this diagram, the output from the edge-enhancement processor 500 is transferred to the correction-coefficient-group calculating unit 502 and the grayscale converter 111. A signal from the reduction-ratio setting unit 501 is input to the correction-coefficient-group calculating unit 502 and the correction-coefficient-group adjusting unit 503. The output from the correction-coefficient-group calculating unit is transferred to the correction-coefficient-group adjusting unit 503. The output from the correction-coefficient-group adjusting unit 503 is transferred to the grayscale converter 111.

The edge-enhancement processor 500 performs edge-enhancement processing by performing filter processing on the color signal from the WB adjusting unit 104, extracting edge components, and adding them to the luminance signal Y from the Y/C separator 106. The edge-enhanced luminance signal Y is transferred to the correction-coefficient-group calculating unit 502 and the grayscale converter 111, and the chrominance signal C is transferred to the grayscale converter 111.

The correction-coefficient-group calculating unit 502, with the aim of high-speed processing, creates a reduced-image signal from the luminance signal Y for correction-coefficient calculation on the basis of the reduction ratio set in the reduction-ratio setting unit 501. The image reduction method uses a known downsampling technique. Importance can be placed on the correction-coefficient calculation accuracy by canceling the reduction processing if the reduction ratio is set to unity.

The correction-coefficient-group calculating unit 502 extracts a local region, centered on the target pixel, of prescribed size on the basis of the reduced-image signal created. Then, a grayscale conversion curve is defined on the basis of a histogram of the extracted local region, and the reduced correction-coefficient group formed of the reduced correction coefficients for each target pixel is obtained in the grayscale conversion processing on the basis of the conversion curve and is stored in a correction-coefficient storage buffer, which is not shown in the drawings. By doing so, a reduced correction-coefficient group, which is a correction-coefficient group corresponding to the image signal with the reduced image size, is stored in the correction-coefficient storage buffer.

The reduced correction-coefficient group calculated by the correction-coefficient-group calculating unit 502 is transferred to the correction-coefficient-group adjusting unit 503. The correction-coefficient-group adjusting unit 503 extracts, from the reduced correction-coefficient group, correction coefficients corresponding to the pixels in the local region of prescribed size, which is centered on the target pixel in the original image. Then, it performs filter processing on the extracted correction coefficients using a prescribed weighting factor to calculate an adjusted correction-coefficient group formed of adjusted correction coefficients corresponding to the target pixel.

Next, from the adjusted correction-coefficient group, the correction-coefficient-group calculating unit 502 calculates a final correction-coefficient group formed of final correction coefficients P4 corresponding to the image signal of the original image size using a known image magnification method, on the basis of the reduction ratio set in the reduction-ratio setting unit 501, and transfers it to the grayscale converter 111.

The grayscale converter 111 performs grayscale conversion processing on the luminance signal Y and the chrominance signal C transferred from the edge-enhancement processor 500 by multiplying them by each correction coefficient P4 forming the final correction-coefficient group transferred from the correction-coefficient-group adjusting unit 503. Then, the grayscale-converted signals are stored in a prescribed memory card or the like, via the compression unit 112 and the output unit 113.

Next, the above-mentioned edge-enhancement processor 500 will be described with reference to the drawings.

Figure 19:
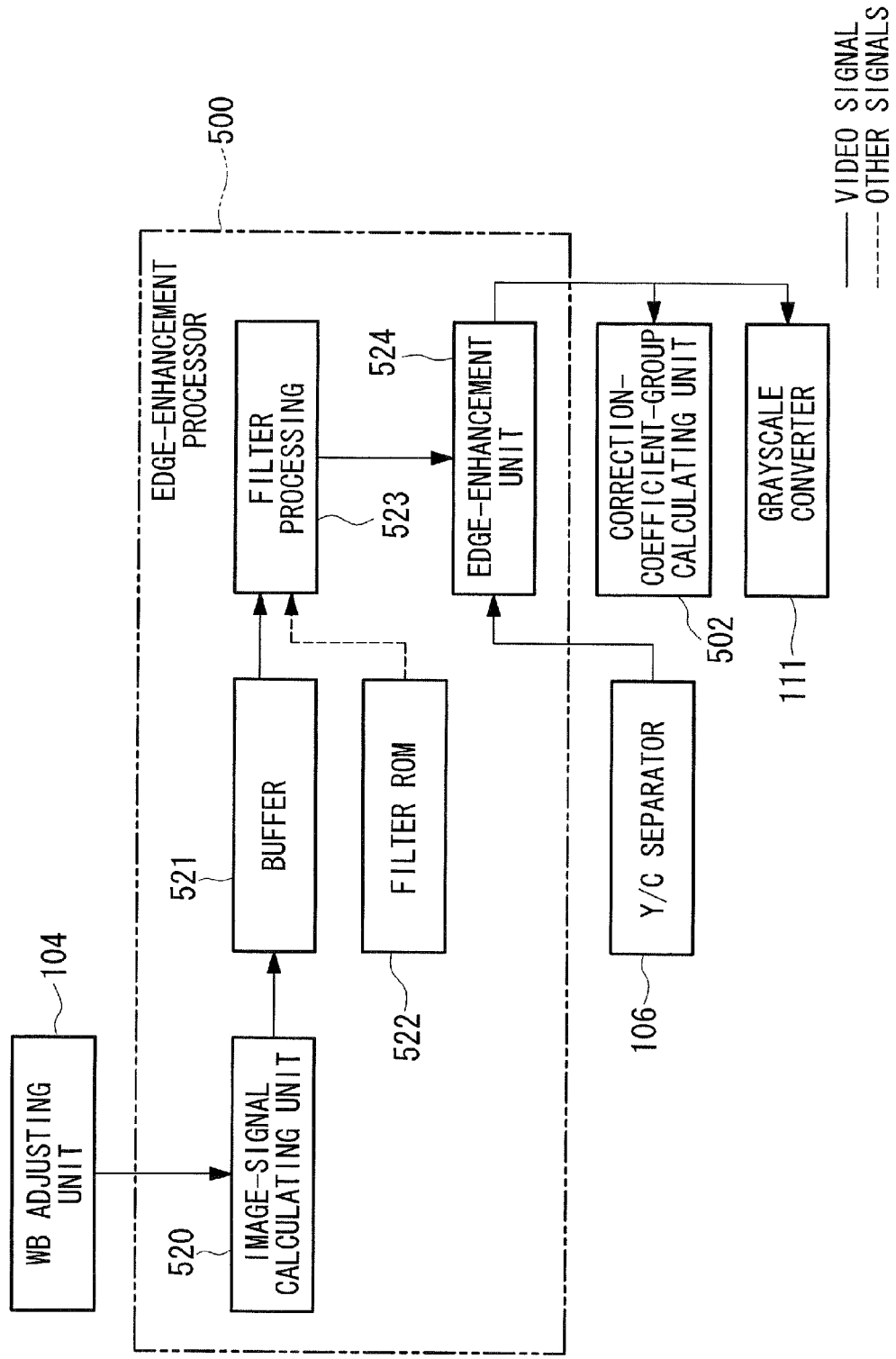
FIG. 19 is a block diagram showing, in outline, the configuration of an edge-enhancement processor shown in FIG. 18.

FIG. 19 is a block diagram showing, in outline, the configuration of the edge-enhancement processor 500. As shown in this figure, the edge-enhancement processor 500 is formed of an image-signal calculating unit 520, a buffer 521, a filter ROM 522, a filter processor 523, and an edge-enhancement unit 524.

In FIG. 19, the output from the WB adjusting unit 104 is transferred to the image-signal calculating unit 520 in the edge-enhancement processor 500. The output from the image-signal calculating unit 520 is transferred to the buffer

521. The output from the buffer 521 is transferred to the filter processor 523. The filter ROM is connected to the filter processor 523. The outputs from the filter processor 523 and the Y/C separator 106 are transferred to the edge-enhancement unit 524. The output from the edge-enhancement unit 524 is transferred to the correction-coefficient calculating unit 502 and the grayscale converter 111.

Details of the processing performed in each of the above units will be described more concretely below.

First, the image-signal calculating unit 520 reads out the WB adjusted image signal transferred from the WB adjusting unit 104 in units of pixels, calculates the luminance signal according to Equation (1) above, and transfers it to the buffer 521.

In the filter processor 523 on the other hand, a spatial filter required for known edge-component extraction and filter processing is first read out from the filter ROM 522. For example, for a 5×5 pixel size filter, it reads out a local region of 5×5 pixel units from the buffer 521, obtains the edge component using the spatial filter mentioned above, and transfers it to the edge-enhancement unit 524.

The edge-enhancement unit 524, extracts a local region of prescribed size from the luminance signal Y converted according to Equation (1) in the Y/C separator 106 and adds the edge component from the filter processor 523 to the luminance signal Y to perform edge-enhancement processing. The edge-enhanced luminance signal Y is transferred to the correction-coefficient-group calculating unit 502 and the grayscale converter 111, and the chrominance signal C is transferred to the grayscale converter 111.

Next, the correction-coefficient-group calculating unit 502 shown in FIG. 18 will be described with reference to the drawings.

Figure 20:
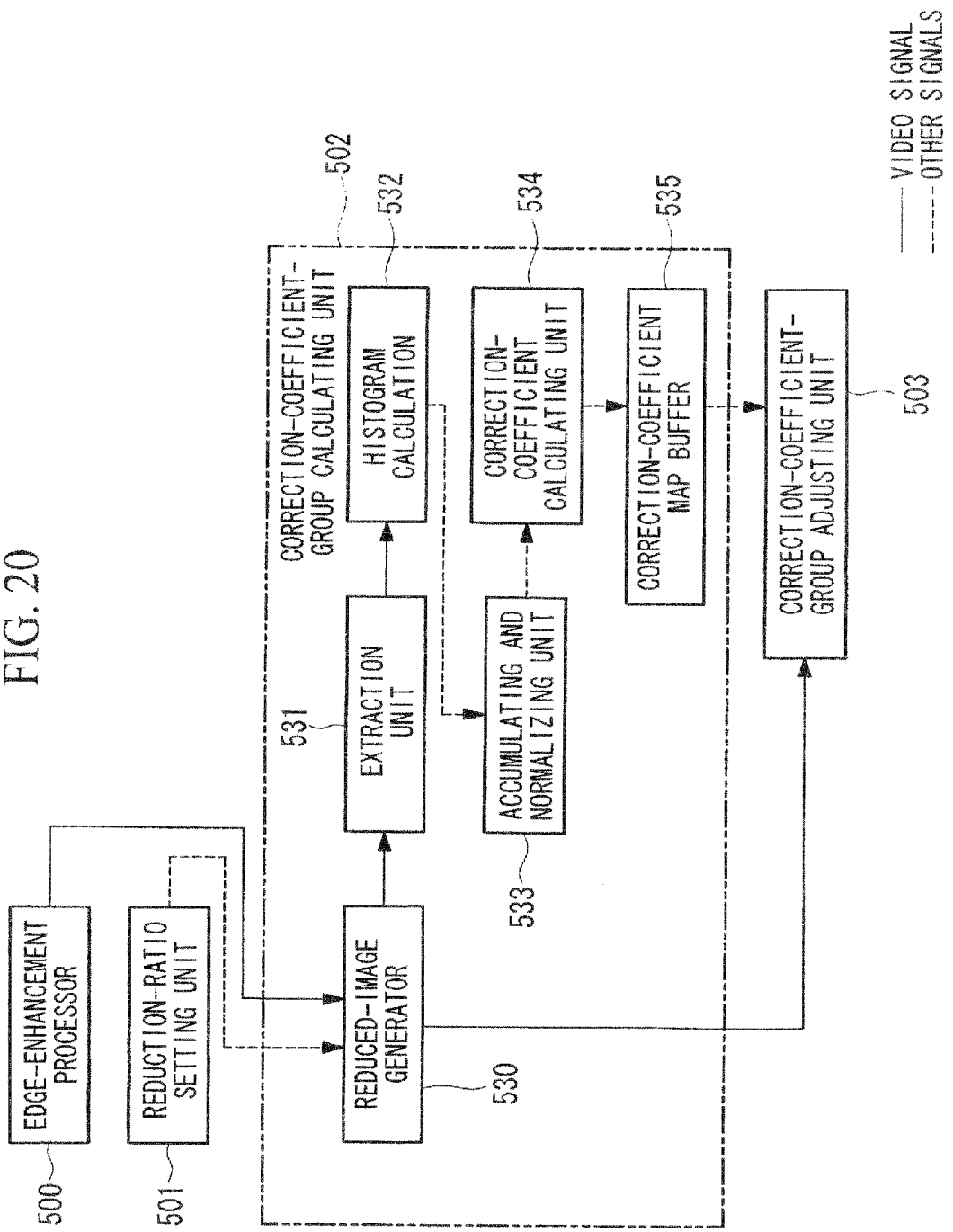
FIG. 20 is a block diagram showing, in outline, the configuration of a correction-coefficient-group calculating unit shown in FIG. 18.

FIG. 20 is a block diagram showing, in outline, the configuration of the correction-coefficient-group calculating unit 502. As shown in this figure, the correction-coefficient-group calculating unit 502 is formed of a reduced-image generator 530, an extraction unit 531, a histogram calculating unit 532, an accumulating and normalizing unit 533, a correction-coefficient calculating unit 534, and a correction-coefficient map buffer 535.

In FIG. 20, the signals from the edge-enhancement processor 500 and the reduction ratio setting unit 501 are transferred to the reduced-image generator 530. The output from the reduced-image generator 530 is transferred to the extraction unit 531 and the correction-coefficient-group adjusting unit 503. The output from the extraction unit 531 is output to the histogram calculating unit 532. The output from the histogram calculating unit 532 is transferred to the accumulating and normalizing unit 533. The output from the accumulating and normalizing unit 533 is transferred to the correction-coefficient calculating unit 534. The output from the correction-coefficient calculating unit 534 is transferred to the correction-coefficient map buffer 535. The correction-coefficient group stored in the correction-coefficient map buffer 535 is referred to by the correction-coefficient-group adjusting unit 503.

Details of the processing performed in each of the above units will be described more concretely below.

The reduced-image generator 530 creates a reduced-image signal from the luminance signal Y obtained from the edge-enhancement processor 500 on the basis of the reduction ratio set in the reduction-ratio setting unit 501 and transfers the reduced-image signal to the extraction unit 531 and the correction-coefficient-group adjusting unit 503. The image-reduction method uses a known downsampling method.

The extraction unit 531 extracts signals of local regions from the reduced-image signal created in the reduced-image generator 530 and transfers them to the histogram calculating unit 532. The histogram calculating unit 532 creates a histogram for each local region and transfers it to the accumulating and normalizing unit 533. The accumulating and normalizing unit 534 creates a cumulative histogram by accumulating the histograms, generates a grayscale conversion curve by normalizing it to match the grayscale depth, and transfers the grayscale conversion curve to the correction-coefficient calculating unit 534.

The correction-coefficient calculating unit 534 obtains a reduced correction-coefficient group formed of reduced correction coefficients for the signal level of each region on the basis of the grayscale conversion curve from the accumulating and normalizing unit 533. At this time, the correction-coefficient calculating unit 534 calculates the reduced correction-coefficient group by the same method as in the first embodiment, in other words, by performing computational processing according to Equation (5) above.

The reduced correction-coefficient group calculated by the correction-coefficient calculating unit 534 is transferred to the correction-coefficient map buffer 535 and is stored. The reduced correction-coefficient group stored in the correction-coefficient map buffer 535 is adjusted in the correction-coefficient group adjusting unit 503 in the subsequent stage, and is then used in the grayscale conversion processing.

Next, the correction-coefficient-group adjusting unit 503 shown in FIG. 18 will be described with reference to the drawings.

Figure 21:
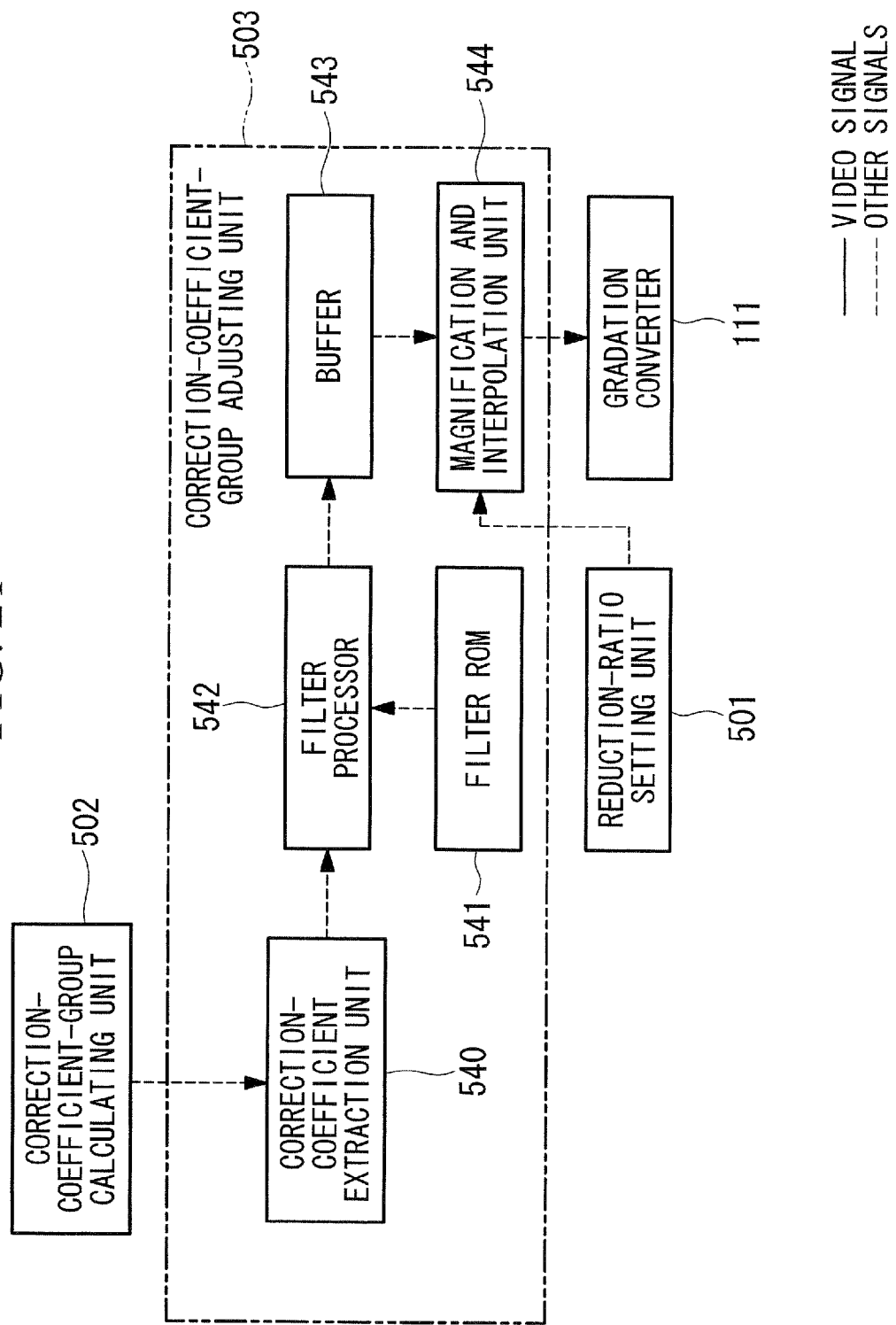
FIG. 21 is a block diagram showing, in outline, the configuration of a correction-coefficient-group adjusting unit shown in FIG. 18.

FIG. 21 is a block diagram showing, in outline, the configuration of the correction-coefficient-group adjusting unit 503. As shown in this figure, the correction-coefficient-group adjusting unit 503 is formed of a correction-coefficient extraction unit 540, a filter ROM 541, a filter processor 542, a buffer 543, and a magnification and interpolation unit 544.

In FIG. 21, the signal from the correction-coefficient-group calculating unit 502 is transferred to the correction-coefficient extraction unit 540. The output from the correction-coefficient extraction unit 540 is transferred to the filter processor 542. The filter processor 542 is connected to the filter ROM 541. The output from the filter processor 542 is transferred to the buffer 543. The output from the buffer 543 and the signal from the reduction-ratio setting unit 501 are output to the magnification and interpolation unit 544. The output from the magnification and interpolation unit 544 is transferred to the grayscale converter 111.

Details of the processing performed in each of the above units will be described more concretely below.

The correction-coefficient extraction unit 540 reads out correction coefficients corresponding to pixels in a local region of prescribed size, including the target pixel and the neighboring pixels of the target pixel, from the reduced correction-coefficient group stored in the correction-coefficient map buffer 535 (see FIG. 20) in the correction-coefficient-group calculating unit 502 and transfers them to the filter processor 542.

At this time, the size of the local region to be read out is determined according to the size of the filter that the filter processor 542 uses in the subsequent stage. For example, if the filter stored in the filter ROM 541 is a 5×5 pixel size filter, reduced correction coefficients corresponding to pixels in the local region are read out in units of 5×5 pixels and transferred to the filter processor 542.

The filter processor 542 reads out a smoothing filter required in known smoothing filter processing from the filter ROM 541, and by using this smoothing filter to perform smoothing processing on the reduced correction coefficient of each pixel, transferred from the correction-coefficient extraction unit 540, it calculates an adjusted correction-coefficient group formed of the smoothed correction coefficients. The calculated adjusted correction-coefficient group is transferred to the magnification and interpolation unit 544 via the buffer 543.

In this embodiment, the smoothing processing is performed in the filter processor 542 by using the smoothing filter. However, it is possible to employ another type of filter processing, by changing the smoothing filter settings. For example, by enhancing the slope of edges by applying a sharpening filter, it is possible to make the gradient in relatively uniform portions stand out less.

The magnification and interpolation unit 544 calculates a final correction-coefficient group corresponding to the pixels in the original image signal by performing known interpolation processing on the adjusted correction-coefficient group obtained from the buffer 543 on the basis of the reduction ratio set in the reduction-ratio setting unit 501, and translates this to the grayscale converter 111.

Although the digital still camera according to this embodiment has been described above, it is possible to employ the concept of weighting factors in the smoothing filter described above. For example, it is possible to store a weighting factor W4 in a ROM (not shown in the drawings) and to calculate an adjusted correction coefficient Pr4 with Equation (7-2) below.

$$Pr4=Prm*(1-W4)+Prfil*W4 \tag{7-2}$$

In Equation (7-2) above, Prm is a reduced correction coefficient, and Prfil is a smoothed reduced correction coefficient. The equation for calculating Pr4 is not limited to Equation (7-2) above; it is possible to use another computational expression involving Prm, W4, and Prfil. A plurality of W4 values may be stored in a ROM (not shown in the drawings), and a value selected from them on the basis of a user instruction may be used.

In the above embodiment, the processing is assumed to be hardware-based, but it is not necessarily limited to this configuration. For example, it is also possible to output the signal from the CCD as unprocessed Raw data, and to output the image-acquisition information, such as the ISO sensitivity, input via the external interface as header information and to process them with separate software. The software process for signal processing is described below with reference to FIGS. 22 and 23.

Figure 22:
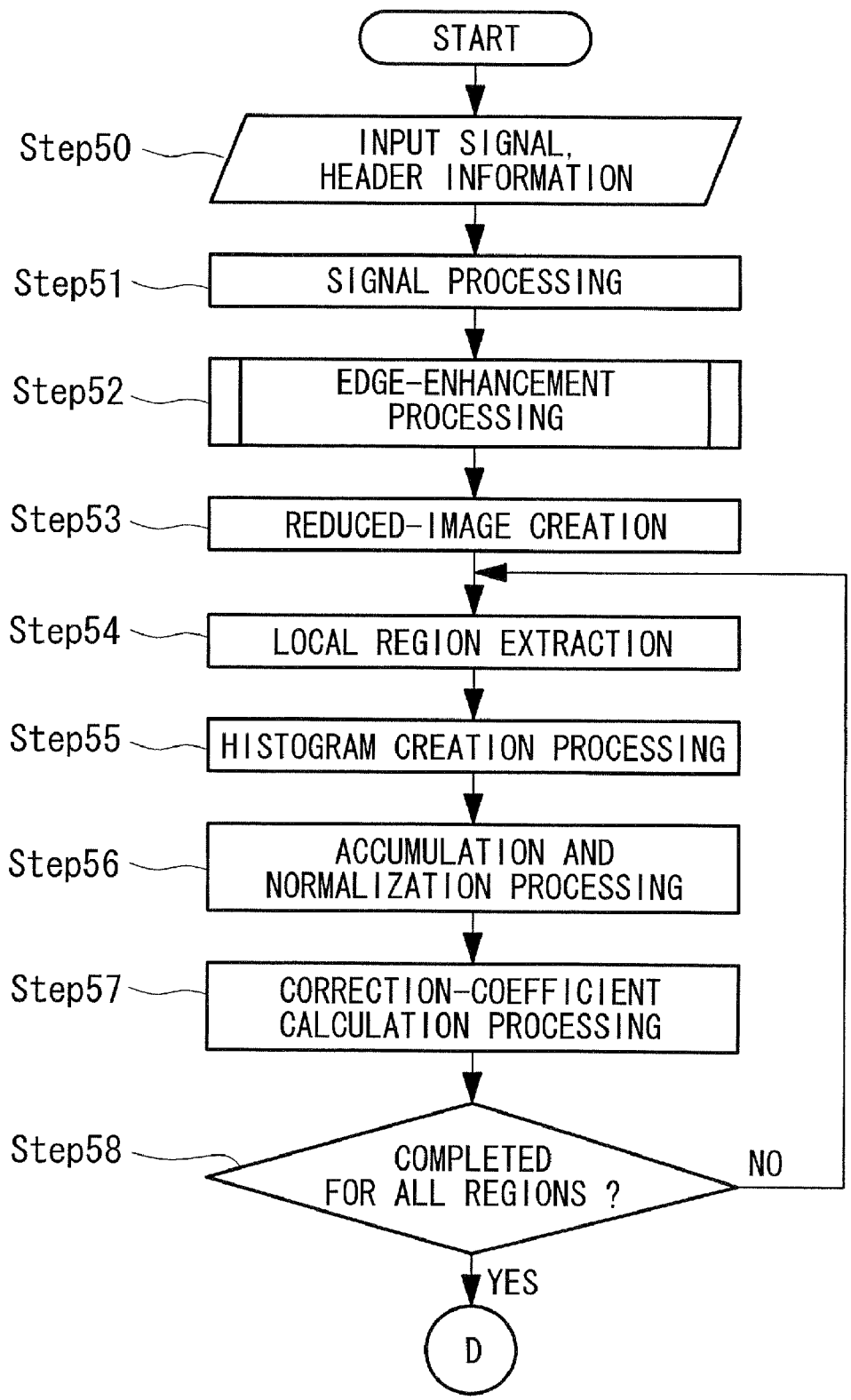
FIG. 22 is a flowchart showing a signal processing procedure realized by the digital still camera according to the fourth embodiment of the present invention.
Figure 23:
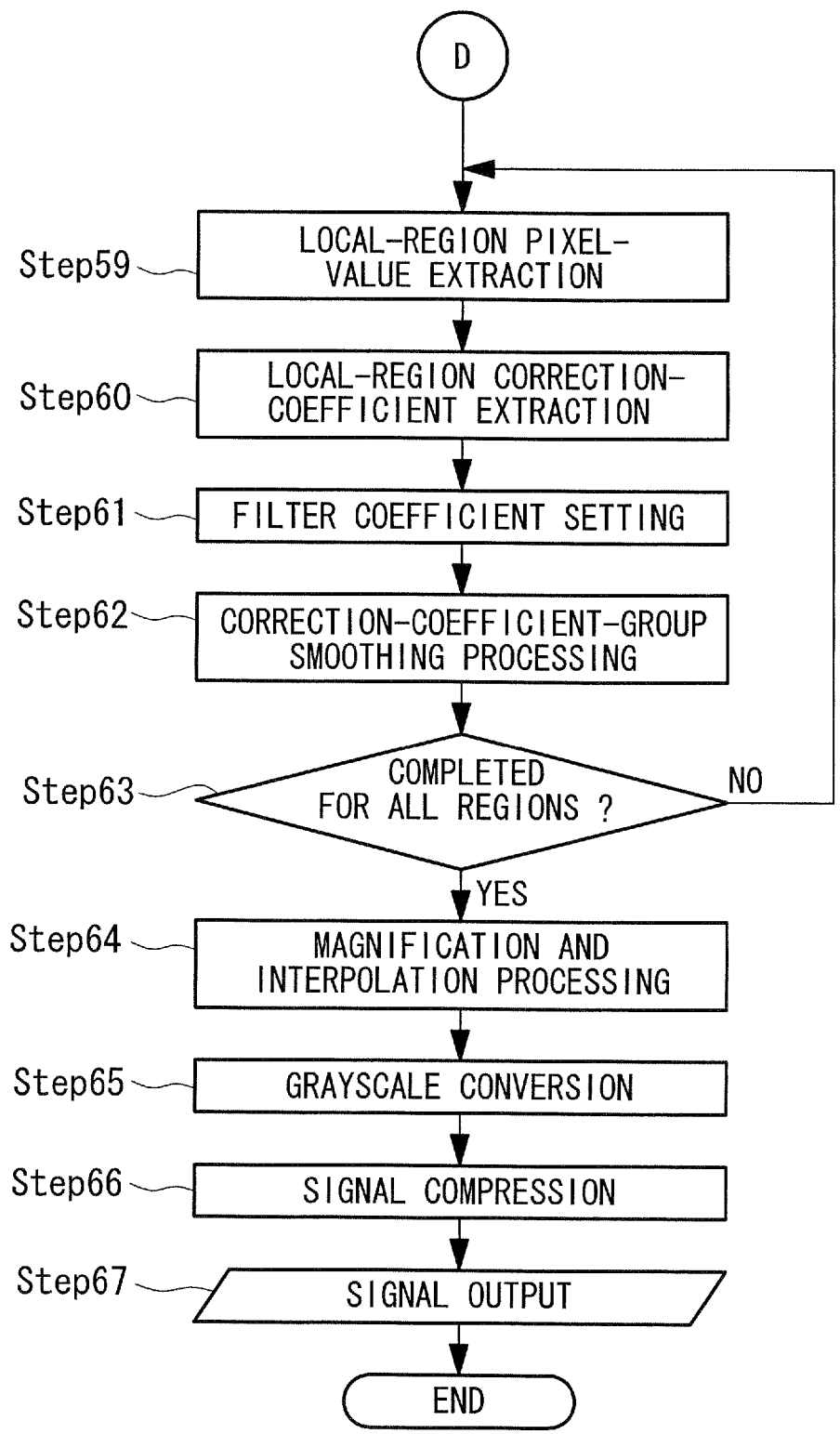
FIG. 23 is a flowchart showing the signal processing procedure realized by the digital still camera according to the fourth embodiment of the present invention.

FIGS. 22 and 23 are flowcharts showing the processing procedure for the software process for signal processing executed in the digital still camera according to the fourth embodiment of the present invention. The same processing as the above-described processing performed in each structure shown in FIG. 18 is performed in each processing step.

In FIGS. 22 and 23, header information including image-acquisition information such as a signal, the ISO sensitivity, and so on are read out in Step 50. In Step 51, signal processing such as WB adjustment, color interpolation, and Y/C separation is performed. In Step 52, edge-enhancement processing is performed, as well as calculation of an edge-correction coefficient and contrast. In Step 53, a reduced image for correction-coefficient calculation is created.

In Step 54, a local region of prescribed size, for example, 5×5 pixel size, is extracted, and histogram creation processing is performed in Step 55. In Step 56, the histograms created in Step 55 are accumulated, and normalization processing is performed. In Step 57, a grayscale conversion curve is defined on the basis of the cumulative histogram, and a reduced correction coefficient for each pixel is calculated on the basis of the conversion curve. In Step 58, it is determined whether extraction has been completed for all regions. If it is completed, the process goes to Step 59, and if it is not completed, the process goes to Step 54.

In Step 59, for example, pixel values in a local region of 5×5 pixel size are extracted, and in Step 60, reduced correction coefficients corresponding to the pixels in the local region, extracted in Step 59, are extracted. In Step 61, a smoothing filter is set. In Step 62, smoothing processing is performed on the reduced correction-coefficient group by using the pixel values, the reduced correction coefficients, and the weighting factors in Step 59, Step 60, and Step 61, and the adjusted correction-coefficient group is created. In Step 63, it is determined whether extraction has been completed for all regions. If it is completed, the process goes to Step 59, and if it is not completed, the process goes to Step 64.

In Step 64, a final correction coefficient group is calculated on the basis of the adjusted correction-coefficient group and is stored. In Step 65, the image signal edge-enhanced in Step 52 is multiplied by the final correction-coefficient group. In Step 66, signal compression is performed using a known signal compression technique, and in Step 67, the processed signal is output, whereupon the process ends.

Fifth Embodiment

Next, a digital still camera according to a fifth embodiment of the present invention will be described with reference to the drawings. This embodiment is a combination of the second embodiment and the fourth embodiment described above. More specifically, first, a reduced image is created from the original image, reduced correction coefficients corresponding to this reduced image are obtained, and a reduced correction-coefficient group formed of these reduced correction coefficients is created. Then, an adjusted correction-coefficient group is obtained by adjusting this reduced correction-coefficient group using the method in the second embodiment described above. After that, a final correction-coefficient group, which is final correction coefficients corresponding to the pixels in the original image, is obtained by subjecting these adjusted correction coefficients to magnification processing.

In the digital still camera of this embodiment, a description of aspects common to the fourth embodiment is omitted, and only the differences are described. Structures that are identical to those in the fourth embodiment are assigned the same names and reference numerals.

Figure 24:
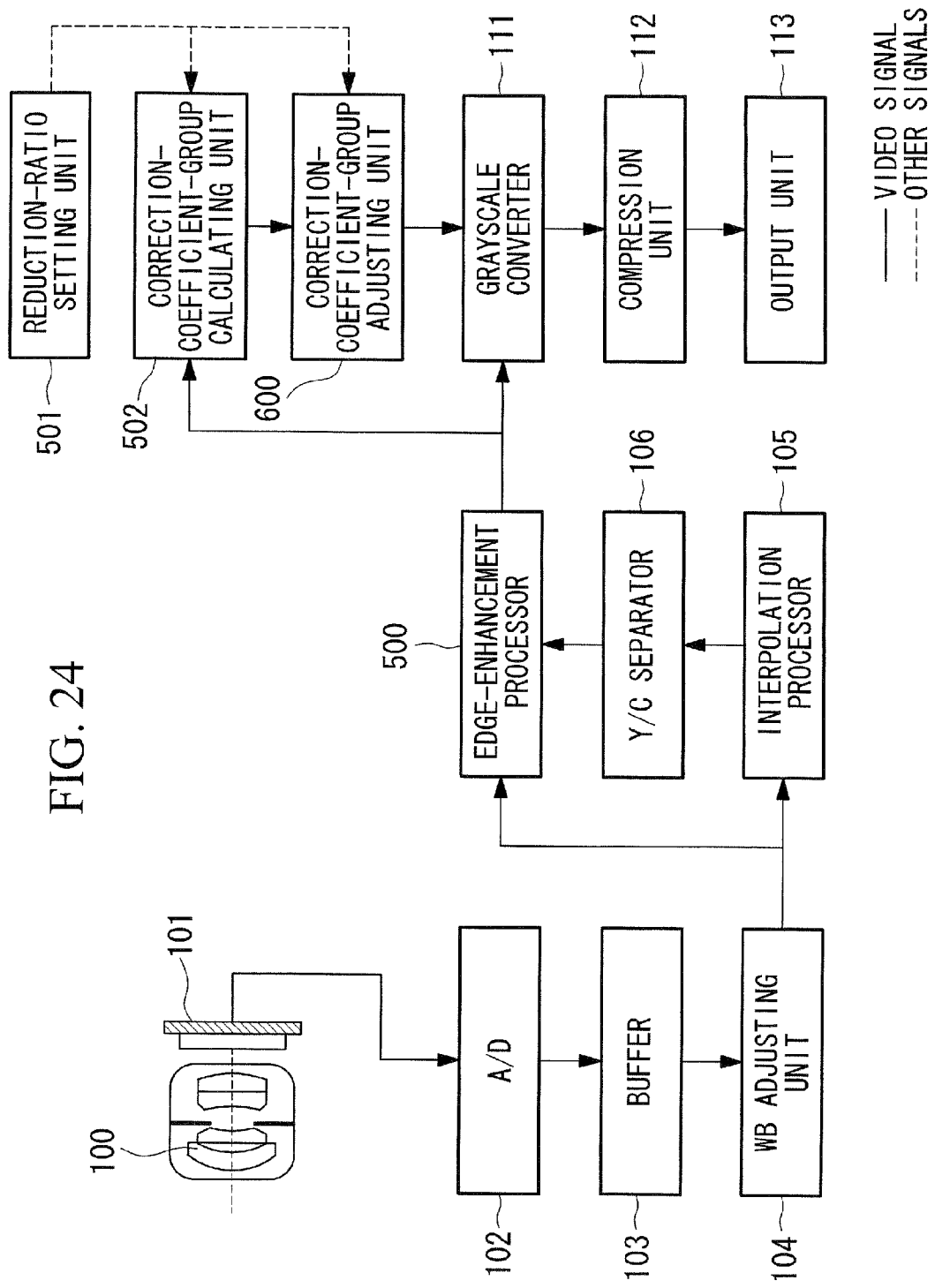
FIG. 24 is a block diagram showing, in outline, the configuration of a digital still camera according to a fifth embodiment of the present invention.

FIG. 24 is a block diagram showing, in outline, the configuration of a digital still camera according to the fifth embodiment of the present invention.

As shown in FIG. 24, the digital still camera according to this embodiment includes a correction-coefficient-group adjusting unit 600 instead of the correction-coefficient-group adjusting unit 503 (see FIG. 18) according to the fourth embodiment described above, and is configured such that the output signal from the edge-enhancement processor 500 is transferred to the correction-coefficient-group calculating unit 502 and the grayscale converter 111.

Next, the correction-coefficient-group adjusting unit 600 according to this embodiment is described more concretely with reference to the drawings.

Figure 25:
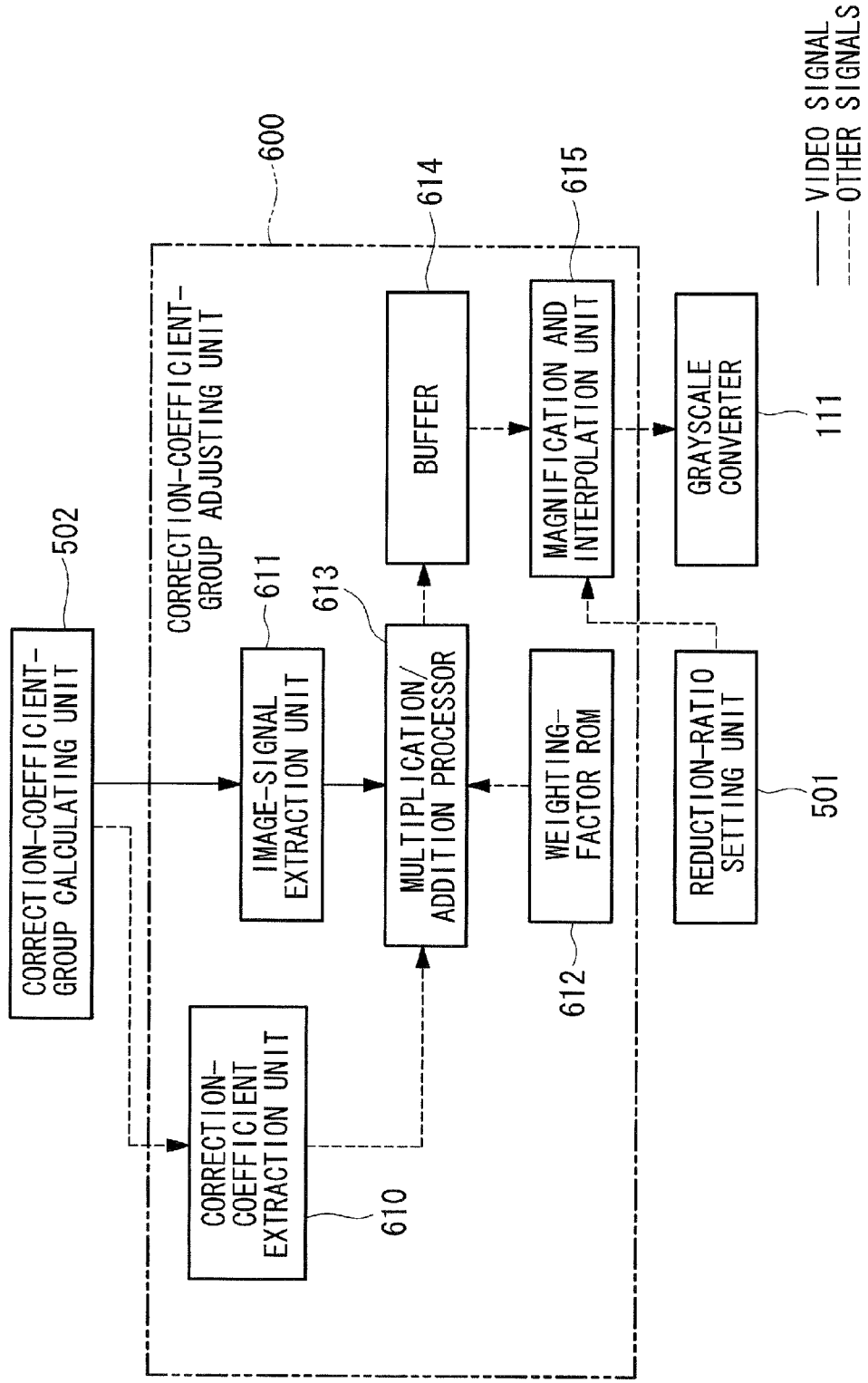
FIG. 25 is a block diagram showing, in outline, the configuration of a correction-coefficient-group adjusting unit shown in FIG. 24.

FIG. 25 is a block diagram showing, in outline, the configuration of the correction-coefficient-group adjusting unit 600 according to this embodiment. As shown in this figure, the correction-coefficient-group adjusting unit 600 is formed of a correction-coefficient extraction unit 610, an image-signal extraction unit 611, a weighting-factor ROM 612, a multiplication/addition processor 613, a buffer 614, and a magnification and interpolation unit 615.

In FIG. 25, the signal from the correction-coefficient-group calculating unit 502 is transferred to the correction-coefficient extraction unit 610 and the image-signal extraction unit 611. The outputs from the correction-coefficient extraction unit 610 and the image-signal extraction unit 611 are transferred to the multiplication/addition processor 613. The multiplication/addition processor 613 is connected to the weighting-factor ROM 612. The output from the multiplication/addition processor 613 is transferred to the magnification and interpolation unit 615 via the buffer 614. The output from the reduction-ratio setting unit 501 is transferred to the magnification and interpolation unit 615. The output from the magnification and interpolation unit 615 is transferred to the grayscale converter 111.

Details of the processing performed in each of the above units are described more concretely below.

The correction-coefficient extraction unit 610 reads out a reduced correction coefficients corresponding to the target pixel from the reduced correction-coefficient group corresponding to the pixels in the reduced image stored in the correction-coefficient buffer 535 in the correction-coefficient-group calculating unit 502, and transfers it to the multiplication/addition processor 613.

The image-signal extraction unit 611 reads out a luminance value corresponding to the target pixel extracted in the correction-coefficient extraction unit 610 from the luminance signal Y of the reduced image transferred from the reduced-image generator 530 (see FIG. 20) in the correction-coefficient-group calculating unit 502, and transfers it to the multiplication/addition processor 613.

The multiplication/addition processor 613 reads out a weighting factor W5 stored in the weighting-factor ROM 612 and obtains an adjusted correction coefficient (hereinafter referred to as "adjusted correction coefficient" in this embodiment) P5 by adjusting a reduced correction factor Pr according to Equation (12) below by using this weighting factor W5, a reduced correction coefficient Pr, corresponding to the target pixel, extracted by the correction-coefficient extraction unit 610, and a luminance value Lp of the target pixel, extracted by the image-signal extraction unit 611. Then, it obtains an adjusted correction-coefficient group formed of the adjusted correction-coefficient P5 for each pixel.

$$P5 = Pr * W5 * Lp \tag{12}$$

Here, for W5 in Equation (12), a suitable upper limit and lower limit are set and clipped.

The adjusted correction-coefficient group formed of the adjusted correction coefficients P5 calculated in the multiplication/addition processor 613 is transferred to the magnification and interpolation unit 615 via the buffer 641. The magnification and interpolation unit 615 calculates a final correction-coefficient group formed of final correction coefficients corresponding to the pixels in the original image from the adjusted correction-coefficient group, by using known interpolation processing on the basis of the reduction ratio obtained from the reduction-ratio setting unit 501, and transfers it to the grayscale converter 111. Accordingly, the grayscale converter 111 performs grayscale conversion processing by multiplying the luminance signal Y and the chrominance signal C by the final correction-coefficient group obtained from the correction-coefficient-group adjusting unit 600.

The correction coefficient P5 mentioned above may be obtained by adding the product of the luminance value Lp of the target pixel and the final weighting factor W5 to the correction coefficient Pr corresponding to the target pixel, as shown in Equation (13) below.

$$P5 = Pr + W5 * Lp \tag{13}$$

The equation for calculating P5 is not limited to Equation (12) or Equation (13); it may be another computational expression involving Pr, W5, and Lp. Also, a plurality of W5 values may be registered in the weighting-factor ROM 612, and a value selected therefrom on the basis of an instruction from the user may be used.

In the embodiment described above, it is assumed that the processing is realized in hardware; however, it is not necessarily limited to such a configuration. For example, it is also possible to output the signal from the CCD as unprocessed Raw data, and to output the image-acquisition information, such as the ISO sensitivity, input via the external interface as header information and to process them with separate software. The software process for signal processing is described below with reference to FIG. 26 and FIG. 27.

Figure 26:
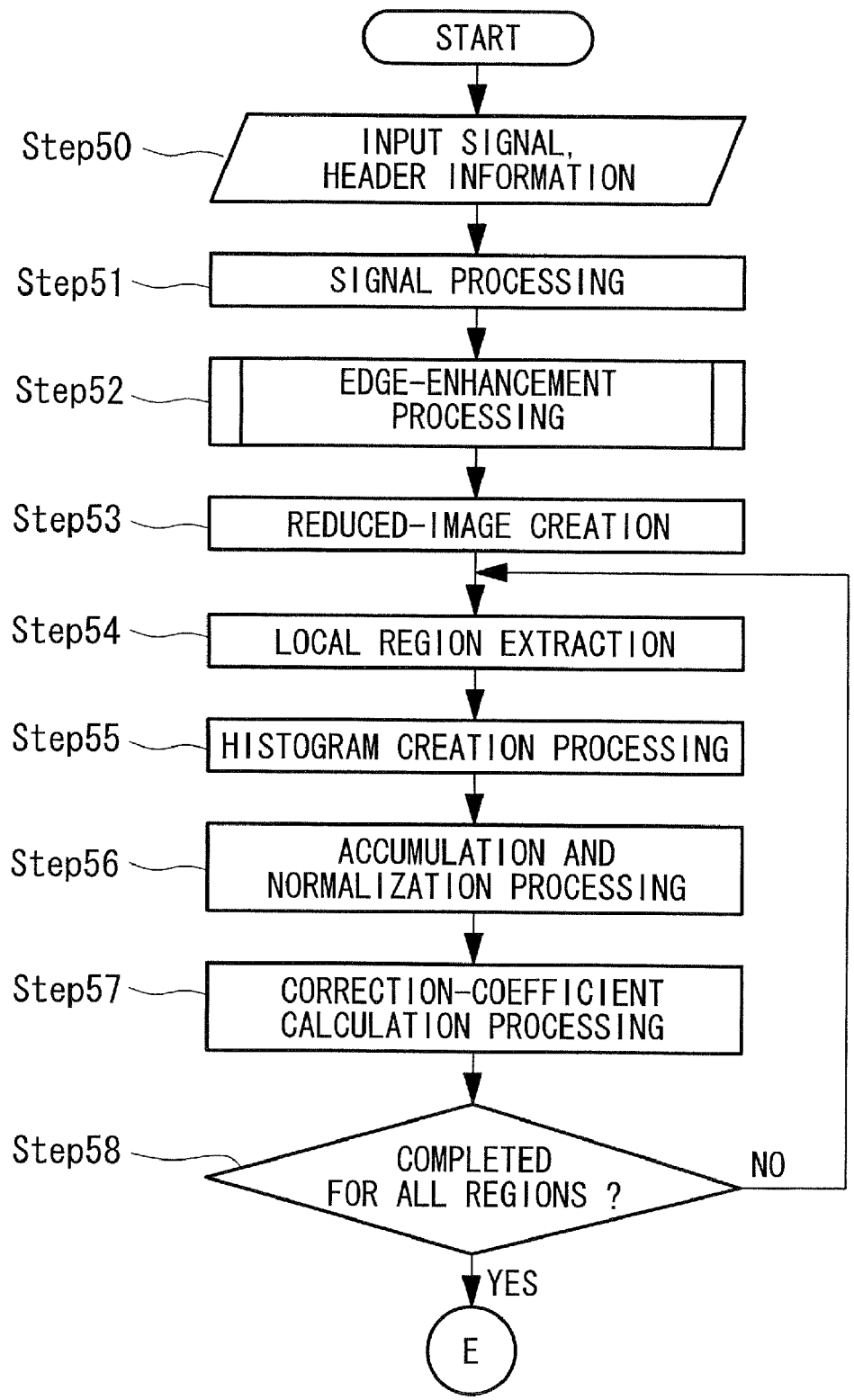
FIG. 26 is a flowchart showing a signal processing procedure realized by the digital still camera according to the fifth embodiment of the present invention.
Figure 27:
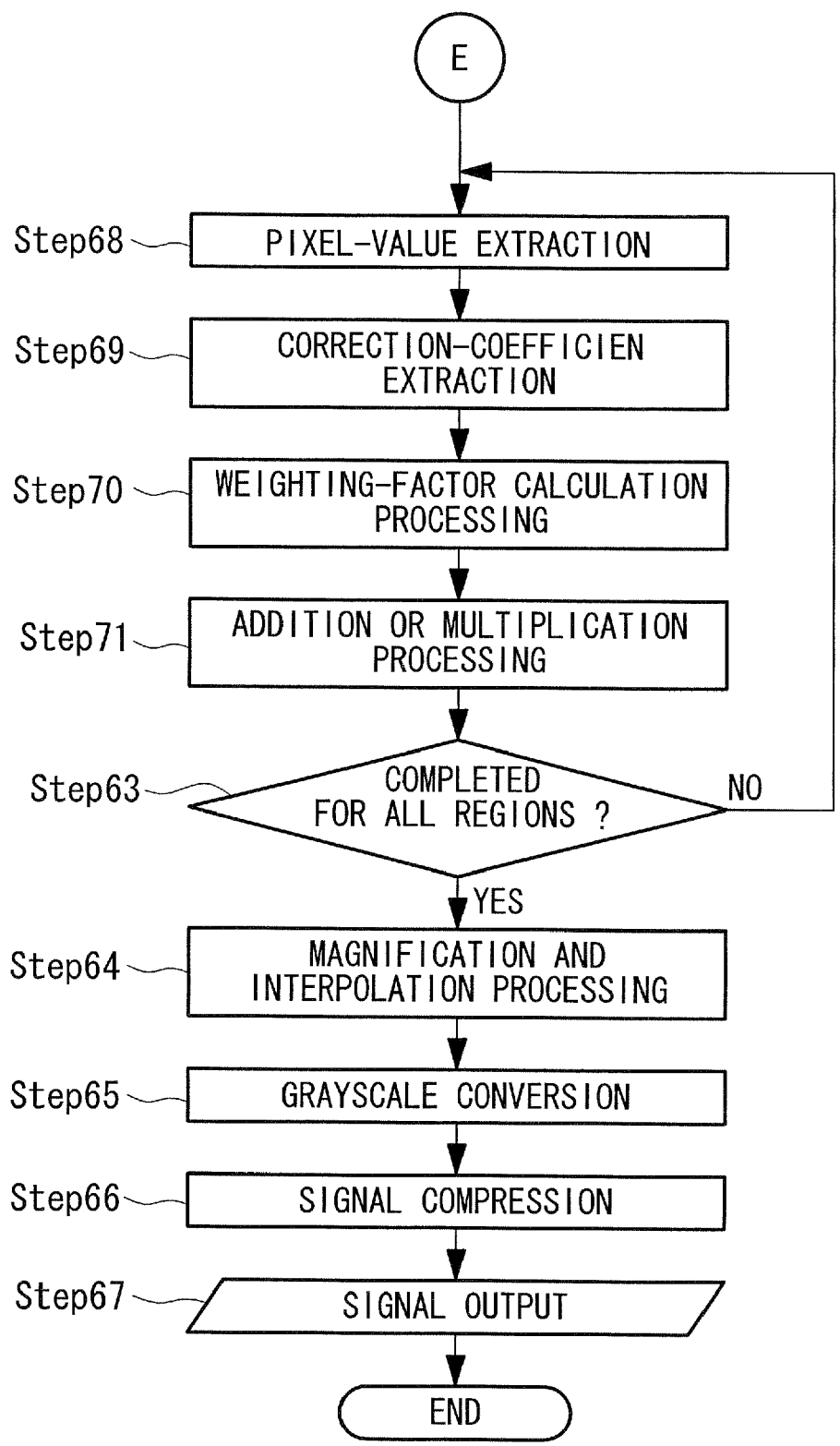
FIG. 27 is a flowchart showing the signal processing procedure realized by the digital still camera according to the fifth embodiment of the present invention.

FIGS. 26 and 27 are flowcharts showing the processing procedure for the software process for signal processing executed in the digital still camera according to the fifth embodiment of the present invention. In these figures, the same processing as that in the fourth embodiment described above is assigned the same step number. The same processing as the above-described processing performed in each structure shown in FIG. 24 is performed in each processing step.

As shown in FIGS. 26 and 27, in Steps 50 to 58, the processing is the same as that shown in FIG. 22. In Step 68, which continues from Step 58, the pixel value of the target pixel is extracted from the image signal, and in Step 69, a reduced correction coefficient corresponding to the target pixel extracted in Step 68 is extracted. In Step 70, a weighting factor is set. In Step 71, an adjusted correction-coefficient group formed of adjusted correction coefficients is calculated by performing multiplication or addition processing according to Equation (12) or (13) on the basis of the pixel value and reduced correction coefficient extracted in Step 68 and Step 69 on the basis of the weighting factor in Step 70. The process then proceeds to Step 63.

Sixth Embodiment

Next, a digital still camera according to a sixth embodiment of the present invention will be described with reference to the drawings. This embodiment is a combination of the third embodiment and the fourth embodiment described above. More specifically, first, a reduced image is created from the original image, reduced correction coefficients corresponding to this reduced image are obtained, adjusted correction coefficients are obtained by adjusting the reduced correction coefficients using the method described in the third embodiment above, and an adjusted correction-coefficient group is created from these adjusted correction coefficients. After that, a final correction-coefficient group, which is the final correction-coefficient group corresponding to the pixels in the original image, is obtained by subjecting this adjusted correction-coefficient group to magnification processing.

For the digital still camera of this embodiment, a description of aspects that are common to the fourth embodiment is omitted, and only the differences will be described below. The structures which are the same as those in the fourth embodiment are assigned the same names and reference numerals.

Figure 28:
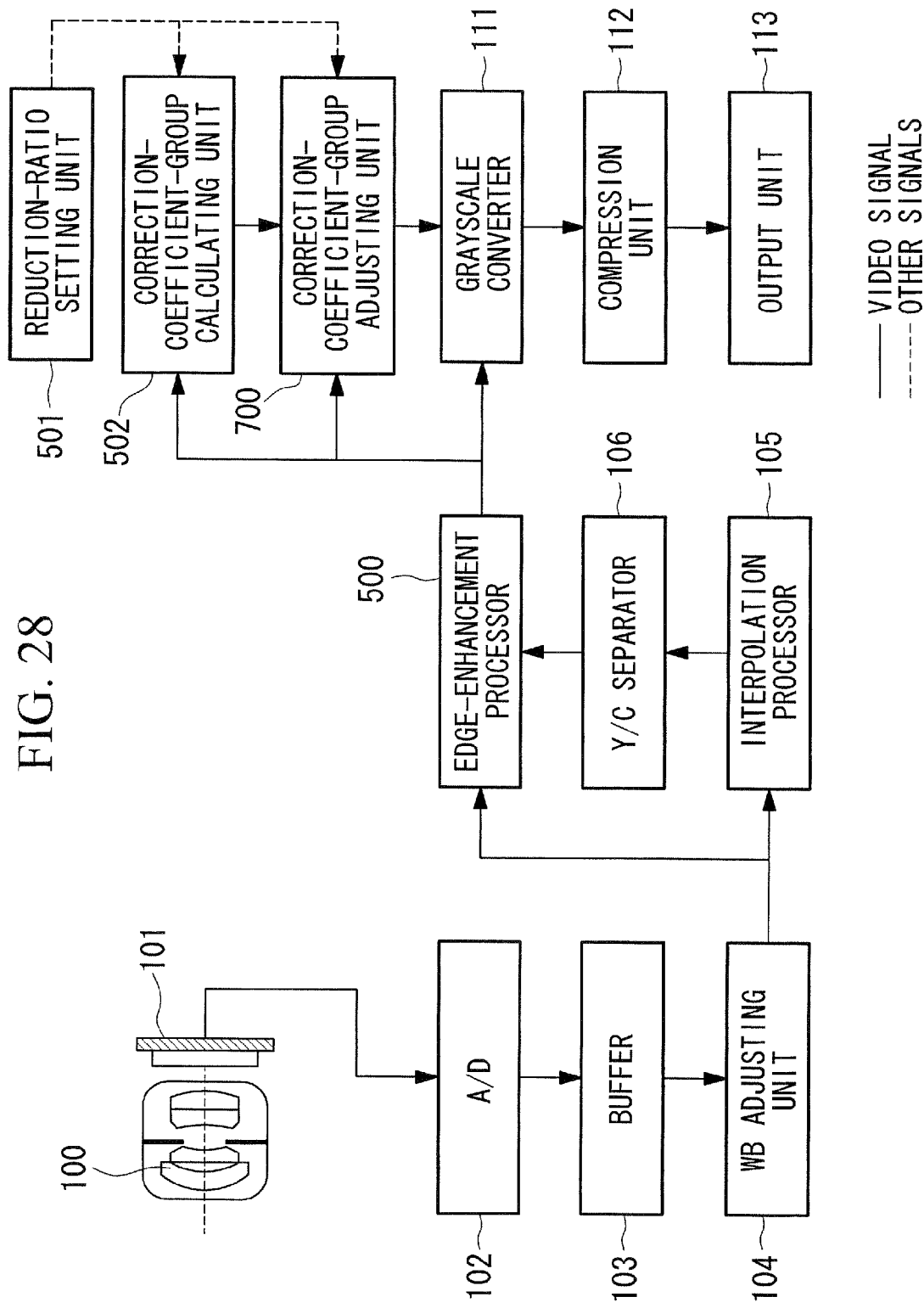
FIG. 28 is a block diagram showing, in outline, the configuration of a digital still camera according to a sixth embodiment of the present invention.

FIG. 28 is a block diagram showing, in outline, the configuration of the digital still camera according to the sixth embodiment of the present invention.

As shown in FIG. 28, the digital still camera according to this embodiment has substantially the same configuration as the digital still camera according to the fourth embodiment shown in FIG. 18; however, the differences are that it includes a correction-coefficient-group adjusting unit 700 instead of the correction-coefficient-group adjusting unit 503, and it is configured such that the output signal from the edge-enhancement processor 500 is transferred to the correction-coefficient-group calculating unit 502, the correction-coefficient-group adjusting unit 700, and the grayscale converter 111.

Next, the correction-coefficient-group adjusting unit 700 according to this embodiment will be described more concretely with reference to the drawings.

Figure 29:
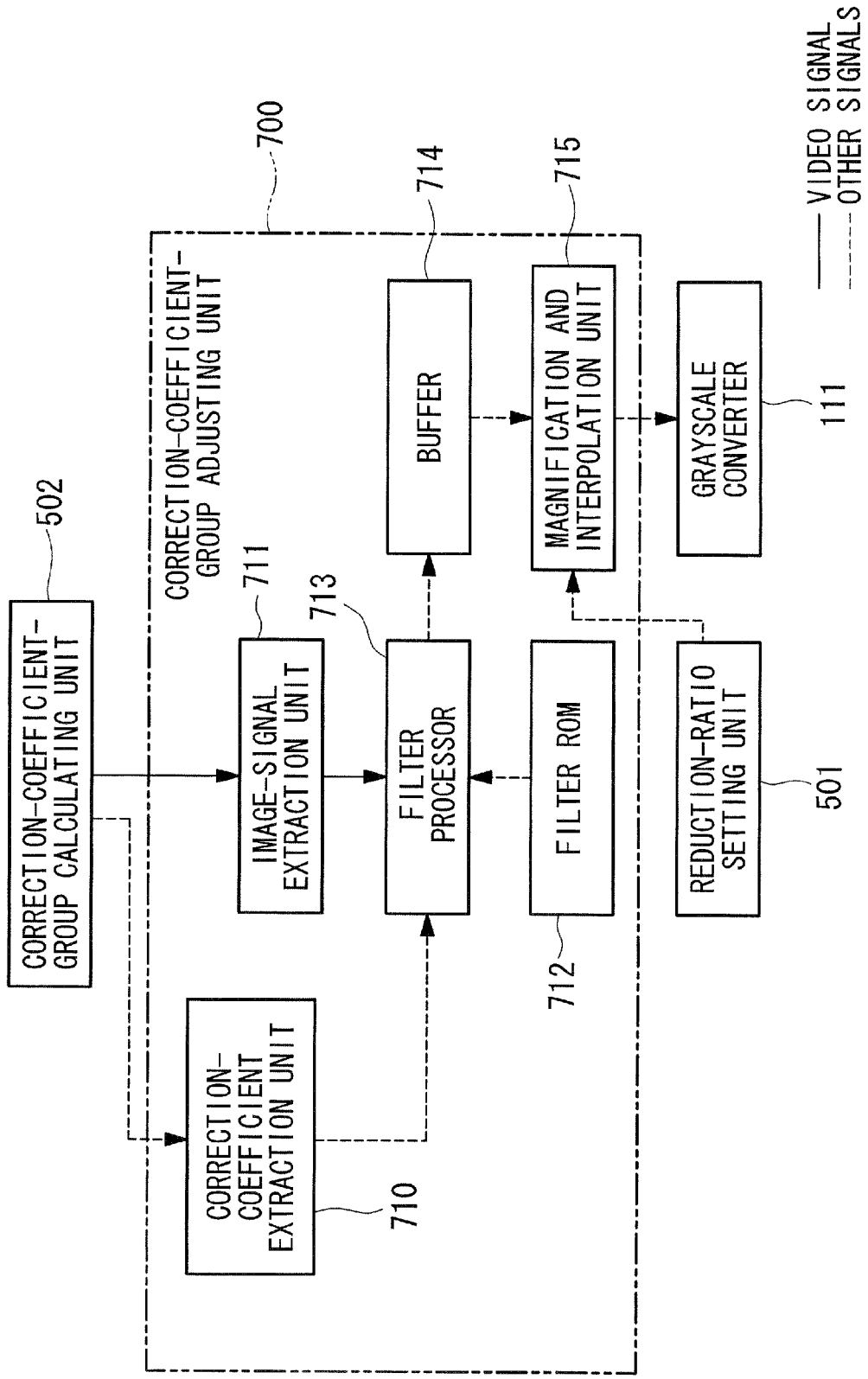
FIG. 29 is a block diagram showing, in outline, the configuration of a correction-coefficient-group adjusting unit shown in FIG. 28.

FIG. 29 is a block diagram showing, in outline, the configuration of the correction-coefficient-group adjusting unit 700 according to this embodiment. As shown in this figure, the correction-coefficient-group adjusting unit 700 is formed of a correction-coefficient extraction unit 710, an image-signal extraction unit 711, a filter ROM 712, a filter processor 713, a buffer 714, and a magnification and interpolation unit 715.

In FIG. 29, the signal from the correction-coefficient-group calculating unit 502 is transferred to the correction-coefficient extraction unit 710 and the image-signal extraction unit 711. The outputs from the correction-coefficient extraction unit 710 and the image-signal extraction unit 711 are transferred to the filter processor 713. The filter processor 713 is connected to the filter ROM 712. The output from the filter processor 713 is transferred to the magnification and interpolation unit 715 via the buffer 714. The output from the reduction-ratio setting unit 501 is transferred to the magnification and interpolation unit 715. The output from the magnification and interpolation unit 715 is transferred to the grayscale converter 111.

Details of the processing performed in each of the above units will be described more concretely below.

The image-signal extraction unit 711 reads out luminance values of the target pixel and the neighboring pixels of the target pixel from the luminance signal Y of the reduced image, transferred from the reduced-image generator 530 in the correction-coefficient-group calculating unit 502, and transfers them to the filter processor 713.

On the other hand, the correction-coefficient extraction unit 710 reads out reduced correction coefficients corresponding to the target pixel and the neighboring pixels of the target pixel, which are read out by the image-signal extraction unit 711 described above, from the reduced correction-coefficient group formed of the reduced correction coefficients corresponding to each pixel in the reduced image, stored in the correction-coefficient map buffer 535 (see FIG. 20) in the correction-coefficient-group calculating unit 502, and transfers them to the filter processor 713.

Using a smoothing filter read out from the filter ROM 712, the filter processor 713 calculates adjusted correction coefficients P(i,j) by performing computational processing according to Equation (11), similarly to the third embodiment described above, using the reduced correction coefficients Pr corresponding to the target pixel and the neighboring pixels of the target pixel, obtained from the correction-coefficient extraction unit 710, and the luminance values of the target pixel and the neighboring pixels of the target pixel, obtained from the image-signal extraction unit 711, and obtains an adjusted correction-coefficient group formed of P(i,j).

The adjusted correction-coefficient group formed of the adjusted correction coefficient P(i,j) corresponding to each pixel in the reduced image, calculated in this way, is transferred to the magnification and interpolation unit 715 via the buffer 714. The magnification and interpolation unit 715 calculates a final correction-coefficient group formed of the final correction coefficient corresponding to each pixel in the original image by magnifying the adjusted correction-coefficient group formed of the adjusted correction coefficient corresponding to each pixel in the reduced image using known interpolation processing, and transfers it to the grayscale converter 111. The grayscale converter 111 performs grayscale conversion processing by multiplying the luminance signal Y and the chrominance signal C by the final correction-coefficient group obtained from the correction-coefficient-group adjusting unit 700.

In the embodiment described above, the processing is assumed to be hardware-based; however, it is not necessarily limited to such a configuration. For example, it is also possible to output the signal from the CCD as unprocessed Raw data and to output the image-acquisition information, such as the ISO sensitivity, input via the external interface as header information, and to process them with separate software. The software process for signal processing is described below with reference to FIGS. 30 and 31.

Figure 30:
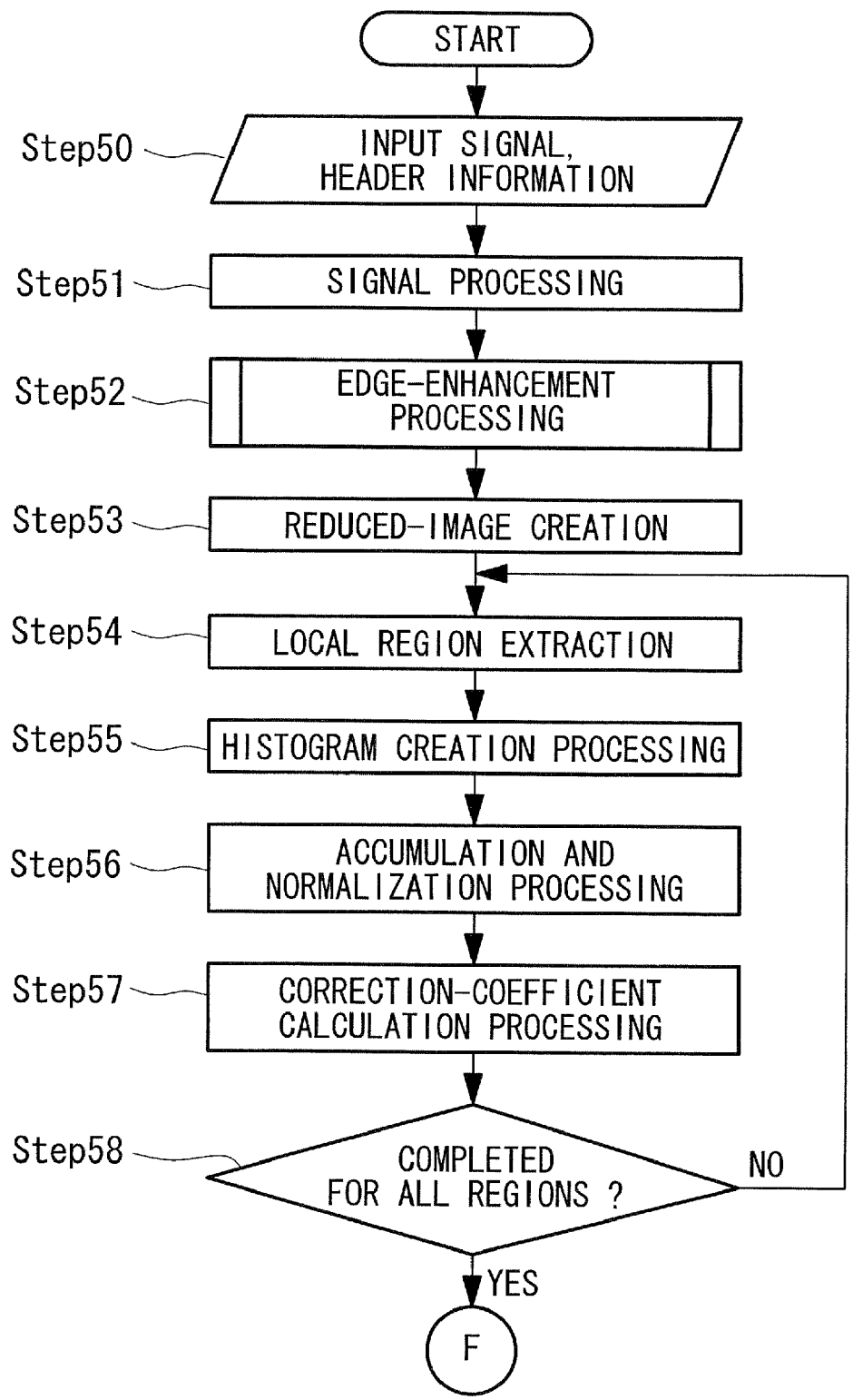
FIG. 30 is a flowchart showing a signal processing procedure realized by the digital still camera according to the sixth embodiment of the present invention.
Figure 31:
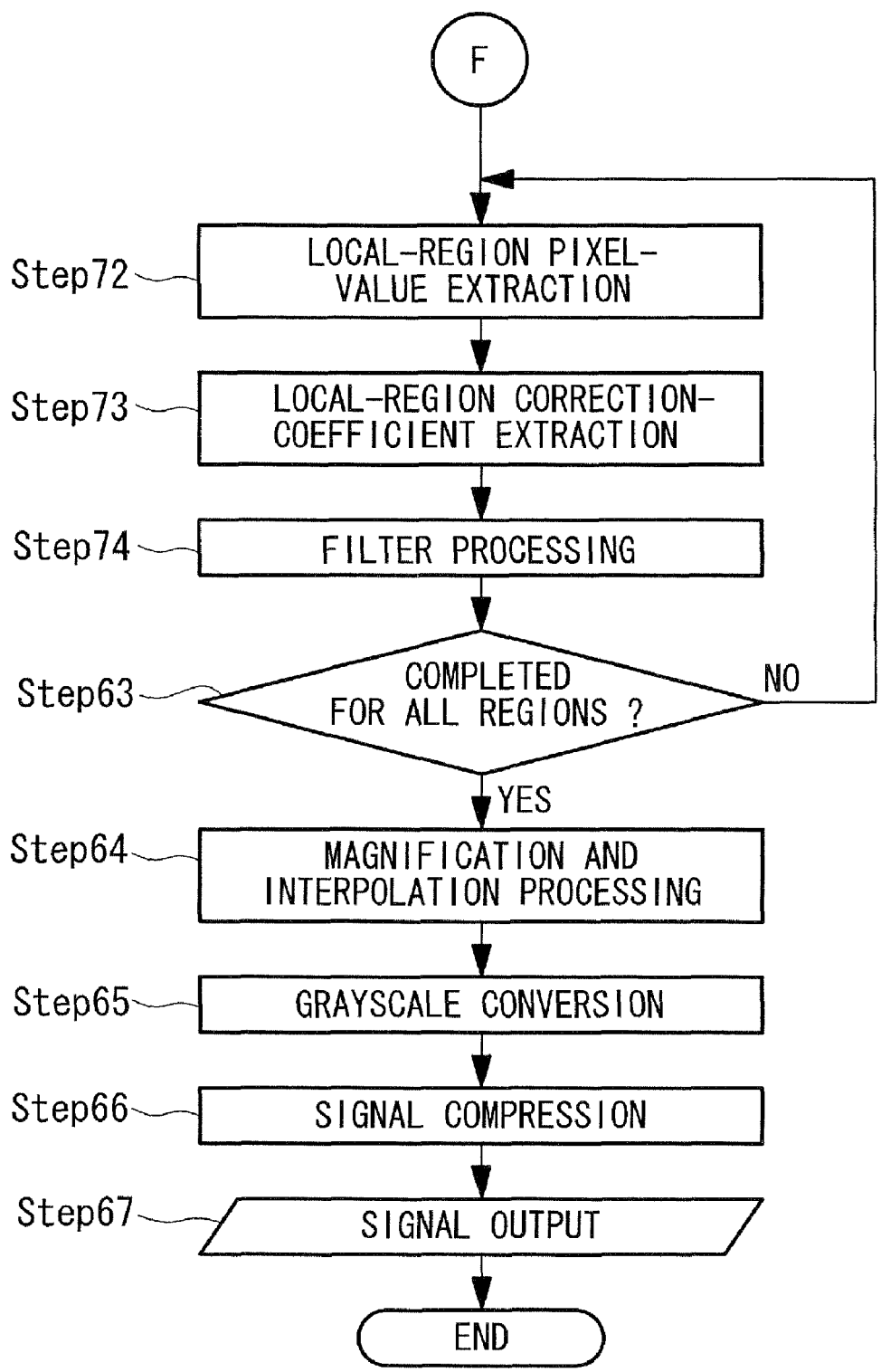
FIG. 31 is a flowchart showing the signal processing procedure realized by the digital still camera according to the sixth embodiment of the present invention.

FIGS. 30 and 31 are flowcharts showing the processing procedure for the software process for signal processing executed in the digital still camera according to the sixth embodiment of the present invention. In these figures, the same processing as that in the fourth embodiment described above is assigned the same step number. The same processing as the above-described processing performed in each structure shown in FIG. 28 is performed in each processing step.

As shown in FIGS. 30 and 31, Steps 50 to 58 are the same as the processing shown in FIGS. 22 and 23. In Step 72, which continues from Step 58, pixel values in a local region (for example, 5×5 pixel size) are extracted from the reduced-image signal, and in Step 73, a reduced correction coefficient corresponding to the target pixels extracted in Step 72 is extracted. In Step 74, filter processing according to Equation (11) shown above is performed on the pixel values and the reduced correction coefficient extracted in Step 72 and Step on the basis of a prescribed weighting factor, and the process goes to Step 63. The subsequent processing is the same as the processing shown in FIGS. 22 and 23.

The invention claimed is:

1. An image-acquisition apparatus for performing grayscale conversion processing on an image signal from an image-acquisition device, in each of regions in an image represented by the image signal, comprising:

an image processing part for performing image processing on the image signal from the image-acquisition device;

a reduced-image generating part for reducing the image signal, after being subjected to the image processing, with a prescribed reduction ratio to generate a reduced-image signal;

a correction-coefficient-group calculating part for creating a first correction-coefficient group formed of a plurality of correction coefficients corresponding to a plurality of pixels in the image signal after being subjected to the image processing, in each of the regions, using the reduced-image signal;

a correction-coefficient-group adjusting part for creating a second correction-coefficient group by adjusting the first correction-coefficient group by using the image signal from the image-acquisition device or a feature of the image signal after being subjected to the image processing; and a grayscale converting part for performing the grayscale conversion processing in each of the regions by using the second correction-coefficient group.

2. An image-acquisition apparatus according to claim 1, wherein the correction-coefficient-group calculating part creates a reduced correction-coefficient group formed of a plurality of reduced correction coefficients corresponding to the plurality of pixels in the reduced-image signal and creates the first correction-coefficient group by subjecting the reduced correction-coefficient group to magnification processing so as to cancel out a reduction by the prescribed reduction ratio.

3. An image-acquisition apparatus according to claim 1, wherein the correction-coefficient-group adjusting part includes:
an extracting part for extracting, from the first correction-coefficient group, a correction coefficient corresponding to a target pixel and correction coefficients corresponding to neighboring pixels of the target pixel; and
an adjusting part for adjusting the first correction-coefficient group by performing filter processing on the first correction-coefficient group using the correction coefficients extracted by the extracting part.

4. An image-acquisition apparatus according to claim 1, wherein the correction-coefficient-group adjusting part includes:
an extracting part for extracting, from the first correction-coefficient group, a correction coefficient corresponding to a target pixel and correction coefficients corresponding to neighboring pixels of the target pixel; and
an adjusting part for adjusting the first correction-coefficient group by performing filter processing on the first correction-coefficient group using the correction coefficients extracted by the extracting part and by performing a calculation in which a weighting factor is used.

5. An image-acquisition apparatus according to claim 1, wherein the correction-coefficient-group adjusting part includes:
a luminance-signal obtaining part for obtaining a luminance signal from the image signal subjected to the image processing; and
an adjusting part for adjusting the first correction-coefficient group on the basis of the luminance signal obtained by the luminance-signal obtaining part.

6. An image-acquisition apparatus according to claim 5, wherein the adjusting part adjusts the first correction-coefficient group using the luminance signal multiplied by a weighting factor.

7. An image-acquisition apparatus according to claim 3, wherein the image processing part includes:
an edge-intensity calculating part for calculating an edge intensity; and
an edge-enhancing part for performing edge-enhancement processing on the image signal from the image-acquisition device on the basis of the edge intensity,
wherein the adjusting part sets a weighting factor on the basis of the edge-intensity calculated by the edge-intensity calculating part.

8. An image-acquisition apparatus according to claim 3, wherein
the image processing part includes a contrast-calculating part for calculating a contrast; and
the adjusting part sets a weighting factor on the basis of the contrast calculated by the contrast-calculating part.

9. An image-acquisition apparatus according to claim 1, wherein the correction-coefficient-group adjusting part includes
a luminance-signal obtaining part for obtaining a luminance signal from the image signal subjected to the image processing;
an image-signal extracting part for extracting, from the luminance signal, pixel values corresponding to a target region of prescribed size, including a target pixel and neighboring pixels of the target pixel;
a correction-coefficient extracting part for extracting correction coefficients corresponding to the target region from the first correction-coefficient group created by the correction-coefficient calculating part; and
an adjusting part for adjusting the correction coefficients, corresponding to the target pixel, extracted by the correction-coefficient extracting part by using a spatial distance function of the pixels in the target region extracted by the image-signal extracting part and a difference function of each pixel value forming the target region.

10. A non-transitory computer-readable storage medium having stored thereon an image processing program for executing grayscale conversion processing on an image signal from an image-acquisition device, in each of regions of an image represented by the image signal, the image processing program causing a computer to execute:
a first step of performing image processing on the image signal from the image-acquisition device;
a second step of reducing the image signal subjected to the image processing by a prescribed reduction ratio to generate a reduced-image signal;
a third step of creating, in each of the regions, a first correction-coefficient group formed of a plurality of correction coefficients corresponding to a plurality of pixels in the image signal subjected to the image processing, by using the reduced-image signal;
a fourth step of creating a second correction-coefficient group by adjusting the first correction-coefficient group using the image signal from the image-acquisition device or a feature of the image signal subjected to the image processing; and
a fifth step of performing the grayscale conversion processing in each of the regions using the second correction-coefficient group.

11. A non-transitory computer-readable storage medium according to claim 10, wherein the fourth step includes:
a step of extracting, from the first correction-coefficient group, a correction coefficient corresponding to a target pixel and correction coefficients corresponding to neighboring pixels of the target pixel; and
a step of adjusting the first correction-coefficient group by performing filter processing on the first correction-coefficient group using the extracted correction coefficients.

12. A non-transitory computer-readable storage medium according to claim 10, wherein the fourth step includes:
a step of extracting, from the first correction-coefficient group, a correction coefficient corresponding to a target pixel and correction coefficients corresponding to neighboring pixels of the target pixel; and
a step of adjusting the first correction-coefficient group by performing filter processing on the first correction-coefficient group using the extracted correction coefficients and by performing a calculation in which a weighting factor is used.

13. A non-transitory computer-readable storage medium according to claim 10, wherein the fourth step includes:
a step of obtaining a luminance signal from the image signal subjected to the image processing; and
a step of adjusting the first correction-coefficient group on the basis of the obtained luminance signal.

14. An image-acquisition apparatus according to claim 4, wherein the image processing part includes:

an edge-intensity calculating part for calculating an edge intensity; and an edge-enhancing part for performing edge-enhancement processing on the image signal from the image-acquisition device on the basis of the edge intensity, wherein the adjusting part sets the weighting factor on the basis of the edge-intensity calculated by the edge-intensity calculating part.

15. An image-acquisition apparatus according to claim 6, wherein the image processing part includes:

an edge-intensity calculating part for calculating an edge intensity; and an edge-enhancing part for performing edge-enhancement processing on the image signal from the image-acquisition device on the basis of the edge intensity, wherein the adjusting part sets the weighting factor on the basis of the edge-intensity calculated by the edge-intensity calculating part.

16. An image-acquisition apparatus according to claim 4, wherein the image processing part includes a contrast-calculating part for calculating a contrast; and the adjusting part sets the weighting factor on the basis of the contrast calculated by the contrast-calculating part.

17. An image-acquisition apparatus according to claim 6, wherein the image processing part includes a contrast-calculating part for calculating a contrast; and the adjusting part sets the weighting factor on the basis of the contrast calculated by the contrast-calculating part.

\* \* \* \* \*